United States Patent [19]
Andersen et al.

[11] Patent Number: 5,738,921
[45] Date of Patent: Apr. 14, 1998

[54] COMPOSITIONS AND METHODS FOR MANUFACTURING SEALABLE, LIQUID-TIGHT CONTAINERS COMPRISING AN INORGANICALLY FILLED MATRIX

[75] Inventors: Per Just Andersen; Simon K. Hodson. both of Santa Barbara, Calif.

[73] Assignee: E. Khashoggi Industries, LLC, Santa Barbara, Calif.

[21] Appl. No.: 629,972

[22] Filed: Apr. 9, 1996

Related U.S. Application Data

[63] Continuation-in-part of Ser. No. 631,676, Apr. 9, 1996, and Ser. No. 353,543, Dec. 9, 1994, Pat. No. 5,683,772, and Ser. No. 288,667, Aug. 9, 1994, and Ser. No. 218,967, Mar. 25, 1994, Pat. No. 5,545,450, and Ser. No. 158,824, Nov. 24, 1993, Pat. No. 5,506,046, and Ser. No. 105,851, Aug. 10, 1993, Pat. No. 5,543,186.

[51] Int. Cl.⁶ .............................. B32B 1/08; B32B 5/02; B65D 85/84
[52] U.S. Cl. ................. 428/36.4; 206/524.3; 206/524.7; 206/819; 428/34.5; 428/36.1; 428/36.5; 428/36.92; 428/317.9; 428/532; 428/906
[58] Field of Search ................... 428/34.5, 35.6, 428/35.7, 36.4, 36.5, 229, 312.4, 312.6, 313.9, 317.9, 339, 532, 906, 36.1, 36.92; 206/524.3, 524.7, 819

[56] References Cited

U.S. PATENT DOCUMENTS

| | | |
|---|---|---|
| 109,669 | 11/1870 | Rowland . |
| 128,980 | 7/1872 | Rowland . |
| 591,168 | 10/1897 | Heinzerling . |
| 882,538 | 3/1908 | Sargent . |
| 1,223,834 | 4/1917 | Sänger . |
| 1,234,692 | 7/1917 | Poznanski . |
| 1,427,103 | 8/1922 | Haenicke et al. . |
| 1,874,974 | 8/1932 | Hammenecker . |
| 1,932,150 | 10/1933 | Tada . |

(List continued on next page.)

FOREIGN PATENT DOCUMENTS

| | | |
|---|---|---|
| 619559 | 5/1961 | Canada . |
| 627550 | 9/1961 | Canada . |
| 0003481 A2 | 8/1979 | European Pat. Off. . |
| 0006390 A1 | 1/1980 | European Pat. Off. . |
| 0263723 A2 | 4/1988 | European Pat. Off. . |
| 0265745 A2 | 5/1988 | European Pat. Off. . |
| 0271853 B2 | 6/1988 | European Pat. Off. . |
| 0290007 A1 | 11/1988 | European Pat. Off. . |
| 0304401 B1 | 2/1989 | European Pat. Off. . |
| 0118240 B1 | 7/1989 | European Pat. Off. . |
| 0340707 A2 | 11/1989 | European Pat. Off. . |
| 0340765 A2 | 11/1989 | European Pat. Off. . |

(List continued on next page.)

OTHER PUBLICATIONS

Alexanderson, Self–Smoothing Floors Based on Polymer Cement Concrete, *Concrete International* (Jan. 1990).
Algnesberger, The Use of Anionic Melamine Resin as a Concrete Additive, *Cement Lime and Gravel*, (Sep. 1973).

(List continued on next page.)

*Primary Examiner*—James J. Bell
*Assistant Examiner*—Blaine R. Copeneaver
*Attorney, Agent, or Firm*—Workman, Nydegger & Seeley

[57] ABSTRACT

Sealable liquid-tight containers and methods for economically manufacturing containers for storing and dispensing substances and any other purposes for which conventional sealable liquid-tight containers are utilized. The containers are readily and economically formed from inorganically filled mixtures comprising a water-dispersible organic polymer binder, aggregate fillers, fibers, and water. Alternatively, such containers are formed from high starch-containing compositions which optionally include inorganic fillers up to about 90%. Such compositions can be directly molded, formed into wet sheets and then molded, formed into dry sheets and then reformed, or extruded into the container components. The containers or components thereof may optionally be coated, lined, laminated, and/or receive printing.

225 Claims, 9 Drawing Sheets

U.S. PATENT DOCUMENTS

| | | |
|---|---|---|
| 1,954,117 | 4/1934 | Caldwell . |
| 1,965,538 | 7/1934 | Stewart . |
| 2,045,099 | 6/1936 | Pond . |
| 2,170,102 | 8/1939 | Thompson . |
| 2,205,735 | 6/1940 | Scherer, Jr. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler et al. . |
| 2,700,615 | 1/1955 | Heijmer et al. . |
| 2,754,207 | 7/1956 | Schur et al. . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon, Jr. et al. . |
| 2,943,013 | 6/1960 | Arledter . |
| 2,959,489 | 11/1960 | Wagner . |
| 2,968,561 | 1/1961 | Birnkrant . |
| 3,006,615 | 10/1961 | Mason, Jr. . |
| 3,007,222 | 11/1961 | Ragan . |
| 3,027,266 | 3/1962 | Wikne . |
| 3,030,258 | 4/1962 | Wagner . |
| 3,042,578 | 7/1962 | Denning . |
| 3,052,595 | 9/1962 | Pye . |
| 3,097,929 | 7/1963 | Ragan . |
| 3,117,014 | 1/1964 | Klug . |
| 3,149,986 | 9/1964 | Zelmanoff . |
| 3,169,877 | 2/1965 | Bartoli et al. . |
| 3,215,549 | 11/1965 | Ericson . |
| 3,253,978 | 5/1966 | Bodendorf et al. . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,403,205 | 9/1968 | Ottenholm . |
| 3,432,317 | 3/1969 | Kelly et al. . |
| 3,458,329 | 7/1969 | Owens et al. . |
| 3,459,632 | 8/1969 | Caldwell et al. . |
| 3,468,993 | 9/1969 | Bierlich . |
| 3,470,005 | 9/1969 | Flacheenberg et al. . |
| 3,492,385 | 1/1970 | Simunic . |
| 3,520,707 | 7/1970 | Steinberg et al. . |
| 3,526,172 | 9/1970 | Stuart . |
| 3,558,070 | 1/1971 | Gabriels . |
| 3,579,366 | 5/1971 | Rehmar . |
| 3,683,760 | 8/1972 | Silva . |
| 3,689,294 | 9/1972 | Brannauer . |
| 3,697,366 | 10/1972 | Harlock et al. . |
| 3,745,891 | 7/1973 | Bodendoerfer . |
| 3,753,749 | 8/1973 | Nutt . |
| 3,754,954 | 8/1973 | Gabriel et al. . |
| 3,759,729 | 9/1973 | Fahn . |
| 3,770,859 | 11/1973 | Bevan . |
| 3,806,571 | 4/1974 | Rönnmark et al. . |
| 3,819,389 | 6/1974 | Uchikawa et al. . |
| 3,824,107 | 7/1974 | Weiant . |
| 3,827,895 | 8/1974 | Copeland . |
| 3,841,885 | 10/1974 | Jakel . |
| 3,855,908 | 12/1974 | Schmidt et al. . |
| 3,857,715 | 12/1974 | Humphrey . |
| 3,902,912 | 9/1975 | Wolf . |
| 3,904,341 | 9/1975 | Putti . |
| 3,908,523 | 9/1975 | Shikaya . |
| 3,914,359 | 10/1975 | Bevan . |
| 3,917,781 | 11/1975 | Gabriel et al. . |
| 3,927,163 | 12/1975 | Gabriel et al. . |
| 3,952,130 | 4/1976 | Nason . |
| 3,954,490 | 5/1976 | Cockram . |
| 3,968,004 | 7/1976 | Coffey et al. . |
| 3,989,534 | 11/1976 | Plunguian et al. . |
| 3,998,651 | 12/1976 | Baudouin et al. . |
| 4,002,482 | 1/1977 | Coenen . |
| 4,017,321 | 4/1977 | Reighter . |
| 4,017,324 | 4/1977 | Eggers . |
| 4,028,454 | 6/1977 | Davidovits et al. . |
| 4,040,851 | 8/1977 | Ziegler . |
| 4,043,862 | 8/1977 | Roberts . |
| 4,044,166 | 8/1977 | Koizumi . |
| 4,046,584 | 9/1977 | Snyder et al. . |
| 4,053,346 | 10/1977 | Amberg et al. . |
| 4,070,196 | 1/1978 | Kraak et al. . |
| 4,070,199 | 1/1978 | Downing et al. . |
| 4,070,953 | 1/1978 | Richards et al. . |
| 4,072,549 | 2/1978 | Amberg et al. . |
| 4,073,658 | 2/1978 | Ohtani et al. . |
| 4,076,846 | 2/1978 | Nakatsuka et al. . |
| 4,077,809 | 3/1978 | Plunguian et al. . |
| 4,080,213 | 3/1978 | Mori et al. . |
| 4,084,980 | 4/1978 | Motoki . |
| 4,085,001 | 4/1978 | Fukuwatari et al. . |
| 4,089,691 | 5/1978 | Cummisford et al. . |
| 4,093,690 | 6/1978 | Murray . |
| 4,117,059 | 9/1978 | Murray . |
| 4,117,060 | 9/1978 | Murray . |
| 4,121,402 | 10/1978 | Cress et al. . |
| 4,124,550 | 11/1978 | Kabayashi et al. . |
| 4,132,555 | 1/1979 | Barrable . |
| 4,133,619 | 1/1979 | Wise . |
| 4,135,940 | 1/1979 | Peltier . |
| 4,149,550 | 4/1979 | Green et al. . |
| 4,157,998 | 6/1979 | Berntsson et al. . |
| 4,158,989 | 6/1979 | Barr . |
| 4,159,302 | 6/1979 | Greve et al. . |
| 4,172,154 | 10/1979 | von Rymon Lipinski . |
| 4,185,923 | 1/1980 | Bouette et al. . |
| 4,187,768 | 2/1980 | Suzuki . |
| 4,188,231 | 2/1980 | Valore . |
| 4,190,454 | 2/1980 | Yamagisi et al. . |
| 4,196,161 | 4/1980 | Toffolom et al. . |
| 4,202,857 | 5/1980 | Lowe . |
| 4,210,490 | 7/1980 | Taylor . |
| 4,225,247 | 9/1980 | Hodson . |
| 4,225,357 | 9/1980 | Hodson . |
| 4,225,383 | 9/1980 | McReynolds . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,244,781 | 1/1981 | Heckman . |
| 4,248,664 | 2/1981 | Atkinson et al. . |
| 4,249,991 | 2/1981 | Baes et al. . |
| 4,257,710 | 3/1981 | Delcoigne et al. . |
| 4,257,814 | 3/1981 | Kellet et al. . |
| 4,261,754 | 4/1981 | Krenchel et al. . |
| 4,264,367 | 4/1981 | Schutz . |
| 4,264,368 | 4/1981 | Schutz . |
| 4,269,657 | 5/1981 | Gomez et al. . |
| 4,271,228 | 6/1981 | Foster et al. . |
| 4,272,198 | 6/1981 | Velikov et al. . |
| 4,279,695 | 7/1981 | Winterbottom . |
| 4,287,247 | 9/1981 | Reil et al. . |
| 4,299,790 | 11/1981 | Greenberg . |
| 4,303,690 | 12/1981 | Haas, Sr. et al. . |
| 4,305,758 | 12/1981 | Powers et al. . |
| 4,306,059 | 12/1981 | Yokobayashi et al. . |
| 4,310,996 | 1/1982 | Mulvey et al. . |
| 4,313,997 | 2/1982 | Ruff et al. . |
| 4,326,891 | 4/1982 | Sadler . |
| 4,328,136 | 5/1982 | Blount . |
| 4,329,177 | 5/1982 | George . |

| | | | | | |
|---|---|---|---|---|---|
| 4,353,748 | 10/1982 | Birchall et al. . | 4,797,161 | 1/1989 | Kirchmayr et al. . |
| 4,362,679 | 12/1982 | Malinowski . | 4,799,961 | 1/1989 | Friberg . |
| 4,370,166 | 1/1983 | Powers et al. . | 4,814,012 | 3/1989 | Paul et al. . |
| 4,373,957 | 2/1983 | Pedersen . | 4,828,650 | 5/1989 | Wagle et al. . |
| 4,373,992 | 2/1983 | Bondoc . | 4,833,191 | 5/1989 | Bushway et al. . |
| 4,377,440 | 3/1983 | Gasland . | 4,836,940 | 6/1989 | Alexander . |
| 4,378,271 | 3/1983 | Hargreaves et al. . | 4,840,672 | 6/1989 | Baes . |
| 4,383,862 | 5/1983 | Dyson . | 4,842,649 | 6/1989 | Heitzmann et al. . |
| 4,406,703 | 9/1983 | Guthrie et al. . | 4,846,932 | 7/1989 | Karita et al. . |
| 4,410,366 | 10/1983 | Birchall et al. . | 4,863,655 | 9/1989 | Lacourse et al. . |
| 4,410,571 | 10/1983 | Korpman . | 4,872,913 | 10/1989 | Dunton et al. . |
| 4,415,366 | 11/1983 | Copening . | 4,888,059 | 12/1989 | Yamaguchi et al. . |
| 4,427,610 | 1/1984 | Murray . | 4,889,428 | 12/1989 | Hodson . |
| 4,428,741 | 1/1984 | Westphal . | 4,889,594 | 12/1989 | Gavelin . |
| 4,428,775 | 1/1984 | Johnson et al. . | 4,892,589 | 1/1990 | Kirkland et al. . |
| 4,444,593 | 4/1984 | Schutz . | 4,892,590 | 1/1990 | Gill et al. . |
| 4,445,970 | 5/1984 | Post et al. . | 4,895,598 | 1/1990 | Hedberg et al. . |
| 4,452,596 | 6/1984 | Clauss et al. . | 4,912,069 | 3/1990 | Ruben . |
| 4,460,348 | 7/1984 | Iioka et al. . | 4,919,758 | 4/1990 | Wagle et al. . |
| 4,462,835 | 7/1984 | Car . | 4,921,250 | 5/1990 | Ayers . |
| 4,470,877 | 9/1984 | Johnstone et al. . | 4,923,665 | 5/1990 | Andersen et al. . |
| 4,481,037 | 11/1984 | Beale et al. . | 4,925,530 | 5/1990 | Sinclair et al. . |
| 4,487,657 | 12/1984 | Gomez . | 4,927,043 | 5/1990 | Vanderlaan . |
| 4,490,130 | 12/1984 | Konzal et al. . | 4,927,573 | 5/1990 | Alpár et al. . |
| 4,497,662 | 2/1985 | Chisholm et al. . | 4,927,655 | 5/1990 | Ito . |
| 4,504,315 | 3/1985 | Allemann et al. . | 4,927,656 | 5/1990 | Ito . |
| 4,522,772 | 6/1985 | Bevan . | 4,935,097 | 6/1990 | Tashiro et al. . |
| 4,524,828 | 6/1985 | Sabins et al. . | 4,939,192 | 7/1990 | t'Sas . |
| 4,529,653 | 7/1985 | Hargreaves et al. . | 4,941,922 | 7/1990 | Snyder . |
| 4,529,662 | 7/1985 | Lancaster et al. . | 4,943,349 | 7/1990 | Gomez . |
| 4,529,663 | 7/1985 | Lancaster et al. . | 4,944,595 | 7/1990 | Hodson . |
| 4,533,393 | 8/1985 | Neuschaeffer et al. . | 4,948,429 | 8/1990 | Arfaei . |
| 4,533,581 | 8/1985 | Asaumi et al. . | 4,952,278 | 8/1990 | Gregory et al. . |
| 4,536,173 | 8/1985 | Puls . | 4,957,558 | 9/1990 | Ueda et al. . |
| 4,545,854 | 10/1985 | Gomez et al. . | 4,957,754 | 9/1990 | Munk et al. . |
| 4,549,930 | 10/1985 | Dessauer . | 4,963,309 | 10/1990 | Gohlisch et al. . |
| 4,551,384 | 11/1985 | Aston et al. . | 4,963,603 | 10/1990 | Felegi, Jr. et al. . |
| 4,552,463 | 11/1985 | Hodson . | 4,975,473 | 12/1990 | Kaneda et al. . |
| 4,562,218 | 12/1985 | Fornandel et al. . | 4,976,131 | 12/1990 | Grims et al. . |
| 4,571,233 | 2/1986 | Konzal . | 4,979,992 | 12/1990 | Bache . |
| 4,581,003 | 4/1986 | Ito et al. . | 4,983,257 | 1/1991 | Schultz et al. . |
| 4,585,486 | 4/1986 | Fujita et al. . | 4,985,119 | 1/1991 | Vinson et al. . |
| 4,588,443 | 5/1986 | Bache . | 4,999,056 | 3/1991 | Rasmussen . |
| 4,595,623 | 6/1986 | Du Pont et al. . | 5,017,268 | 5/1991 | Clitherow et al. . |
| 4,613,627 | 9/1986 | Sherman et al. . | 5,018,379 | 5/1991 | Shirai et al. . |
| 4,619,636 | 10/1986 | Bogren . | 5,021,093 | 6/1991 | Beshay . |
| 4,621,763 | 11/1986 | Brauner . | 5,030,282 | 7/1991 | Matsuhashi et al. . |
| 4,622,026 | 11/1986 | Ito et al. . | 5,035,930 | 7/1991 | Lacourse et al. . |
| 4,623,150 | 11/1986 | Moehlman et al. . | 5,039,003 | 8/1991 | Gordon et al. . |
| 4,636,345 | 1/1987 | Jensen et al. . | 5,039,378 | 8/1991 | Pommier et al. . |
| 4,637,860 | 1/1987 | Harper et al. . | 5,039,560 | 8/1991 | Durgin et al. . |
| 4,640,715 | 2/1987 | Heitzmann et al. . | 5,043,196 | 8/1991 | Lacourse et al. . |
| 4,642,137 | 2/1987 | Heitzmann et al. . | 5,047,086 | 9/1991 | Hayakawa et al. . |
| 4,650,523 | 3/1987 | Kikuchi et al. . | 5,049,237 | 9/1991 | Bohm et al. . |
| 4,655,981 | 4/1987 | Nielsen et al. . | 5,051,217 | 9/1991 | Alpár et al. . |
| 4,673,438 | 6/1987 | Wittwer et al. . | 5,061,346 | 10/1991 | Taggart et al. . |
| 4,680,023 | 7/1987 | Varano . | 5,071,512 | 12/1991 | Bixler et al. . |
| 4,707,187 | 11/1987 | Tsuda et al. . | 5,076,985 | 12/1991 | Koch et al. . |
| 4,707,221 | 11/1987 | Beer et al. . | 5,082,500 | 1/1992 | Nachtman et al. . |
| 4,710,422 | 12/1987 | Fredenucci . | 5,085,366 | 2/1992 | Durgin et al. . |
| 4,711,669 | 12/1987 | Paul et al. . | 5,085,707 | 2/1992 | Bundy et al. . |
| 4,735,660 | 4/1988 | Cane . | 5,089,186 | 2/1992 | Moore et al. . |
| 4,746,481 | 5/1988 | Schmidt . | 5,089,198 | 2/1992 | Leach . |
| 4,749,444 | 6/1988 | Lorz et al. . | 5,095,054 | 3/1992 | Lay et al. . |
| 4,753,710 | 6/1988 | Langley et al. . | 5,096,650 | 3/1992 | Renna . |
| 4,754,589 | 7/1988 | Leth . | 5,102,596 | 4/1992 | Lempfer et al. . |
| 4,755,494 | 7/1988 | Ruben . | 5,104,487 | 4/1992 | Taggart et al. . |
| 4,772,439 | 9/1988 | Trevino-Gonzalez . | 5,104,669 | 4/1992 | Wolke et al. . |
| 4,775,580 | 10/1988 | Dighton . | 5,106,423 | 4/1992 | Clarke . |
| 4,784,693 | 11/1988 | Kirkland et al. . | 5,106,880 | 4/1992 | Miller et al. . |
| 4,786,670 | 11/1988 | Tracy et al. . | 5,108,677 | 4/1992 | Ayers . |
| 4,789,244 | 12/1988 | Dunton et al. . | 5,108,679 | 4/1992 | Rirsch et al. . |

| | | | | | |
|---|---|---|---|---|---|
| 5,110,413 | 5/1992 | Steer . | | | |
| 5,122,231 | 6/1992 | Anderson . | | FOREIGN PATENT DOCUMENTS | |
| 5,126,013 | 6/1992 | Wiker et al. . | 0370913 B1 | 5/1990 | European Pat. Off. . |
| 5,126,014 | 6/1992 | Chung . | 0405146 B1 | 1/1991 | European Pat. Off. . |
| 5,132,155 | 7/1992 | Singh et al. . | 0447797 A2 | 9/1991 | European Pat. Off. . |
| 5,134,179 | 7/1992 | Felegi, Jr. et al. . | 0453980 A2 | 10/1991 | European Pat. Off. . |
| 5,139,615 | 8/1992 | Conner et al. . | 0497151 A1 | 8/1992 | European Pat. Off. . |
| 5,141,797 | 8/1992 | Wheeler . | 0546956 A2 | 6/1993 | European Pat. Off. . |
| 5,151,130 | 9/1992 | Croft et al. . | 0551954 A2 | 6/1993 | European Pat. Off. . |
| 5,153,037 | 10/1992 | Altieri . | 0608031 A1 | 7/1994 | European Pat. Off. . |
| 5,154,771 | 10/1992 | Wada et al. . | 1278195 | 10/1961 | France . |
| 5,156,718 | 10/1992 | Neubert . | 2642731 | 7/1990 | France . |
| 5,160,368 | 11/1992 | Begovich . | 3011330 | 3/1980 | Germany . |
| 5,160,676 | 11/1992 | Singh et al. . | 2841172 | 4/1980 | Germany . |
| 5,167,894 | 12/1992 | Baumgarten . | 3420195 A1 | 12/1985 | Germany . |
| 5,169,566 | 12/1992 | Stucky et al. . | 4008862 C1 | 4/1991 | Germany . |
| 5,178,730 | 1/1993 | Bixler et al. . | 47-20190 | 9/1972 | Japan . |
| 5,184,995 | 2/1993 | Kuchenbecker . | 51-2729 | 1/1976 | Japan . |
| 5,185,382 | 2/1993 | Neumann et al. . | 53-16730 | 2/1978 | Japan . |
| 5,186,990 | 2/1993 | Starcevich . | 54-31320 | 3/1979 | Japan . |
| 5,194,206 | 3/1993 | Koch et al. . | 54-48821 | 3/1979 | Japan . |
| 5,206,087 | 4/1993 | Tokiwa et al. . | 55-37407 | 3/1980 | Japan . |
| 5,208,267 | 5/1993 | Neumann et al. . | 55-100256 | 7/1980 | Japan . |
| 5,221,435 | 6/1993 | Smith, Jr. . | 56-17965 | 2/1981 | Japan . |
| 5,224,595 | 7/1993 | Sugimoto et al. . | 58-120555 | 7/1983 | Japan . |
| 5,232,496 | 8/1993 | Jennings et al. . | 60-260484 | 12/1985 | Japan . |
| 5,240,561 | 8/1993 | Kaliski . | 60-264375 | 12/1985 | Japan . |
| 5,248,702 | 9/1993 | Neumann et al. . | 62-36055 | 2/1987 | Japan . |
| 5,252,271 | 10/1993 | Jeffs . | 62-36056 | 2/1987 | Japan . |
| 5,256,711 | 10/1993 | Tokiwa et al. . | 62-39204 | 2/1987 | Japan . |
| 5,258,430 | 11/1993 | Bastioli et al. . | 62-46941 | 2/1987 | Japan . |
| 5,262,458 | 11/1993 | Bastioli et al. . | 62-151304 | 7/1987 | Japan . |
| 5,264,030 | 11/1993 | Tanabe et al. . | 62-253407 | 11/1987 | Japan . |
| 5,264,080 | 11/1993 | Shaw et al. . | 63-123851 | 5/1988 | Japan . |
| 5,266,368 | 11/1993 | Miller . | 63-210082 | 8/1988 | Japan . |
| 5,268,187 | 12/1993 | Quinlan . | 63-218589 | 9/1988 | Japan . |
| 5,269,845 | 12/1993 | Grunau et al. . | 63-248759 | 10/1988 | Japan . |
| 5,272,181 | 12/1993 | Boehmer et al. . | 63-310780 | 12/1988 | Japan . |
| 5,273,821 | 12/1993 | Olson et al. . | 64-37478 | 2/1989 | Japan . |
| 5,275,774 | 1/1994 | Bahr et al. . | 2-51460 | 2/1990 | Japan . |
| 5,277,762 | 1/1994 | Felegi, Jr. et al. . | 2-141484 | 5/1990 | Japan . |
| 5,277,764 | 1/1994 | Johansson et al. . | 2-190304 | 7/1990 | Japan . |
| 5,278,194 | 1/1994 | Tickner et al. . | 3-80141 | 4/1991 | Japan . |
| 5,279,658 | 1/1994 | Aung . | 3-153551 | 7/1991 | Japan . |
| 5,284,672 | 2/1994 | Ito . | 3-187962 | 8/1991 | Japan . |
| 5,288,318 | 2/1994 | Mayer et al. . | 3-202310 | 9/1991 | Japan . |
| 5,288,765 | 2/1994 | Bastioli et al. . | 3-202313 | 9/1991 | Japan . |
| 5,290,350 | 3/1994 | Besnard et al. . | 3-208847 | 9/1991 | Japan . |
| 5,290,355 | 3/1994 | Jakel . | 4-70304 | 3/1992 | Japan . |
| 5,294,299 | 3/1994 | Zeunner et al. . | 5-230401 | 12/1993 | Japan . |
| 5,298,273 | 3/1994 | Ito . | 6-32386 | 2/1994 | Japan . |
| 5,300,333 | 4/1994 | Wilkerson et al. . | 9100590 | 11/1992 | Netherlands . |
| 5,308,879 | 5/1994 | Akamatu et al. . | 453555 | 10/1936 | United Kingdom . |
| 5,314,754 | 5/1994 | Knight . | 490820 | 8/1938 | United Kingdom . |
| 5,316,624 | 5/1994 | Racine . | 1584387 | 2/1981 | United Kingdom . |
| 5,317,037 | 5/1994 | Golden et al. . | 2086748 | 5/1982 | United Kingdom . |
| 5,317,119 | 5/1994 | Ayres . | 2050459 | 6/1983 | United Kingdom . |
| 5,320,669 | 6/1994 | Lim et al. . | 2192392 | 1/1988 | United Kingdom . |
| 5,338,349 | 8/1994 | Farrar . | 2208651 | 4/1989 | United Kingdom . |
| 5,340,558 | 8/1994 | Friedman et al. . | 2214516 | 9/1989 | United Kingdom . |
| 5,346,541 | 9/1994 | Goldman et al. . | 2220934 | 1/1990 | United Kingdom . |
| 5,354,424 | 10/1994 | Rha et al. . | 2265916 | 10/1993 | United Kingdom . |
| 5,360,586 | 11/1994 | Wyatt et al. . | WO 87/00828 | 2/1987 | WIPO . |
| 5,362,776 | 11/1994 | Barenberg et al. . | WO 89/02225 | 3/1989 | WIPO . |
| 5,362,777 | 11/1994 | Tomka . | WO 91/12186 | 8/1991 | WIPO . |
| 5,372,877 | 12/1994 | Kannankeril . | WO 92/04408 | 3/1992 | WIPO . |
| 5,411,639 | 5/1995 | Kurrie . | WO 93/01242 | 1/1993 | WIPO . |
| 5,500,089 | 3/1996 | Huang et al. . | WO 94/18384 | 8/1994 | WIPO . |
| 5,506,277 | 4/1996 | Griesbach, III . | WO 94/18388 | 8/1994 | WIPO . |
| 5,512,090 | 4/1996 | Franke . | | | |
| 5,512,378 | 4/1996 | Bastioli . | | | |

OTHER PUBLICATIONS

Andersen, Control and Monitoring of Concrete Production; A Study of Particle Packing and Rheology, The Danish Academy of Technical Sciences (1990).

Andersen, Effect of Organic Superplasticizing Admixtures and Their Components on Zeta Potential and Related Properties of Cement Materials, Pennsylvania State University (1987).

Andersen, Effects of W/C–Ratio and Dispersion on the Pore Size Distribution of Cement Paste and Concrete, Paper prepared for MRL by Per Just Andersen (Aug. 1988).

Andersen, Rheology of Cement Paste, Mortar and Concrete (no date).

Andersen, et al., Tailoring of Cement–Bound Materials By the Use of Packing and Rheological Models American Ceramic Society (1988).

Andersen, Tailoring of Concrete Materials, R&H Annual Review (1988).

Ashby, Materials Selection in Engineering Design, Indian Journal of Technology, vol. 28, 217–225 (Jun.–Aug. 1990).

Ashby, Overview No. 80: On the Engineering Properties of Materials, Acta Metall, vol. 37, No. 5, 1273–1293 (1989).

Attwood, Paperboard, The Wiley Encyclopedia of Packaging Technology 500–506 (Marilyn Bakker ed., 1986).

Bach, Cement–Based Products Processed the Plastics Way. (no date).

Bache, Densified Cement/Ultra–Fine Particle–Based Materials, Presented at the Second International Conference on Superplasticizers in Concrete, Ottawa, Ontario, Canada (Jun. 10–12, 1981).

Bailey and Higgins, Flexural Strength of Cements, Nature, vol. 292, (Jul. 2, 1981).

Bajza, On The Factors Influencing the Strength of Cement Compacts, Cement and Concrete Research, vol. 2, 67–78 (1972).

Balaguru and Kendzulak, Flexural Behavior of Slurry Infiltrated Fiber Concrete (SIFCON) Made Using Condensed Silica Fume. (no date).

Bardsley, Horizontal Form/Fill/Seal, The Wiley Encyclopedia of Packaging Technology, pp. 364–367, (1986).

Baum, et al., Paper, Kirk–Othmer Concise Encyclopedia of Chemical Technology, 834–836 (Martin Grayson ed., 1985).

Bemis Co., Inc., Paper Bags, The Wiley Encyclopedia of Packaging Technology, pp. 36–39, (1986).

Benbow, et al., The Extrusion Mechanics of Pastes—The Influence of Paste Formulation on Extrusion Parameters, Chemical Engineering Science, vol. 42, No. 9, 2151–2162 (1987).

Berg and Young, Introduction to MDF Cement Composites, Cementing the Future, ACBM, vol. 1, No. 2 (Fall 1989).

Berger, et al., Acceleration of Hydration of Calcium Silicates by Carbon Dioxide Treatment, Nature Physical Science, vol. 240 (Nov. 6, 1972).

Blaha, Ideas in Concrete, Concrete Procucts (Sep. 1992).

Bohrer, Folding Cartons, The Wiley Encyclopedia of Packaging Technology, pp. 146–152, (1986).

Bousum, Beverage Carriers, The Wiley Encyclopedia of Packaging Technology, pp. 129–132, (1986).

Brady, et al., Materials Handbook, 588–594 (1991).

Brown, et al., An Investigation of a High Speed Shear Mixer on Selected Pastes and Mortars, Materials Research Society Symp. Proc., vol. 137 (1989).

Bukowski and Berger, Reactivity and Strength Development of $CO_2$ Activated Non–Hydraulic Calcium Silicates, Cement and Concrete Research, vol. 9, 57–68 (1979).

Clauson–Kaas, et al., Ekstrudering af Fiberbeton–delrapport, Teknologisk Institut, Byggeteknik, (Jan. 1987). English Translation: Clauson–Kaas, et al., Extrusion of Fiber Concrete–Interim Report, Department of Building Technology, Technological Institute of Denmark.

Clauson–Kaas, Opsprøjtet Glasfiberbeton i Byggeriet, Teknologisk Institut, Byggeteknik, (1987) (No translation).

Collepardi, et al., Combined Effect of Lignosulfate and Carbonate on Pure Portland Clinker Compounds Hydration. I: Tetracalcium Aluminoferrite Hydration, Cement and Concrete Research, vol. 10, pp. 455–462, (1980).

Collepardi, et al., Influence of Polymerization of Sulfonated Naphthalene Condenate and Its Interaction With Cement, SP 68–27. (no date).

Davidson and Sittig, Water–Soluble Resins, New York: Reinhold Publishing Corp., Chapman & Hall, Ltd., London, (1962).

Devlin et al., Waxes, The Wiley Encyclopedia of Packaging Technology, pp. 697–700, (1986).

Dow Plastics, Thermoforming Process Guide (no date).

Eriksen and Andersen, Foam Stability Experiments on Solutions Containing Superplasticizing and Air–Entraining Agents for Concrete, The Technological Institute, Department of Building Technology, Taastrup, Denmark (1985).

Eubanks, Cans, Composites, The Wiley Encyclopedia of Packaging Technology, pp. 94–98, Marilyn Bakker ed., (1986).

Ferretti, Distributed Reinforcement Concrete Pipes: An Innovative Product, Concrete International, (May 1993).

Fördös, Natural or Modified Cellulose Fibres As Reinforcement in Cement Composites, Concrete Technology and Design, vol. 5, Natural Fiber Reinforced Cement and Concrete (1988).

Greminger, Jr., and Krumel, Alkyl and Hydroxyalkylalkylcellulose, Dow Chemical U.S.A., Midland, Michigan. (no date).

Gresher, Carded Packaging, The Wiley Encyclopedia of Packaging Technology, pp. 124–129, (1986).

Gross et al., Flexible Packages, Modern Packaging Encyclopedia and Planning Guide, Second Edition, (1972).

Gross et al., Labeling and Printing, Modern Packaging Encyclopedia and Planning Guide, Second Edition, (1972).

Gross et al., Materials, Modern Packaging Encylopedia and Planning Guide, Second Edition, (1972).

Gross et al., Rigid and Semirigid Containers: Introduction To Paperboard Containers, Modern Packaging Encyclopedia and Planning Guide, Second Edition, (1972).

Gross et al., Shipping and Protection, Modern Packaging Encyclopedia and Planning Guide, Second Edition, (1972).

Hanlon, Fibre Tubes, Cans and Drums, Handbook of Package Engineering, Second Edition, McGraw–Hill & Co., New York, (1984).

Hewlett, Physico–Chemical Mechanisms of Admixtures, Lecture, CGLI Advanced Concrete Technology Course, Cement and Concrete Association Training Center, (May 1, 1975).

Hlaváč, The Technology of Glass and Ceramics , Glass Science and Technology, 4: The Technology of Glass and Ceramics, Elsevier Publishing (1983).

Hyland, F–Flute Inches Its Way Into Folding Carton Market, Paperboard Packaging, 28–29 (May 1993).

Iler, The Chemistry of Silica: Solubility, Polymerization, Colloid and Surface Properties and Biochemistry, pp. 430–433, John Wiley & Sons, (1979).

Johansen and Andersen, Particle Packing and Concrete Properties, Materials Science of Concrete II, 111–147. (no date).

Jones and Berard, Raw Materials Processing, *Ceramics: Industrial Processing and Testing*, Iowa State University Press (1972).

Kaye, Adhesives, *The Wiley Encyclopedia of Packaging Technology*, pp. 14–16, (1986).

Klieger, Studies of the Effect of Entrained Air on the Strength and Durability of Concretes Made with Various Maximum Sizes of Aggregate, Research and Development Laboratories of the Portland Cement Association, (Oct. 1952).

Kline, Corrugating Operations and Raw Materials, *Paper and Paperboard: Manufacturing and Converting Fundamentals*, 184–195, 2nd ed., Miller Freeman Publications, Inc. (1991).

Kline, Packaging, *Paper and Paperboard: Manufacturing and Converting Fundamentals*, 2nd ed., Miller Freeman Publications, Inc., 196–211, (1991).

Kline, Paperboard and Properties, *Paper and Paperboard Manufacturing and Converting Fundamentals*, 19–28, 2nd ed., (1982).

Knab, et al., Effects of Maximum Void Size and Aggregate Characteristics on the Strength of Motar, *Cement and Concrete Research*, vol. 13, 383–390 (1983).

Knudsen, On Particle Size Distribution in Cement Hydration, Presented to the 7th International Congress on the Chemistry of Cement, Paris (1980).

Kohn and Jowitt, Cans Fabrication, The Wiley Encyclopedia of Packaging Technology, 100–108, Marilyn Bakker ed., (1986).

Laenger, Designing An Extruder With Allowance for the Properties of Ceramic Extrusion Compounds—Part 1, cfi/Ber. DKG67, No. 4, (1990).

Laenger, Extruderauslegung unter Berücksichtingung der Merkmale keramischer Arbeitsmassen, cfi/Ber. DKG 68, No.9, (1991). Engish translation: Designing An Extruder With Allowance for the Properties of Ceramic Extrusion Compounds, Part 2a, (1991).

Laenger, Extruderauslegung unter Berïcksichtingung der Merkmale keramischer Arbeitsmassen, cfi/Ber. DKG 68, N0. 10/11, (1991). English translation: Designing An Extruder With Allowance for the Properties of Ceramic Extrusion Compounds—Part 2b, (1991).

Laenger, Extruderauslegung unter Berïcksichtingung der Merkmale keramischer Arbeitmassen, cfi/Ber. DKG 69, No. 3, (1992). Laenger, Designing An Extruder With Allowance for the Properties of Ceramic Extrusion Compounds—Part 3,, cfi/Ber. DKG 69, No. 3 (1992).

Laenger, Extruderauslegung unter Berïcksichtingung der Merkmale keramischer Arbeitsmassen, cfi/Ber. DKG 69, No. 7/8, (1992). Laenger, Designing An Extruder With Allowance for the Properties of Ceramic Extrusion Compounds —Part 4a, cfi/Ber. DKG 69, No. 7/8 (1992).

Laenger, Extruderauslegung unter Berïcksichtingung der Merkmale keramischer Arbeitsmassen, cfi/Ber. DKG 69, No. 9, (1992). Laenger, Designing An Extruder With Allowance for the Properties Ceramic Extrusion Compounds—Part 4b, cfi/Ber. DKG 69, No. 9, (1992).

Laenger, Extruderausiegung unter Berücksichingung der Merkmale keramischer Arbeitsmassen, cfi/Ber. DKG 69, No. 10, (1992). Laenger, Designing An Extruder With Allowance for the Properties of Ceramic Extrusion Compounds–13 Part 5a, cfi/Ber. DKG 69, No. 10, (1992).

Laenger, Extruderauslegung unter Berücksichtingung der Merkmale keramischer Arbeitsmassen, cfi/Ber. DKG 70, No. 3, (1993). Laenger, Designing An Extruder With Allowance for the Properties of Ceramic Extrusion Coupounds—Part 5b, cfi/Ber. DKG 70, No. 3, 1993.

Lavin, Cans, Composite, Self–manufactured, *The Wiley Encyclopedia of Packaging Technology*, Marilyn Bakker ed., (1986).

Lawrence, The Properties of Cement Paste Compacted Under High Pressure: Research Report 19, *Cement and Concrete Association Research*, Jun. 1969).

Leaversuch, Blowing Agents: Products Minimize Tradeoffs as CFC Phase–out Takes Effect, *Modern Plastics*, (Sep. 1993).

Lecznar and Barnoff, Strength of Neat Cement Pastes Molded Under Pressure, *Journal of the American Concrete Institute*, Concrete Briefs, (Feb. 1961).

Lentz, Printing, *The Wiley Encyclopedia of Packaging Technology*, 554–559., (1986).

Lewis and Kriven, Microstructure–Property Relationships in Macro–Defect–Free Cement, MRS Bulletin (Mar. 1993).

Lewis, Sr., *Condensed Chemical Dictionary*, 870 (12th ed. 1993).

Lisiecki, Gabletop Cartons, *The Wiley Encyclopedia of Packaging Technology*, pp. 152–154, (1986).

Litvan and Sereda, Particulate Admixture for Enhanced Freeze–Thaw Resistance of Concrete, *Cement and Concrete Research*, vol. 8, 53–60, Pergamon Press, Inc. (1978).

Lynch et al., Rigid–Paperboard Boxes, *The Wiley Encyclopedia of Packaging Technology*, pp. 76–79, (1986).

Manson, et al., Use of Polymers in Highway Concrete, National Cooperative Highway Research Program Report 190, Transportation Research Board of the National Research Council, (1978).

Maries, The Activation of Portland Cement by Carbon Dioxiode. (no date).

Mass, Premixed Cement Paste, *Concrete International*, (Nov. 1989).

Maycock and Skalny, Carbonation of Hydrated Calcium Silicates, *Cement and Concrete Research*, vol. 4, 69–76 (1974).

Miyake et al., Superplasticized Concrete Using Refined Lignosulfonate and its Action Mechanism, *Cement and Concrete Research*, vol. 15, No. 2, 295–302 (1985).

Moyer, Vertical Form/Fill/Seal, *The Wiley Encyclopedia of Packaging Technology*, pp. 367–369, (1986).

Naaman and Homrich, Tensile Stress–Strain Properties of SIFCON, *ACI Materials Journal* (May–Jun. 1989).

Niël, Supplementary Paper II–117. The Influence of Alkali–Carbonate on the Hydration of Cement (1968).

Purton, The Effect of Sand Grading On The Calcium Silicate Brick Reaction, *Cement and Concrete Research*, vol. 4, 13–29 (1974).

Putnam et al., Papermaking Additives, Kirk–Othmer Concise Encyclopedia of Chemical Technology, 836–837 (Martin Grayson ed., 1985).

Radek, Closure Liners, *The Wiley Encyclopedia Packaging Technology*, 171–172, Marilyn Bakker ed., (1986).

Reingold, Cans, Steel, *The Wiley Encyclopedia Packaging Technology*,, 109–118, Marilyn Bakker ed., (1986).

Robinson, Extrusion Defects, *Structures Produced by Extrusion*, 391–407./no date).

Rosenberg and Gaidis, A New Mineral Admixture for High–Strength Concrete–Proposed Mechanism for Strength Enhancement, Second International Conference on the Use of Fly Ash, Silica Fume, Slag and Natural Pozzoplans in Concrete, Madrid, Spain (Apr. 21–25, 1986).

Roy, New Strong Cement Materials: Chemically Bonded Ceramics, *Science*, vol. 235–6 (Feb. 6, 1987).

Roy, et al., Processing of Optimized Cements and Concretes Via Particle Packing, MRS Bulletin (Mar. 1993).

Roy et al., Very High Strength Cement Pastes Prepared by Hot Pressing and Other High Pressure Techniques, *Cement and Concrete Research*, vol. 2, 349–366 (1972).

Satas, Equipment Coating, *The Wiley Encyclopedia of Packaging Technology*, pp. 186–191, (1986).

Sciaudone, Rigid–Plastic Boxes, *The Wiley Encyclopedia of Packaging Technology*, pp. 78–79, (1986).

Sequa Chemicals, Inc., Technical Data, Sunrez® 700 Series Insolubilizers Coating Additive (no date).

Shilstone, Sr., Concrete Mixture Optimization by Coarseness Factor, Mortar Factor & Particle Distribution, Report for American Concrete Institution Convention, San Diego, California, U.S.A. (no date).

Shilstone, Sr., Mix Temperature and $$$$$, *Concrete Producer News*, (Oct. 1989).

Shilstone, Sr., Mixture Optimization for Fast–Track, Report for Transportation Research Board 69th Annual Meeting. (no date).

Sievers, Chub Packaging, *The Wiley Encyclopedia of Packaging Technology*, pp. 170–171, (1986).

Sikora, Paper, *The Wiley Encyclopedia of Packaging Technology*, 497–500 (Marilyn Bakker ed., 1986).

Skalny and Bajza, Properties of Cement Pastes Prepared by High Pressure Compaction, *ACI Journal*, Title No. 67–11, (Mar. 1970).

Skalny, et al., Low Water to Cement Ratio Concretes, *Cement and Concrete Research*, vol. 3, 29–40 (1973).

Soroushian et al., Recycling of Wood and Paper in Cementitious Materials, *Materials Research Society Symposium Proc.*, vol. 266, (1992).

Staley Starch and Specialty Products Group, Technical Data. Sta–Lok® 400 Cationic Potato Starch, (no date).

Stix, Concrete Solutions, *Scientific American* (Apr. 1993).

Strabo, et al., Cementbaserede Hybridkompositter, Teknologisk Institut, Byggeteknik, TR–Projekt 1985–133/177–85.533 (1987). English translation –Strabo, et al. . ., Cement–Based Hybrid Composites, Technological Institute of Denmark, Department of Building Technology, TR–Project 1985–133/177–85.533 (1987).

Strabo, et al., Fiberbeton Teknologi, Teknologisk Institut, Byggeteknik, TR–Projekt 133/117–82.042 (1986). English translation –Strabo, et al., Fiber Concrete Technology, Technological Institute of Denmark, Department of Building Technology, TR–Project 133/117–82.042 (1986).

Strabo, et al., Ekstrudering af Fiberbeton, Teknologisk Institut, Byggeteknik, TR–Projekt 1985–133/177–85.538 (Oct. 1987). English translation –Strabo, et al., Extrusion of Fiber Concrete, Danish Technological Institute, Department of Building Technology, TR–Project 1985–133/177–85.538 (Oct. 1987).

Strabo, et al., Nye Formgivningsmetoder til Fiberbeton, Teknologisk Institut, Byggeteknik, TR–Projekt 1984–133/117–84.028 (Apr. 1987). English translation –Strabo, et al., New Design Methods for Fiber Concrete, Technological Institute of Denmark, Department of Building Technology, TR–Project 1984–133/117–84.028 (Apr. 1987).

Studt, New Advances Revive Interest In Cement–Based Materials, *R&D Magazine* (Nov. 1992).

Sun et al., The Composition of Hydrated DSP Cement Pastes. (no date).

Sutherland, Air–Entrained Concrete, *Cement and Concrete Association*, (1970).

Suzuki, et al., Formation and Carbonation of C–S–H In Water, *Cement and Concrete Research*, vol. 15, 213–224 (1985).

Swec, Corrugated Boxes, *The Wiley Encyclopedia of Packaging Technology*, pp. 66–76, (1986).

Swientek, Formidable Films, *Prepared Foods*, 118–121 (Sep. 1993).

Unwalla, et al., Recycled Materials for Making Concrete, *The Concrete Journal*, vol. 53, No. 9 (Sep. 1979).

Verbeck, Carbonation of Hydrated Portland Cement, Cement and Concrete, *Special Technical Publication No. 203*, American Society for Testing Materials, (1958).

Vrana, Khashoggi Kin Reported Planning Private Placement of Shares in New Container Firm, *Los Angeles Business Journal*, (Mar. 28, 1993).

Wagner, Polymer Modification of Portland Cement Systems, *Chemtech* (Feb. 1973).

Weinrich, German Comes Up With Recycled Product to Replace Foam Chips (no date).

Weiss, et al., High Tensile Cement Pastes as a Low–Energy Substitute for Metals, Plastics, Ceramics, and Wood. Phase I: Preliminary Technological Evaluation, CTL Project CR7851–4330, Final Report Prepared for U.S. Dept. of Energy (Nov. 1984).

Westman and Hugill, The Packing of Particles (1930).

Young, Macro–Defect–Free Cement: A Review, *Materials Research Society Symposium Proc.*, vol. 179, (1991).

Yundenfreund, et al., Hardened Portland Cement Pastes of Low Porosity II: Exploratory Studies, Dimensional Changes, *Cement and Concrete Research*, vol. 2, 331–348 (1972).

Yudenfreund, et al., Hardened Portland Cement Pastes of Low Porosity, V: Compressive Strength, *Cement and Concrete Research*, vol. 2, 731–743 (1972).

Zeneca., Biopol. Nature's Plastic–Born from Nature, Back to Nature (no date).

Zukoski and Struble, Rheology of Cementitious Systems, *MRS Bulletin* (Mar. 1993).

Cementing the Future: A New Extrusion Technology, *ACBM*, vol. 6, No. 1 (Spring 1994).

Doing More With Less: Optimizing Concrete Mix, *Better Roads*, (Aug. 1990).

Fiberbeton –nyt, Teknologisk Institut, Byggeteknik, Blad nr. 1 (Oct. 1987). English translation –Fiber Concrete News, The Technological Institute of Denmark, Department of Building Technology, Pamphlet No. 1 (Oct. 1987).

Nye Metoder i Beton Kan Betyde Teknisk Knock–out For Plast (1986). English Transltation –New Method for Concrete May Mean Technical Knock–Out for Plastic, *The Engineer*, No. 14 (1986).

Plastic–Forming Processes. (no date).

Report of the Panel on Solids Processing. (no date).

Space–Age Concrete That May Sub for Steel. (no date).

Starch Foam Dishes at Burger King's, Biomat 32–Production Unit for Natural Packaging. (no date).

The Coating Process for Paper (1993).

The Colcrete Process: Its History, Advantages, and Applications, (Undated Publication).

Zien In The Food Industry, Freeman Industries, Inc. (no date).

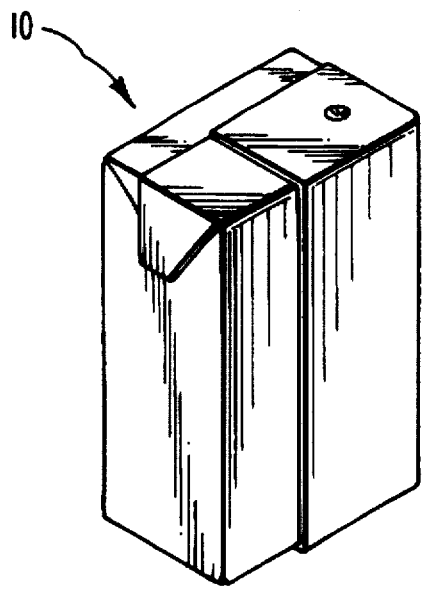
FIG. 10A
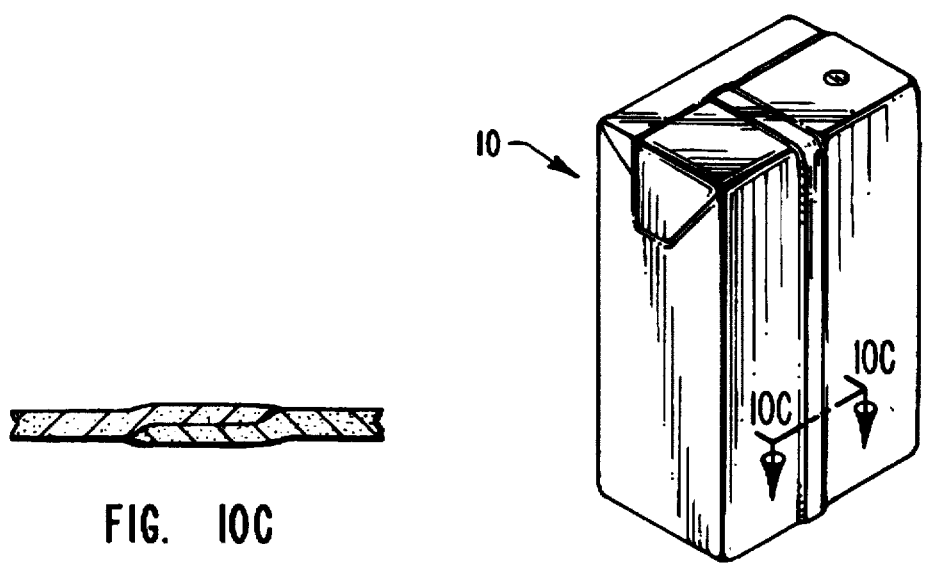
FIG. 10C
FIG. 10B

COMPOSITIONS AND METHODS FOR MANUFACTURING SEALABLE, LIQUID-TIGHT CONTAINERS COMPRISING AN INORGANICALLY FILLED MATRIX

RELATED APPLICATIONS

This application is a continuation-in-part of copending application Ser. No. 08/631,676, entitled "Methods for Manufacturing Molded Sheets Having a High Starch Content, and filed Apr. 9, 1996, in the names of Per Just Andersen, Ph.D., Shaode Ong, Ph.D., Bruce J. Christensen, Ph.D., and Simon K. Hodson (pending); and also a continuation-in-part of application Ser. No. 08/353,543, entitled "Methods and Systems for Manufacturing Articles Having a Starch-Bound Cellular Matrix Reinforced with Uniformly Dispersed Fibers", and filed Dec. 9, 1994, in the names of Per Just Andersen, Ph.D. and Simon K. Hodson, now U.S. Pat. No. 5,683,772; and also a continuation-in-part of copending application Ser. No. 08/288,667, entitled "Methods and Systems for Manufacturing Containers and Other Articles Having an Inorganically Filled, Starch-Based Cellular Matrix", and filed Aug. 9, 1994, in the names of Per Just Andersen, Ph.D. and Simon K. Hodson (pending); and also a continuation-in-part of application Ser. No. 08/218,967, entitled "Articles of Manufacture Molded from Inorganically Filled Compositions", and filed Mar. 25, 1994, in the names of Per Just Andersen, Ph.D. and Simon K. Hodson, now issued as U.S. Pat. No. 5,545,450; and also a continuation-in-part of application Ser. No. 08/158,824, entitled "Articles of Manufacture Fashioned From Sheets Having a Highly Inorganically Filled Organic Polymer Matrix", and filed Nov. 24, 1993, in the names of Per Just Andersen, Ph.D. and Simon K. Hodson, now U.S. Pat. No. 5,506,046; and also a continuation-in-part of application Ser. No. 08/105,851, entitled "Sealable Liquid-Tight, Thin-Walled Containers Composed of Hydraulically Settable Materials and Methods for Manufacturing Such Containers", and filed Aug. 10, 1993, in the names of Per Just Andersen, Ph.D. and Simon K. Hodson, now U.S. Pat. No. 5,543,186. For purposes of disclosure, the foregoing applications are incorporated by specific reference.

BACKGROUND OF THE INVENTION

1. The Field of the Invention

The present invention relates to sealable liquid-tight and pressure-tight, thin-walled containers for storing and dispensing substances, such as liquids. More particularly, the present invention discloses the manufacture of sealable liquid-tight and pressure tight containers having a highly inorganically filled structural matrix. The structural matrix includes mineral fillers, such as naturally occurring limestone, mica, silica, and clay, that are bound together by means of a water-dispersible organic binder; the structural matrix is preferably reinforced with fibers.

2. The Related Technology

A. Sealable Liquid-tight and Pressure-tight Containers

Conventional sealable liquid-tight and pressure-tight containers (hereinafter "containers") can be made to have a wide variety of structural configurations and can be made from many different materials. Such sealable containers include cans, bottles, jars and cartons formed from metals, glass, plastics and paper composites.

Containers are generally utilized for holding or storing a wide variety of substances, such as beverages, food products, or household liquids or powders. Examples of beverages include carbonated beverages, alcoholic beverages and noncarbonated beverages, such as fruit juices, milk and water. Food products include any food that can be, e.g., sealed suspended in a liquid or sealed in a dry condition. Liquids used to package food products include water, oil, aqueous solutions, and the like. Examples of household products and other substances which can be sealed within pressurized containers include aerosols, deodorants, perfume, cosmetics, cleansers, oils, lubricants, and paints.

A key factor in the design and evolution of containers which are sealable, liquid-tight and/or pressure-tight is the ability of the container to act as an impermeable barrier to liquids and gases stored within the container and as an impermeable barrier for the protection of the stored liquids and gases from materials that might come in contact with the exterior of the container.

Additionally, such containers must typically be able to withstand a differential in pressure between the interior and exterior of the container. Pressure differentials are created by sealing substances within containers which exert pressure, such as carbonated beverages, sealing substances under a positive pressure, sealing substances under a vacuum pressure, sealing substances without pressure and subsequently subjecting the substances to a temperature change or an alteration of a chemical equilibrium, and due to compression from handling or stacking the containers.

Other significant factors in the design of sealable, liquid-tight and pressure-tight containers are strength, toughness, weight, adequate protection of the stored substances, economics, safety, and, more recently, environmental concerns. Adequate protection of the stored substances includes the ability of the containers to protect substances from ingress of liquids or gases, light, microorganisms, vermin, physical shock, crushing forces, vibration, leaking, or spilling. The containers must not impart or leach foreign materials into the contained substances. The containers must also be chemically resistant or inert in relation to the contained substances. Most containers utilize a coating or liner to insure that the substances receive adequate protection, with the exception of glass containers. The disadvantage of glass containers, however, is that they are very brittle, which necessitates thick and heavy walls to provide the requisite toughness to prevent shattering.

Conventional containers have generally proven adequate in providing the foregoing packaging criteria. Recently, however, many packaging materials have come under close scrutiny on the basis of their environmental impact. In spite of grave environmental concerns, however, many packaging materials continue to be used due to the lack of adequate substitutes, both in terms of cost and in mechanical performance.

B. Environmental and Economic Impact of Conventional Containers

Containers manufactured from metals, glass, plastics and paper composites (hereinafter "conventional materials") negatively impact the environment in a variety of ways, such as in obtaining the necessary raw materials, processing the raw materials, manufacturing the containers, disposing of used containers, and even in the recycling process. The primary raw materials used in the manufacture of conventional containers originate from, e.g., metal ores, particularly aluminum, tin and lead, petroleum products and wood. To obtain the necessary raw materials, it has been routine to disturb ecosystems throughout the world, which has resulted in erosion and disruption of natural environmental cycles and relationships. Additionally, many of the raw materials utilized in the manufacture of conventional containers are derived from nonrenewable resources. Processing raw materials such as metal ores, petroleum products, and wood also results in pollution to the air, water and soil.

Another problem associated with conventional containers is their disposal. The impact of depositing disposable containers within municipal waste disposal systems throughout the country has been overwhelming. Further, the litter originating from used containers is also a significant problem. The disposal and litter problems have prompted some European countries to ban the use of containers made from aluminum and polystyrene foam altogether. Recycling has been somewhat effective in reducing the sheer volume of disposed conventional containers. However, recycling only partially counters the problems of disposal and litter. Disadvantages of recycling some containers made from conventional materials include the need for sorting, transporting, and additional processing, which further impacts the environment. Often, the recycling process creates more pollution and utilizes even more energy than the original manufacture of virgin containers.

C. Inorganic Materials

Historically, inorganic materials such as clay and cements have been used to make a variety of articles or structures. The advantage of such materials is that they are fairly environmentally innocuous in that they essentially comprise minerals that are found naturally within the earth. Clay has been widely used in many civilizations in the manufacture of ceramic containers, such as pots, cups, vases, etc. Most clay or earthenware products have adequate strength and chemical inertness for their intended use. However, although clay is essentially an inexhaustible and very inexpensive substance found in the earth, its use has been limited to the manufacture of fired and usually glazed articles that are sintered in a kiln. Ceramics based on clay tend to be very strong, stiff, relatively thick-walled, and resistant to degradation. However, compared to the wide variety of inexpensive and disposable containers used to store and dispense liquids and solids, clay earthenware and pottery are comparatively very heavy and bulky. As a result, although relatively inexpensive and adequately weighted for most intended uses, such as coffee mugs, vases, long-term storage vessels, and the like, clay products are rarely, if ever, used in massive quantities as a disposable container. Moreover, once fired, clay ceramics are very resistant to degradation short of mechanical pulverization. For most intended uses of ceramic products this quality is very desirable. However, in terms of post-use environmental impact, the resistance of clay ceramics to breakdown is a negative feature.

Another widely used inorganic material is concrete, which comprises a hydraulically settable binder, such as portland cement, and aggregate fillers, which increase the strength and greatly decrease the cost of concrete. However, concrete and other cementitious materials have had little use in the manufacture of anything other than large structural components, such as sidewalks, curbs, walls, and roads. As a result, although generally environmentally sound, cementitious materials have heretofore not been commercially manufactured into containment products other than very large structures, such as coffins, troughs, or urns. Cementitious materials have not been commercially exploited in the manufacture of disposable packaging materials, such as sealable, liquid-tight and/or pressure-tight containers, although their use in the manufacture of food and beverage containers has been described in U.S. Pat. No. 5,385,764 and their use in the manufacture of general packaging containers has been described in U.S. Pat. No. 5,453,310.

In spite of the foregoing limitations of clay ceramic and cementitious materials, if highly inorganically filled compositions could be used to manufacture thin-walled, lightweight containers that were sealable, liquid-tight and/or pressure-tight, the substitution of such containers for conventional containers would be expected to greatly diminish the environmental impact of such containers, both in the manufacture and disposal of such containers. Because such compositions as well as containers manufactured therefrom would constitute primarily a natural mineral filler, such as naturally occurring limestone, mica, silica, sand, or clay, their manufacture would greatly diminish the environmental impact of raw material procurement. In addition, they would degrade into natural components found in the earth. In addition, if such highly inorganically filled containers could be manufactured in such a way that they were thin-walled and lightweight, they would occupy far less volume upon being disposed compared to clay or earthenware.

In light of the foregoing, what are needed are improved compositions and methods for manufacturing containers having a high inorganic mineral content which would greatly reduce the environmental impact caused by the manufacture of conventional packaging containers.

It would be a novel advancement in the container art to provide compositions and methods for manufacturing containers that have a chemical composition more compatible with the earth into which they eventually might be discarded compared to conventional packaging containers.

It would also be a significant improvement in the art if such compositions and methods resulted in a reduction in the cost of mass-producing sealable liquid-tight or pressure-tight containers.

It would yet be an advancement in the art to provide compositions and methods for manufacturing containers having a high inorganic mineral content that have mechanical properties similar, or even superior, to conventional containers made from, e.g., metals, glass, plastics, or paper.

It would further be a significant improvement in the art to provide novel compositions and methods for manufacturing environmentally sound containers having a high natural mineral content that had sufficient strength and impermeability to gases and liquids such that they could withstand a pressure differential between the interior and exterior of the container.

Still, it would be an advancement in the art to provide compositions having a relatively high content of natural mineral fillers that nevertheless could be manufactured into containers having relatively low mass and thin walls compared to conventionally manufactured clay ceramics.

In addition, it would be a further advancement in the art if such containers could readily degrade when exposed to water or other degradation forces typically encountered by disposable packaging containers.

Such compositions and methods for manufacturing a wide variety of liquid-tight and/or pressure-tight containers are disclosed and claimed herein.

BRIEF SUMMARY AND OBJECTS OF THE INVENTION

The present invention involves novel compositions and methods for manufacturing containers which are sealable, liquid-tight and/or pressure-tight, and thin-walled. The compositions and methods yield containers having a structural matrix that includes an inorganic mineral filler bound together by a water-dispersible organic binder. These form an inorganically filled, organically bound matrix, or an "inorganically filled matrix". Preferably, the inorganically filled matrix will be reinforced with fibers. The compositions and methods of the present invention allow for the mass-production of containers in an economically and environmental feasible manner.

The containers within the scope of the present invention are useful for packaging or storing a wide variety of substances, such as beverages, food products, household products and other substances, which are typically stored or packaged in conventional containers, such as cans, bottles, jars, boxes and cartons made from metals, glass, plastics, paper, or composites of the foregoing. Typical beverage products include carbonated beverages, alcoholic beverages, and noncarbonated beverages, such as fruit juices, milk and water. Typical food products include all foods that are sealed in conventional containers such as glass bottles, metal cans or paper cartons, either suspended in a liquid or stored in a dry condition. Liquids typically used to store food products include water, oil, aqueous solutions (such as sugar or salt solutions), and non-neutral solutions. Examples of household products and other substances typically stored in conventional containers include aerosols, deodorants, perfume, cosmetics, cleansers, oils, lubricants, and paints.

Properties generally considered desirable for sealable liquid-tight, pressure-tight and thin-walled containers include the ability to preserve and protect substances such that loss or alterations to the contained substances are minimized yet achieved in a manner which is inexpensive, environmentally benign and safe. These properties are achieved through the use of highly inorganically filled materials that can be economically and environmentally produced, both in the formation of the raw composition to be molded and during the molding process itself. The production of such containers is very economical due to the use of a relatively large amount of plentiful and very inexpensive inorganic fillers. In addition, the water-dispersible organic binders are used in far lesser quantities compared to similar containers made from, e.g., plastics, which greatly reduces the cost of the organic binder component. The same is true for the fibrous component. In addition, very inexpensive secondary fibers can be used and are often preferable to highly processed wood pulp fibers.

In addition, the disposal of such containers impacts the environment far less than conventional packaging material because they readily degrade into mineral components found naturally in the earth. The organic components, such as the water-dispersible organic binder and the fibers, impose a greatly diminished environmental impact compared to, e.g., paper or paperboard products due to their decreased use in the highly inorganically filled compositions of the present invention. In addition, the way in which the various components within the inorganically filled matrix are held together greatly facilitates breakdown of the organic components compared to similar components found in, e.g., paper or paperboard containers or other articles. Nevertheless, their breakdown can be controlled during the intended life-span of the inorganically filled container by means of coatings and/or laminates.

In general, the ability of containers to preserve and protect substances, such that loss or alterations to the contained substances are minimized, is related to the toughness and impermeability of the container and the chemical compatibility of the container with the enclosed substances. The toughness and impermeability are directly related to the tensile strength and porosity of the inorganically filled matrix of the container. The degree of toughness and impermeability needed in a particular container varies based on the type of substances to be stored, the manner in which they are to be stored, processes which may be performed on the containers after the substances have been sealed within the containers, subsequent handling, and other design requirements. Similarly, the design requirements for the chemical compatibility or nonreactivity are specific to the substances to be stored. The inorganically filled matrices of the containers of the present invention are uniquely suited for manufacturing containers with the optimal level of chemical compatibility and nonreactivity.

Moreover, the present invention allows for the manufacture of pressure-tight containers which have sufficient toughness and impermeability to withstand a pressure differential between the exterior and the interior of the container. A "pressure differential" exists when the pressures exerted on the interior and the exterior walls of the container are not equal. Pressure differentials can result from the type of substances stored, the manner in which substances are stored, as a result of processes used after substances are sealed within the container, or due to compression of the containers. Examples of how pressure differentials can occur include the storage of carbonated beverages within containers, sealing substances under pressure within containers, sealing substances under a vacuum within containers, varying the temperature of substances sealed within containers, altering the chemical equilibrium of substances sealed within containers, and compressing sealed containers such as by stacking and handling.

Additionally, the ability of containers to preserve and protect substances such that loss or alterations to the contained substances is minimized depends on the ability to design a container which is substantially impermeable to gases and liquids. This is largely a function of the porosity of the container. A substantially impermeable container permits minimal ingress of air, including nitrogen or oxygen, helps to prevent oxidation of contained substances, and minimizes the loss of carbonation or other desired pressure from within carbonated beverages or other pressurized liquids stored within the container. Preserving and protecting substances also requires that foreign flavors or other contaminating substances are not imparted by or through the container. It is often necessary that the container be able to withstand liquids having a non-neutral pH. It is also generally desirable for the containers to be light-weight, thin-walled, and inexpensive and safe to manufacture, transport and use.

The foregoing desired properties within the liquid-tight and pressure-tight containers of the present invention can be designed into the containers or altered as desired through a microstructural engineering approach. Microstructural engineering is the process of building into the microstructure of the inorganically filled matrix certain desired, predetermined properties by altering the identity and/or the amount of one or more of the components within the inorganically filled compositions used to form the final inorganically filled matrix. Utilizing this method, the desired properties can be designed into the microstructure of the matrix, while optimizing the cost and other aspects of the manufacturing system.

The result of the microstructural engineering approach is the ability to manufacture containers having a wide variety of properties possessed by greatly varying materials, such as metals, glass, plastics, and paper at a cost that is usually competitive with, and in most cases even superior to, the costs involved in the manufacture of conventional packaging materials. Moreover, because the containers of the present invention comprise environmentally benign components, the manufacture of such containers impacts the environment far less than the manufacture of conventional containers from metals, glass, plastics, and paper.

The major components within the compositions used to manufacture the containers of the present invention include inorganic filler materials (such as limestone, sand, calcite, bauxite, dolomite, granite, quartz, glass, silica, perlite, vermiculite, clay, and even waste concrete or other highly inorganically filled products), naturally occurring or derivitized water-dispersible organic binders (such as cellulosic ethers, starches, proteins, and the like), substantially homogeneously dispersed fibers (both organic and inorganic fibers), and a sufficient quantity of water necessary to disperse the components and interact with the organic binders. Upon removal of a substantial quantity of the water by evaporation, the water-dispersible organic binder develops a high level of binding strength, which translates into a considerable degree of tensile strength. In this manner, the inorganically filled matrix or structure of the container is formed. In addition, continuous fibers can be wrapped around or placed within a substantial portion of the inorganically filled matrix to further add tensile or bending strength to the container.

As long as the inorganically filled matrix is protected from moisture, it will remain adequately strong and resistant to breakdown. It will adequately perform its intended containment function. However, upon being exposed to appreciable amounts of moisture, the water-dispersible binder essentially dissolves or otherwise breaks down and loses its ability to bind the components together. At this point, the inorganically filled matrix is reduced to its constituent components. If discarded into the earth, the binder and fibers will quickly biodegrade, while the inorganic filler will simply return to the earth as it was first removed. Alternatively, the components can be recycled into new containers or other inorganically filled products as desired.

In order for the inorganically filled matrix of the inventive containers to be liquid-tight, it will generally be necessary to coat and/or laminate the inorganically filled matrix with an adequately water-resistant material in order to temporarily decrease the permeability of the containers and prevent the premature degradation of the water-disersible organic binder. This allows the container to perform its intended function. However, this does not prevent the eventual breakdown of the inorganically filled matrix. Upon the rupture of the coating on the surface of the inorganically filled matrix, such as by crumpling or crushing the container, moisture will then be able to invade the matrix and work its beneficial destruction upon the water-dispersible organic binder. The coatings, liners, or laminations can also serve to increase the strength of the containers or to act as a chemical barrier to acidic, alkaline, or other chemically destructive or corrosive substances.

From a processing standpoint, it is generally preferable to substantially homogeneously disperse each of the components within the inorganically filled mixtures or compositions used to manufacture the containers of the present invention. In this manner the strength and other desired properties imparted by each of the components are evenly dispersed throughout the containers. This minimizes the formation of weak spots that might otherwise require the manufacture of containers having thicker walls to compensate for such weak spots.

Forming the containers from the inorganically filled mixtures can be accomplished by several methods which can affect the final properties of the container. Forming methods include directly molding the inorganically filled mixture into a desired shape of the container or first forming the inorganically filled mixture into a sheet that is then reformed into the desired shape of the container by, e.g., spiral winding, convolution, folding, cutting, and combinations of the foregoing. Additionally, coatings, liners and laminates may be formed into the directly molded containers or sheet-formed containers utilizing means known in the art in order to create a liquid-tight and/or pressure-tight barrier and in order to give the container a desired finish.

The inorganically filled mixtures can be designed to have a variety of premolding and post-molding properties that allow for the use of complex molding processes utilized in the art of forming plastics, ceramics, metals, metal sheets, or paper into containers. As a result, optimal container designs can be achieved which allow for maximum ease in transporting and stacking the containers and in storing substances within the container, sealing substances within the containers, dispensing substances, and resealing substances within the container.

Although it is within the scope of the invention to integrally form the entire container with a single continuous surface, many containers will advantageously include two primary structural components, a hollow body portion, and a closure means. In this manner, an almost endless variety of containers can be manufactured using the compositions and methods disclosed herein.

In view of the foregoing, an object of the present invention is to provide improved compositions and methods for manufacturing containers having a high inorganic mineral content which greatly reduce the environmental impact caused by the manufacture of conventional packaging containers.

A further object and feature is to provide compositions and methods for manufacturing containers having a chemical composition that is compatible with the earth into which they eventually might be discarded compared to conventional packaging containers.

Another object and feature is that such compositions and methods result in a reduction in the cost of mass-producing sealable liquid-tight or pressure-tight containers.

Yet another object of the present invention is to provide compositions and methods for manufacturing containers having a high inorganic mineral content that have mechanical properties similar, or even superior, to conventional containers made from, e.g., metals, glass, plastics, or paper.

A still further object and feature is to provide novel compositions and methods for manufacturing environmentally sound containers having a high natural mineral content that have sufficient strength and impermeability to gases and liquids such that they can withstand a pressure differential between the interior and exterior of the container.

A further object of the present invention is to provide compositions having a relatively high content of natural mineral fillers that nevertheless can be manufactured into containers having relatively low mass and thin walls compared to conventionally manufactured clay ceramics.

An additional object is that such containers can readily degrade when exposed to water or other degradation forces typically encountered by disposable packaging containers. Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 10A is a perspective view of still another preferred embodiment of the container of the present invention.

FIG. 10B is a perspective view of another preferred embodiment of the container of the present invention.

FIG. 10C is a cross-section taken along the embodiment in FIG. 10B.

DETAILED DESCRIPTION OF THE PREFERRED EMBODIMENTS

Figure 1:
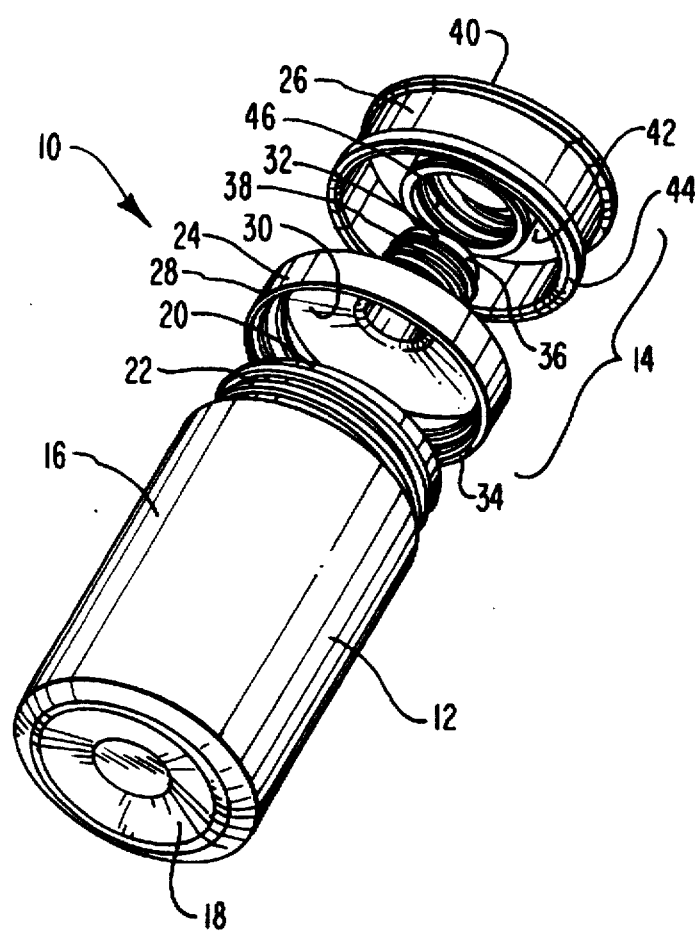
FIG. 1 is an exploded perspective view of one preferred embodiment of the container of the present invention.

The present invention involves novel sealable, liquid-tight and/or pressure-tight containers having an inorganically filled matrix, and methods for manufacturing such containers. Using a microstructural engineering approach it is possible to design an inorganically filled mixture that can be readily and economically mass-produced into containers in a manner that is more environmentally friendly compared to the manufacture of conventional containers.

I. General Discussion

The containers within the scope of the present invention are formed from inexpensive, practically inexhaustible and principally unprocessed materials, which result in significantly less environmental impact than conventional materials. Additionally, the containers are light-weight, thin-walled, mass producible, and safe in terms of the manufacture, distribution and utilization of the containers. The containers result in decreased cost in materials and production compared to conventional containers and decreased environmental impact in obtaining the materials used to manufacture the containers, processing the materials into containers, and disposing and recycling of used containers.

A. Microstructural Engineering Design

The containers of the present invention have been developed from the perspective of microstructural engineering. Microstructural engineering involves configuring the microstructure of the inorganically filled matrix and utilizing processing steps to achieve a uniform microstructure resulting in a final product with matrix uniformity. Microstructural engineering allows one to design into the microstructure of the inorganically filled matrix certain desired, predetermined properties, while at the same time remaining cognizant of costs and other manufacturing complications. This micro structural engineering analysis approach, in contrast to the traditional trial-and-error, mix-and-test approach, has resulted in the ability to design inorganically filled materials with those properties of toughness, minimal permeability, strength, weight, insulation, cost, and environmental neutrality that are necessary for appropriate containers.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have high moduli, while polymers have low moduli; metals can be shaped by casting and forging, while composites require lay-up or special molding techniques; cementitious materials, such as those made from hydraulic cements, historically have low flexibility, while elastomers have high flexibility.

However, compartmentalization of material properties has its dangers; it can lead to specialization (the metallurgist who knows nothing of ceramics) and to conservative thinking ("we use steel because that is what we have always used"). It is this specialization and conservative thinking that has limited the consideration of using highly inorganically filled materials for a variety of products, such as in connection with the sealable, liquid-tight, pressure-tight and thin-walled containers of the present invention. Nevertheless, once it is realized that inorganically filled materials have wide utility and can be designed and micro-structurally engineered to have properties tailored to a particular use, then their applicability to a variety of possible products becomes obvious.

The design of the compositions of the present invention has been developed and narrowed, first by primary constraints dictated by the design, and then by seeking the subset of materials which maximize the performance of the components. At all times during the process, however, it is important to realize the necessity of designing products which can be manufactured by a cost-competitive process.

Primary constraints in materials selection are imposed by characteristics of the design of a component which are critical to a successful product. With respect to a container those primary constraints include minimizing permeability, minimizing weight, maximizing strength (both compressive and tensile), and maximizing toughness while simultaneously keeping the manufacturing costs comparable to those of conventional containers made from metal, plastic, glass, or paper.

An important feature of the present invention is that when the inorganically filled mixture is directly molded, it will maintain its shape (i.e., support its own weight subject to minor forces, such as gravity and movement through the processing equipment) in the green state without external support. If first formed into a sheet, the green inorganically filled sheet will have sufficient cohesive strength such that it will maintain integrity as a sheet as it processes from one set of rollers to the next substantially free from underlying support. From a manufacturing perspective, high green strength is important in order for production of the containers to be economical.

Another advantage of the microstructural engineering approach of the present invention is the ability to develop compositions in which cross-sections of the matrix are more homogeneous than have been typically achieved in the prior art. Ideally, when any two given samples of about $0.5 \text{ n}^3$ (wherein "n" is the smallest cross-section of the material) of the inorganically filled matrix are taken, they will have substantially similar amounts of voids, aggregates, fibers, or any other additives and properties of the matrix. Achieving matrix uniformity is based on the proper mixing and placement of mixture components, which optimizes the properties of each mixture component and permits collaboration between the components to achieve the desired properties. The net effect of this uniformity is uniform performance and enhanced synergy of the components throughout the product.

From the following discussion, it will be appreciated how each of the component materials within the inorganically filled mixture contributes to the primary design constraints.

B. Definitions

The term "inorganically filled matrix" as used in the specification and the appended claims is used to denote the basic structure of the inorganically filled materials within the sealable liquid-tight containers of the present invention. The inorganically filled matrix is bound together by the organic polymer binder and does not rely on web physics between the fibers as in conventional paper or paperboard. When it is said that the fibers are substantially homogeneously dispersed throughout the inorganically filled matrix it means that the fibers are not intertwined together to any significant degree to form mechanical and hydrogen bonds as in paper or paperboard. Instead, their orientation is as purely random throughout the inorganically filled matrix as the inorganic aggregate filler. The fibers merely act to reinforce the organic binder matrix which holds the other solid components together.

The term "starch-bound sheet" is a particular embodiment of the present invention and includes sheets that can be formed into sealable liquid-tight containers that include a substantial amount of a starch binder and a lesser amount of a cellulosic ether binder. Because the starch within the starch-bound sheets is so inexpensive compared to other organic binders within the scope of the present invention, and because starch is in itself very environmentally sound, starch-bound sheets may or may not include an inorganic aggregate filler. A more amplified discussion of starch-bound sheets used to make the containers of the present invention may be found in copending application Ser. No. 08/631,676 entitled "Methods for Manufacturing Molded Sheets Having a High Starch Content," and filed Apr. 9, 1996, in the names of Per Just Andersen, Ph.D., Shaode Ong, Ph.D., Bruce J. Christensen, Ph.D., and Simon K. Hodson, (pending) which was previously incorporated herein by specific reference.

The "starch-bound sheets" of the present invention are to be distinguished from foamed starch matrices formed by directly molding aqueous starch compositions in which the water acts as a foaming agent. The starch-bound sheets generally include few voids and have a density greater than about $0.5 \text{ g/cm}^3$. In contrast, starch-based cellular matrices generally have a density less than about $0.35 \text{ g/cm}^3$, usually less than about $0.25 \text{ g/cm}^3$.

The term "sealable" as used in this specification and the appended claims, particularly when referring to the inventive containers, is intended to include the capacity to seal substances within a container. Substances can be sealed within containers by many methods. The container is generally sealed around substances by interlocking structural components, achieving a close tolerance between structural components, adhesives or crimping. Additionally, the container can be formed around the substances with a single continuous surface to seal the substances.

The term "liquid-tight" as used in this specification and the appended claims, is intended to include the capacity to act as a barrier to substantially prevent seepage of liquid substances stored within sealed containers and the ingress of liquids into the containers.

The term "pressure-tight" as used in this specification and the appended claims is intended to include the capacity to act as a barrier to prevent the escape of gases and liquids stored within the container and the ingress of gases and liquids into the containers. "Pressure-tight" containers include containers that have the capacity to withstand differentials in pressure between the exterior and the interior of the container up to about 10 MPa.

The term "container" as used in this specification and the appended claims is intended to include any receptacle or vessel utilized for storing substances which are sealed within the container to be dispensed at a later time. Examples of containers include cans, bottles, jars, and cartons conventionally made from metals, glass, plastics, and paper composites. The term "container" refers to any receptacle or vessel without reference to the particular good or type of good contained or stored therein. Thus, the containers of the present invention are in no way limited to a single type of good for which it is intended to be used. The term "container" is intended to include two broad structural components, (1) a hollow body portion which holds the substances and (2) closure means for sealing the substances within the containers and then allowing the substances stored with the containers to be dispersed. In some applications, the closure means can also be utilized for resealing the substances within the can.

The term "closure means" includes lids, enclosed caps, twist caps, bottle caps, pulltabs, tamperproof lids, pump sprays, other spray mechanisms, utilized in conjunction with conventional containers, such as cans, bottles, jars and cartons. Also included within the term "closure means" are the closure means utilized with paper composites, such as milk cartons, and containers for fruit juices and frozen fruit juices. Milk cartons are a folded paper composite configured with a sealed top such that a portion of the seal can be broken and the contents dispensed. Another useful closure means utilized with paper composite containers is the folded and sealed top utilized with many fruit juices. The folded and sealed top has a thin metal foil or plastic covering for penetration by a straw to dispense the stored juices. Additionally, the closure means utilized with frozen fruit juices is also useful. This configuration involves caps at both ends of a spiral wound paper composite tube and a plastic release device surrounding one cap for easy access to the contents.

The terms "substance" or "substances" are intended to include any good that may be stored in conventional containers, e.g., cans, bottles, jars and cartons made from metals, glass, plastics and paper composites. Examples of substances typically requiring the use of containers include beverages, food products, and household products. Examples of beverages includes carbonated beverages, alcoholic beverages and noncarbonated beverages, such as fruit juices, milk and water. Food products includes all food that is sealed in containers such as bottles, cans and cartons by dry packing or suspended in a liquid. Liquids used to store food products include water, oil, sugar solutions, and non-neutral solutions. Examples of household products and other substances which are typically stored in containers include aerosols, deodorants, perfume, cosmetics, cleansers, oils, lubricants, and paints.

One of the principal objectives of the present invention is to manufacture containers for use with beverages. Accordingly, the design of the inorganically filled materials used in specific embodiments of the present invention have been developed to accommodate the specific needs of storing, sealing, dispensing, portioning and resealing beverage products in a safe environment.

C. Requisite Properties for Sealable, Liquid-fight, Pressure-tight and Thin-walled Containers Containers within the scope of the present invention can be manufactured from inorganically filled mixtures having varying identities and amounts of the components and utilizing varying processing techniques to create containers having a wide variety of predetermined properties. The properties and qualities of a particular embodiment can be predetermined using a microstructural engineering approach in order to give the microstructure of the inorganically filled matrix the desired properties. The microstructural engineering approach allows one skilled in the art to adjust the identities and concentrations of the various components which might be added and to vary the processing techniques to create containers having desirable properties, while at the same time remaining cognizant of costs and other issues related to large scale manufacturing systems.

The sealable, liquid-tight and/or pressure-tight, and thin-walled containers within the scope of the present invention are capable of substantially preserving and protecting the substances stored within the containers, such that loss or alterations to the contained substances are minimized. The containers are formed from inexpensive and practically inexhaustible materials, which results in a significantly lower environmental impact compared to conventional materials. The containers are also able to withstand contact with water, non-neutral solutions, and solutions with an oil or sugar content.

The toughness and impermeability of the containers are directly related to the tensile strength and porosity of the inorganically filled matrix of the container. The degree of toughness and impermeability needed in a particular container varies based on the type of substances to be stored, the manner in which they are stored, processes which may occur after substances are sealed within containers, subsequent handling, and other design and performance requirements.

Pressure-tight containers within the scope of the present invention must have sufficient toughness and impermeability to withstand a pressure differential between the exterior and the interior of the container. A "pressure differential" exists when the pressure on the interior and the exterior are not equal. Pressure differentials can result from the type of substances stored, the manner in which substances are stored, as a result of a process after substances are sealed within containers, and due to compression of the container. Examples of the occurrence of such pressure differentials are the storage of carbonated beverages in containers, sealing substances under vacuum pressure in containers, varying the temperature or equilibrium reaction of substances sealed within containers, and compressing the container by squeezing the sidewalls together or stacking large amounts of containers one on top of another.

Designing sufficient tensile strength and minimal porosity into the matrix of the containers also enables the pressure-tight containers to withstand the internal longitudinal pressure stress and the internal transverse pressure stress resulting from pressure within the containers. The terms "internal longitudinal pressure stress" and "internal transverse pressure stress" as used in the specification and appended claims reflects the stress in the longitudinal and transverse directions on the matrix of the container. Internal longitudinal pressure stress is determined by the following formula:

$$\delta_L = (p*r)/(2t)$$

wherein p is the internal pressure, r is the inner radius of the container, and t is the wall thickness. Similarly the internal transverse pressure stress is determined by the following formula:

$$\delta_T = (p*r)/t \text{ or } \delta_T = 2\delta_L$$

wherein the same definitions apply.

The internal transverse pressure stress is twice as great as the internal longitudinal pressure stress; consequently, the internal transverse pressure stress determines the tensile strength needed to withstand a particular internal pressure. Optimal mixture designs incorporate the above described materials in prescribed ranges in order to manufacture a container having a matrix capable of withstanding internal transverse pressure stresses in the transverse vector up to about 10 MPa. The compressive strength of the pressure-tight container is typically within the range from about 50 to about 150 MPa.

The ability of the inorganically filled matrix to act as an impermeable barrier is a function of the porosity of the matrix. A substantially impermeable container creates a barrier to: oxygen ingress, thereby preventing oxidation of stored substances; nitrogen ingress or egress, thereby monitoring pressure differentials; carbonation loss; and leakage of the stored liquids. Containers can be designed to be impermeable to gases and liquids in several ways. One method involves the use of mixtures incorporating sealants such as polymers within the inorganically filled matrix. Additional methods of achieving impermeability to gases and liquids involve the use of coatings, liners and/or laminates. Coatings, liners and/or laminates are also useful to minimize the corrosive effect resulting from the pH levels of some substances, such as acids in carbonated beverages. If a hydraulic cement binder is used, it may be possible to use the method for obtaining a highly densified cementitious matrix set forth in U.S. Pat. No. 5,358,676 entitled, "Methods of Manufacture and Use For Hydraulically Bonded Cement." For purposes of disclosure, the foregoing patent is incorporated herein by specific reference.

The inorganically filled matrix of the present invention may be designed to have a tensile strength to bulk density ratio within a range from about 2 to about 500 MPa·cm$^3$/g. The tensile strength to bulk density ratio of the matrix will be more preferably within the range from about 5 to about 150 MPa·cm$^3$/g.

The inorganically filled matrix of the containers of the present invention are designed to have an effective thickness which varies depending on whether the container is liquid-tight only or pressure-tight as well. The term "effective thickness" as used in this specification and the appended claims, is intended to define the thickness at the weakest point of the container. The effective thickness of the matrix of containers which are only liquid-tight will be up to about 1 cm, preferably in a range from about 0.25 mm to about 5 mm, and most preferably in a range from about 0.5 mm to about 2 mm. The effective thickness of the matrix of liquid-tight and pressure-tight containers may be as high as about 2 cm, preferably less than up to about 1 cm, preferably less than about 5 mm, and most preferably less than about 3 mm.

D. Structure of the Containers

The structure of the containers within the scope of the present invention will vary based on the nature of the substances to be stored, the manner in which the substances are stored, processes which may occur after the substances are sealed within containers, and how the containers are to be handled. The result of such diverse design requirements is a vast array of useful structural configurations.

The containers of the present invention generally comprise two components: a hollow body portion and a closure means. The hollow body portion typically has sidewalls, a bottom portion, and initially an open end through which substances can be deposited within the hollow body portion. The closure means is utilized for engaging the open end of the hollow body portion to seal substances deposited within the container. In many embodiments the closure means can also be utilized for dispensing substances and for reseating substances within the container. The structural components of the containers, namely the hollow body portions and closure means, can be designed to substantially resemble the structural components of conventional containers made from metals, glass, plastics and paper composites utilized for containing substances such as beverages, food products and household products.

The structural designs of containers utilized for carbonated beverages, alcoholic beverages and noncarbonated beverages such as fruit juices, milk and water, provide many examples of containers that can be manufactured from inorganically filled materials. The structural components of the present invention can be designed to substantially resemble the conventional aluminum beverage can or beverage bottles manufactured from glass or plastic.

A preferred embodiment of a container that is particularly useful for storing and dispensing beverages or other liquids is illustrated in FIG. 1. The container of FIG. 1 shown generally at 10 has a hollow body portion 12 and a closure means 14. A hollow body portion 12 has sidewalls 16, a bottom portion 18, and an open end 20. The bottom portion 18 is integrally formed together with the side walls 16. The hollow body portion 12 also includes external threads 22 formed about the external periphery adjacent to the open end 20. The external threads 22 are configured so as to engage complementary internal threads formed in the closure means 14 as more fully described below.

The thickness of side walls 16 is preferably less than about 3 mm, more preferably less than about 1.5 mm, and most preferably less than about 0.75 mm. In a preferred embodiment, the external diameter of hollow body portion 16 is approximately 6 cm, the internal diameter of hollow body portion 16 is approximately 5.8 cm, and the length of hollow body portion 16 along its longitudinal axis is approximately 12 cm.

As further illustrated in FIG. 1, the closure means 14 comprises a top 24 and a cap 26. The top 24 has a proximal end 28, a conical portion 30, and a distal end 32. The proximal end 28 is configured to receive the open end 20 of hollow body portion 12 in a mating relationship. Formed about the internal periphery of the proximal end 28 of the top 24 are internal threads 34 that are complementary to, and are configured to engage, the external threads 22 of the hollow body portion 12. In the preferred embodiment, the internal threads 34 of the top 24 and the external threads 22 of the hollow body portion 12 are left-handed threads. The top 24 terminates at its distal end 32 in a nozzle or spout 36. External threads 38 are formed about the external periphery of the nozzle 36. The external threads 38 are configured so as to engage complementary internal threads formed in the cap 26, as more fully described below.

The cap 26 in a preferred embodiment is an enclosed cap. The cap 26 has a flat portion 40 that is essentially in the shape of a circular disk or plate. Integrally attached to one side of the flat portion are concentric inner and outer annular rings 42 and 44. The external diameter of the outer annular ring 44 is approximately equal to the external diameter of the proximal end 28 of the top 24 and the external diameter of the hollow body portion 12. Thus, when all of the components of the container 10 are assembled together, the profile of the container 10 will resemble an elongated cylinder of relatively uniform external diameter. The inner annular ring 42 is configured to receive the nozzle 36 of the top 24 in mating relationship. Formed about the internal periphery of the inner annular ting 42 are internal threads 46 that are complementary to, and are configured to engage, the external threads 38 of the nozzle 36. The internal threads 46 of the inner annular ring 42 and the external threads 38 of the nozzle 36 are right-handed threads.

As discussed in more detail below, the individual components of the container 10, namely the hollow body portion 12, top 24, and cap 26, are separately molded from inorganically filled materials, and then the individual components are assembled together to form the container 10.

The advantages of the embodiment depicted in FIG. 1 include the ability to stack the containers without support packaging due to the flat surfaces on the top and bottom of the containers and the ease of filling the container in mass production through the open end of the hollow body portion. Additionally, the closure means can be utilized for engaging the open end of the hollow body portion to seal substances within the container, for dispensing substances, and also for resealing substances within the container. The containers can be stacked like many conventional containers, such as aluminum cans, yet the closure means of this embodiment permits the resealing of substances stored within the container.

Figure 2A:
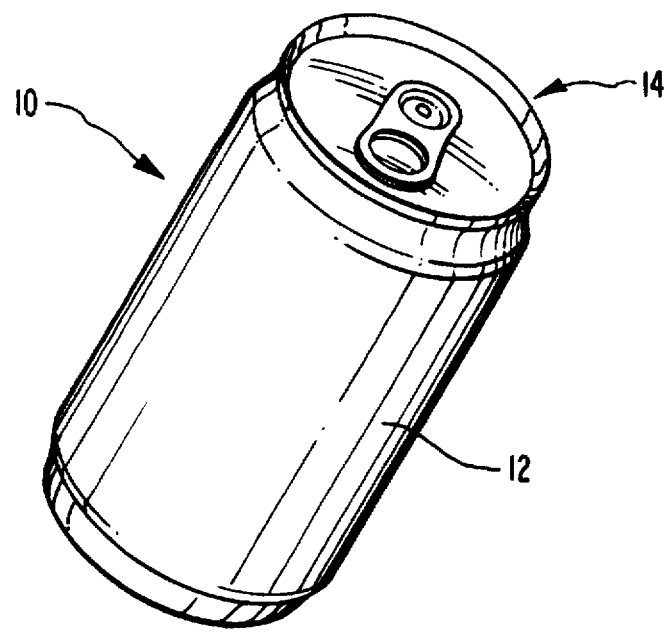
FIG. 2A is a top perspective view of another preferred embodiment of the container of the present invention.
Figure 2B:
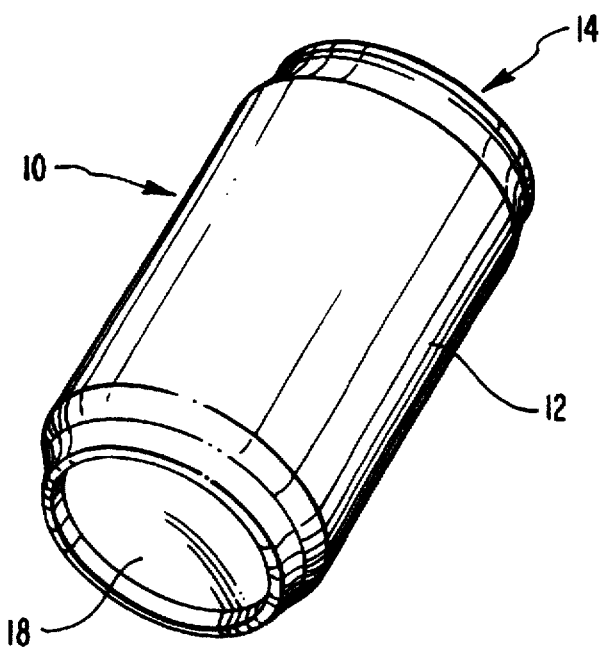
FIG. 2B is a bottom perspective view of another preferred embodiment of the container of the present invention.

FIGS. 2A and 2B illustrate another preferred embodiment of the container, which is similar to beverage containers presently manufactured from aluminum. The container shown generally at 10 has a hollow body portion 12 and a closure means 14. A bottom portion 18 is integrally formed together with side walls 16. The side walls 16 and bottom portion 18 can be formed from inorganically filled materials and substances can be sealed within the container 10 with a closure means 14 made from other materials, such as metals, plastic, or composite materials.

The bottom portion 18 is configured to give optimal strength and minimize the amount of material necessary to form a container with sufficient strength and impermeability. The design techniques which have been utilized in the aluminum can industry to optimize strength and minimize the amount of necessary material can be utilized within the scope this invention to optimize the design of containers manufactured from inorganically filled materials. Additionally, the design techniques utilized to manufacture containers from other materials, such as metals, glass, plastics and paper composites, can also be utilized.

The advantages of the embodiment depicted in FIGS. 2A and 2B include the ability to stack the containers without support packaging due to the flat surfaces on the top and bottom of the containers and the ease of filling the container in mass production through the open end of the hollow body portion. The closure means, however, cannot typically reseal substances within the container.

Figure 3:
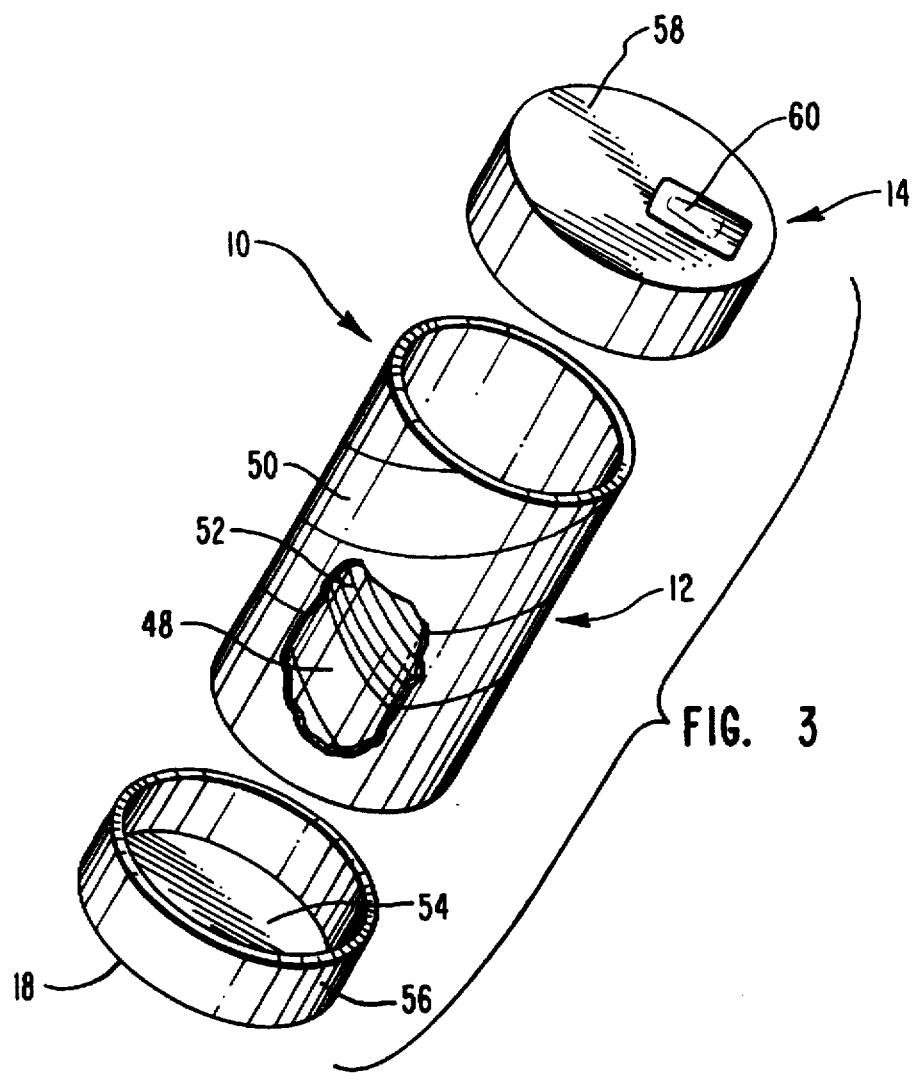
FIG. 3 is an exploded perspective view of another preferred embodiment of the container of the present invention, with a portion of the outer layer of the inorganically filled matrix removed to expose a portion of the inner layer of the inorganically filled matrix.

FIG. 3 illustrates another preferred embodiment of a container shown generally at 10, which has a hollow body portion shown generally at 12 and closure means shown generally at 14. In this embodiment, the hollow body portion 12 is open at both ends. Furthermore, the bottom portion 18 is separate from hollow body portion 12.

As discussed in more detail below, the hollow body portion 12 is formed from two layers of an inorganically filled matrix. As shown in FIG. 3, an inner layer 48 is wound in a spiral fashion in a first direction, and an outer layer 50 is wound in a spiral fashion in a second direction. The outer surface of the inner layer 48 is bonded to the inner surface of the outer layer 50 with a suitable adhesive. The tensile strength of hollow body portion 12 can be further enhanced by adding continuous fibers 52 between the inner and outer layers 48 and 50. As discussed in more detail below, an inorganically filled sheet is spiral wound onto a mandrel to form a long, continuous cylindrical tube, which is then cut by conventional methods to form a plurality of hollow body portions 12.

The bottom portion 18 has a flat portion 54 and an annular ring 56 integrally formed about the outer periphery. As illustrated, the ting 56 is configured to receive the hollow body portion 12 in a mating relationship. However, the bottom portion 18 could alternatively be configured to mate within the end of the hollow body portion 12. Either way, the bottom portion 18 is bonded to one end of the hollow body portion 12 with a suitable adhesive.

The embodiment shown in FIG. 3 also incorporates an alternative embodiment of the closure means shown generally at 14. In this embodiment, closure means 14 consists of a top portion 58 and a foil tab 60. The top portion 58 is essentially the same as the bottom portion of this embodiment, except that it has a cutout portion (which is covered by the foil tab 60) through which the beverage is dispensed after the foil tab 60 has been removed. The foil tab 60 is similar to that presently used in conventional non-carbonated beverage containers. As with the bottom portion 18, the closure means 14 is configured to receive the hollow body portion 12 in mating relationship and is bonded to the end of the hollow body portion 12 with a suitable adhesive.

Alternatively, the closure means illustrated in FIG. 1 can be adapted to fit onto the hollow body portion 12 illustrated in FIG. 3 which permits the resealing of substances within the container. In that event, the internal threads 34 about the inner periphery of the proximal end 28 of top 24 are eliminated and the proximal end 28 is configured to receive the end of the hollow body portion 12 in mating relationship. Additionally, the closure means illustrated in FIGS. 2A and 2B can be adapted to fit onto the hollow body portion illustrated in FIG. 3.

Other configurations can also be formed by spiral winding an inorganically filled sheet and can be utilized in a similar fashion to containers formed by spiral winding paper composites. Examples of such configurations include containers modeled after paper composite containers such as conventional oatmeal containers, frozen orange juice containers, dough containers, ice cream cartons and motor oil cans. The sidewalls of such containers typically comprise a paper composite; however, the bottom portion and closure means can have many different configurations. Examples of such bottom portions and closure means include flat paper composite lids, spiral wound lids, and metal disks configured to seal the substances within the containers.

The spiral wound containers within the scope of this invention can be formed with sidewalls formed by spiral winding an inorganically filled sheet in a similar manner as the container shown in FIG. 3. The bottom portion and closure means can also be formed by spiral winding an inorganically filled sheet. Other methods, described in detail below, can also be utilized to form the bottom portion or closure means. Additionally, it is within the scope of this invention to form the sidewalls from inorganically filled materials and the bottom portion or closure means from other materials. The advantages of these spiral wound configurations are strength, the ability to easily stack the containers, and the ease of dispensing substances from the containers.

Figures 4, 5:
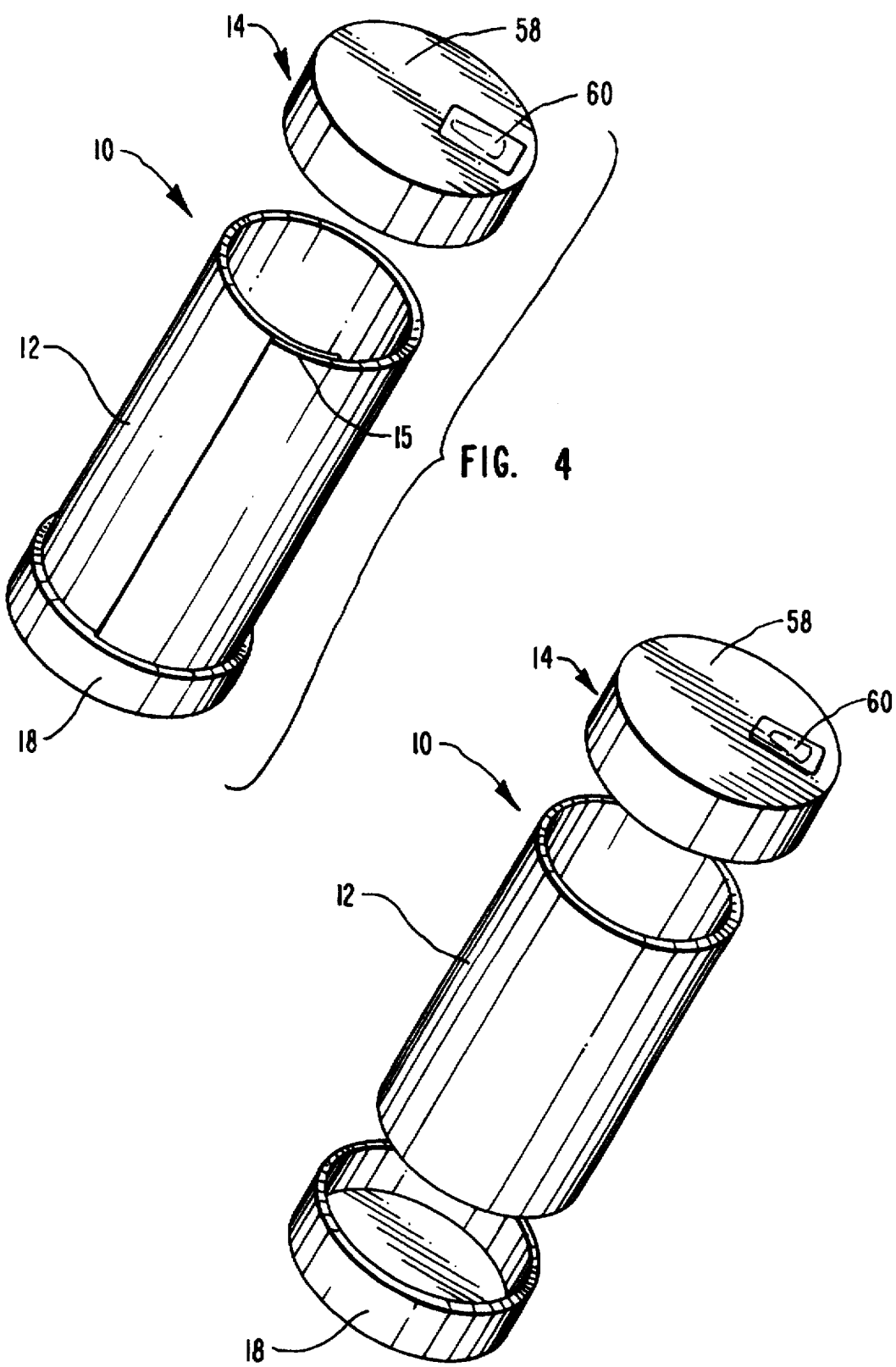
FIG. 4 is an exploded perspective view of still yet another preferred embodiment of the container of the present invention.
FIG. 5 is an exploded perspective view of another preferred embodiment of the container of the present invention.

Referring to FIGS. 4 and 5, two other embodiments of the container are shown generally at 10. These embodiments are essentially the same as illustrated in FIG. 3, except for the construction of the hollow body portion 12. In the embodiment shown in FIG. 4, the hollow body portion 12 is formed by rolling a single inorganically filled sheet to form a cylindrical tube. Opposite ends of the sheet are overlapped, as indicated at 15, and are bonded together with a suitable adhesive to form the hollow body portion 12. In the embodiment shown in FIG. 5, the hollow body portion 12 is formed by extruding a continuous, elongated cylindrical tube, which is then cut into pieces to form a plurality of individual hollow body portions. In both embodiments, the bottom portion 18 is essentially the same as that shown in FIG. 3 and can be configured either to receive the end of the hollow body portion 12 in mating relationship or to mate within the end of the hollow body portion 12. FIGS. 4 and 5 both include a closure means shown generally at 14 that is similar to that shown in FIG. 3. However, it should be understood that the closure means of FIGS. 1, 2A and 2B, as well as other forms of closure means well known in the art, could be adapted for use in connection with the embodiments illustrated in FIGS. 4 and 5.

Figure 6:
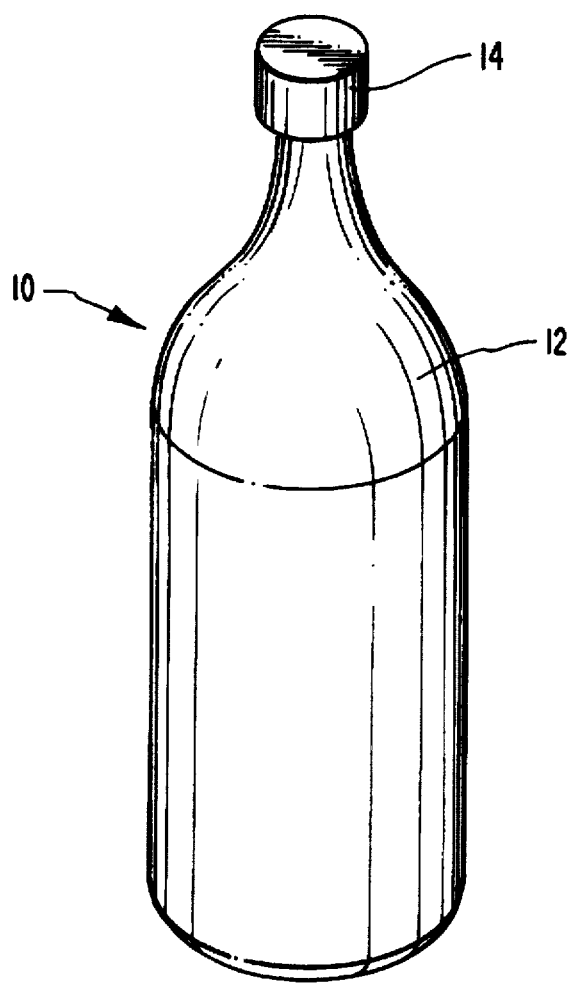
FIG. 6 is a perspective view of another preferred embodiment of the container of the present invention.
Figure 6A:
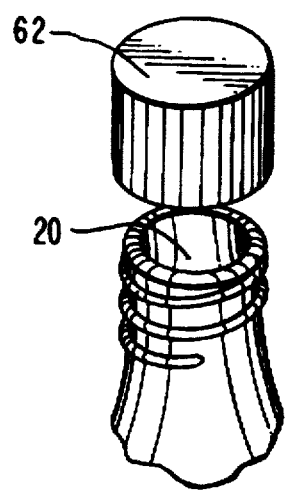
FIG. 6A is a perspective view of a closure means of the present invention.
Figure 6B:
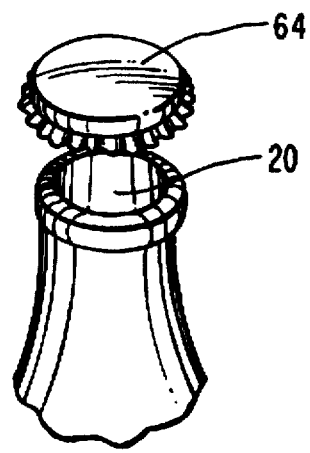
FIG. 6B is a perspective view of a closure means of the present invention.

The embodiment shown in FIGS. 6A and 6B incorporates the design of beverage bottles manufactured from glass or plastic which are typically formed by blow molding. The container shown generally at 10 has an integrally formed hollow body portion 12 which can be formed by blow molding and a closure means 14. The closure means 14 can be utilized for engaging the open end of the hollow body portion 12 to seal beverages within the container, for dispensing beverages, and for resealing substances within the container. As depicted in FIG. 6A, twist caps 62 provide a useful closure means. As depicted in FIG. 6B, bottle caps 64 can also be utilized. Additionally, corks and plugs can be utilized. The closure means can be manufactured by various methods using inorganically filled materials, or they can include conventional materials, such as metals and plastics. An advantage of closure means utilized with bottles is the ability to reseat beverages within the container. The ability to reseal beverages is particularly useful with containers holding a volume larger than is needed for a single serving. External packaging, however, is needed to stack this embodiment due to the configuration of the top of the container.

Figure 7:
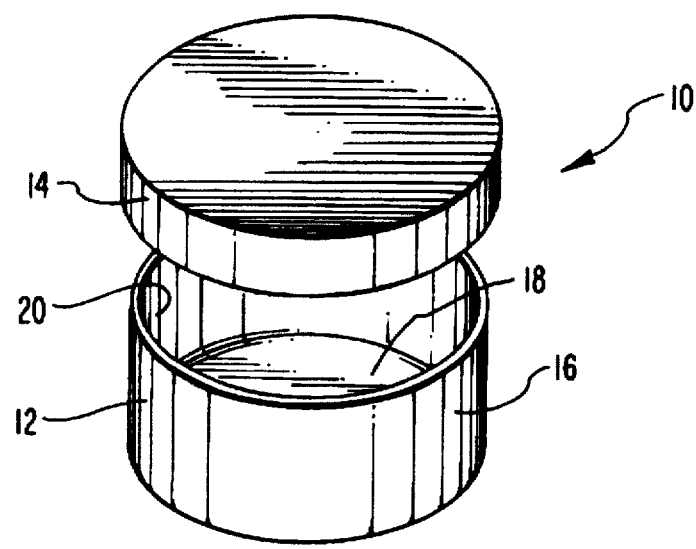
FIG. 7 is an exploded perspective view of yet another preferred embodiment of the container of the present invention.

Structural designs conventionally utilized for storing food products, such as metal cans, glass jars and paper composite containers, can also be utilized to design the structure of containers within the scope of the present invention. The embodiment depicted in FIG. 7 incorporates the design of metal cans for containing food products, such as tuna. The container shown generally at 10 has a hollow body portion 12 with sidewalls 16, a bottom portion 18, and an open end 20. The bottom portion 18 is integrally formed with the sidewalls 16 from metal. A closure means 14 is utilized for engaging the open end 20 to seal substances within the container. The closure means 14 is configured to receive a portion of the side walls 16 of the hollow body portion 12 in a mating relationship. The closure means 14 can be sealed to the hollow body portion 12 by compression, crimping, or with an adhesive. An advantage of such a flat configuration is the ability to stack the cans without support packaging. Additionally, metal can be incorporated in the closure means to facilitate the use of can openers requiring magnetic properties in the closure means. Other closure means can also be utilized, such as a ring top or a pull top configuration.

Figure 8:
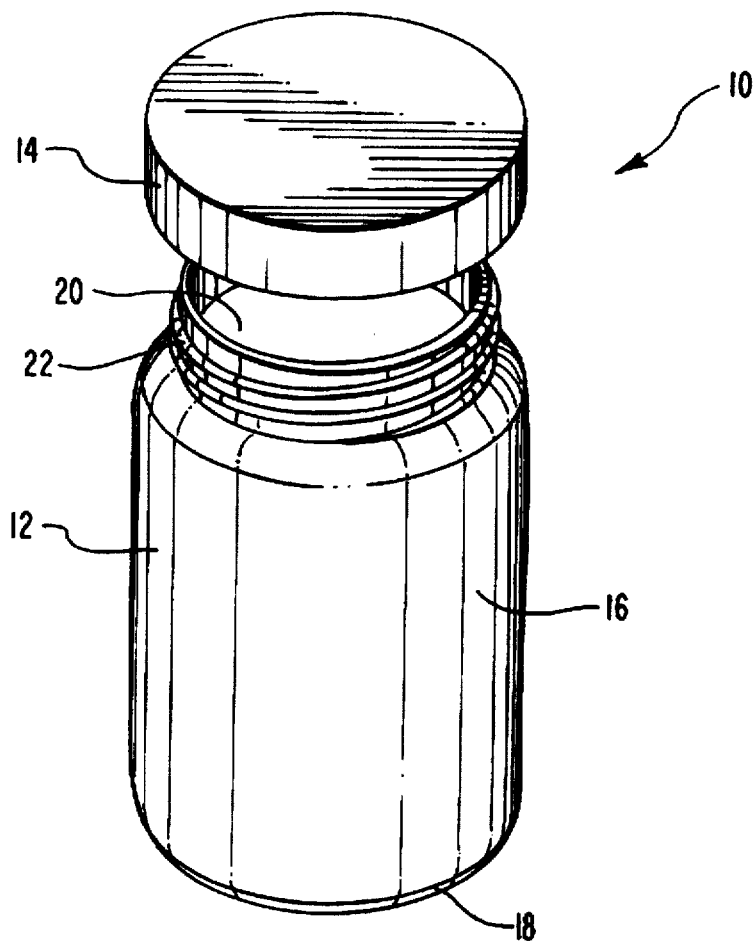
FIG. 8 is an exploded perspective view of another preferred embodiment of the container of the present invention.

FIG. 8 shows another embodiment of the container which has a configuration similar to a conventional glass jar. The container shown generally at 10 has a hollow body portion 12 and a closure means 14. The hollow body portion 12 has side walls 16, bottom portion 18 and an open end 20. About the outer periphery of the open end 20 are external threads 22. The closure means 14 has internal threads (not shown) that are complementary to and are configured to engage the external threads 22 of the hollow body portion 12.

Figure 9A:
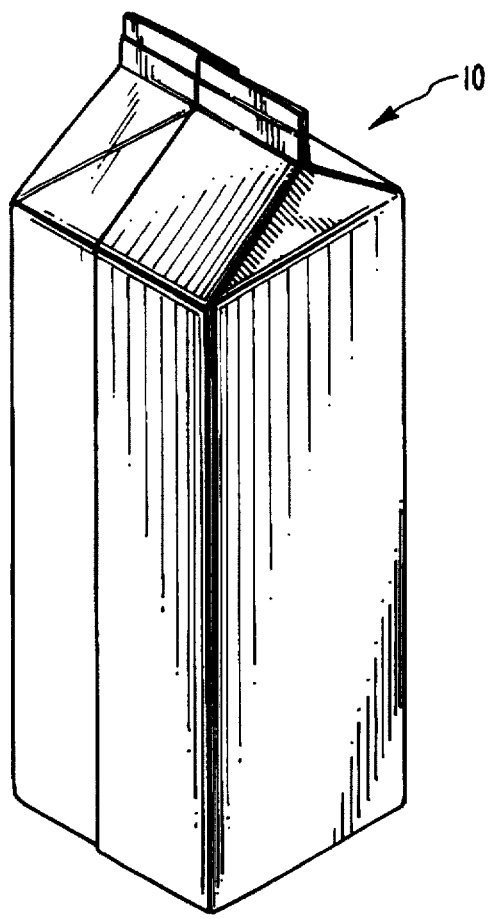
FIG. 9A is a perspective view of still another preferred embodiment of the container of the present invention.
Figure 9C:
FIG. 9C is a cross-section taken along the embodiment in FIG. 9B.
Figure 9B:
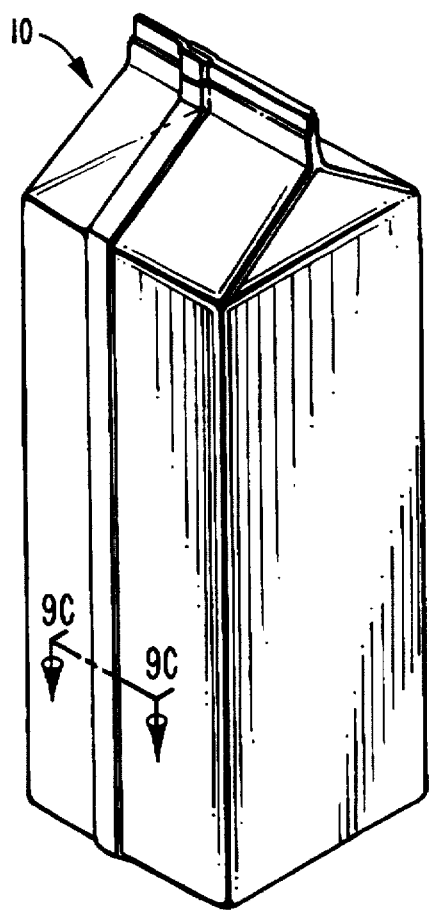
FIG. 9B is a perspective view of another preferred embodiment of the container of the present invention.

FIGS. 9A, 9B, 10A, and 10B depict containers reflecting designs conventionally made from paper composites to form milk and fruit juice containers. These containers shown generally at 10 have hollow body portions and closure means formed from sheets which are folded and sealed into generally rectangular shapes. The milk cartons depicted in FIGS. 9A and 9B are configured with a top sealed with an adhesive such that a portion of the seal can be broken and the contents dispensed. The milk carton of FIG. 9A depicts overlapping portions which have been sealed together with an adhesive, while FIG. 9B depicts overlapping portions which have been hermetically sealed together. The overlapping portions which have been hermetically sealed can be compressed or crimped together. FIG. 9C shows a cross-section of the hermetically sealed overlapping portions.

The closure means utilized with the fruit juice containers depicted in FIGS. 10A and 10B includes a folded and sealed top with a foil covering for penetration by a straw to dispense the stored juices. The fruit juice container of FIG. 10A includes overlapping portions which have been sealed together with an adhesive, while the container of FIG. 10B includes overlapping portions which have been hermetically sealed together. The overlapping portions which have been hermetically sealed can be compressed together or crimped together. FIG. 10C shows a cross section of the hermetically sealed overlapping portions.

Conventional fruit juice containers formed from paper composites frequently utilize technology disclosed in U.S. Pat. No. 4,287,247, entitled "Packing Laminates Provided with Crease Lines". The technology disclosed in U.S. Pat. No. 4,287,247, which is assigned to Tetra Pak International AB of Sweden, teaches the conversion of a laminate to a packing container with unique crease lines which prevent the formation of cracks in the layers of the laminate and subsequent leakage. For purposes of disclosure, the foregoing patent is incorporated by reference.

Figure 11:
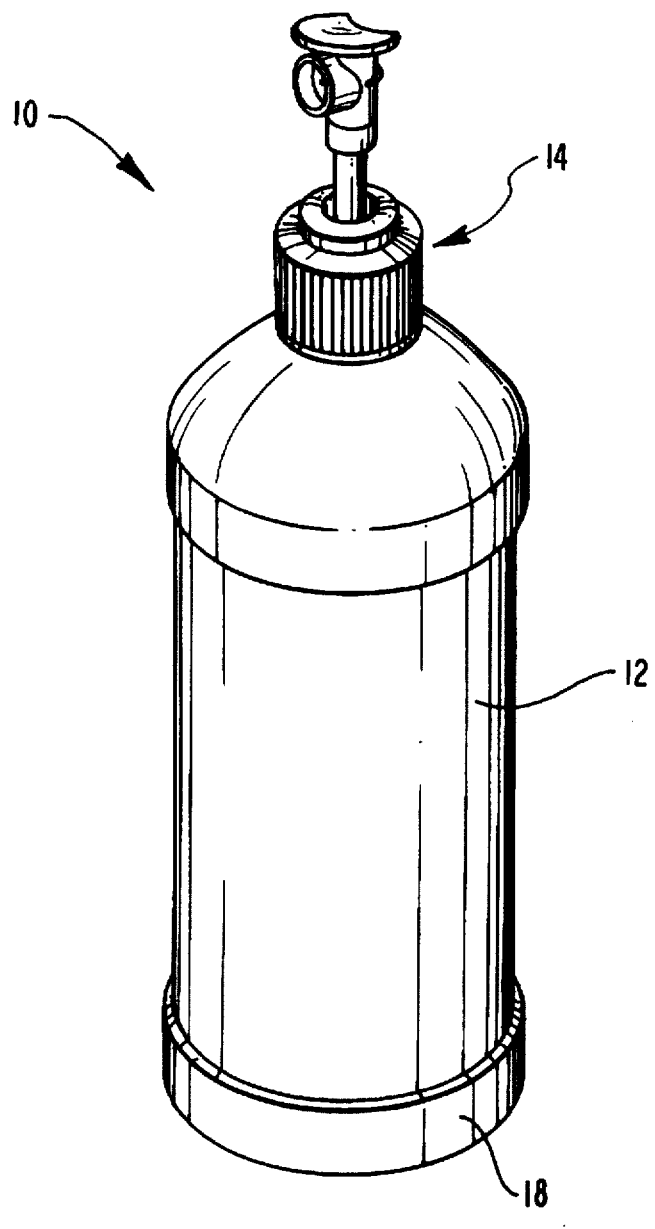
FIG. 11 is a perspective view of still another preferred embodiment of the container of the present invention.

Pump spray containers provide another design for containers within the scope of the present invention and are depicted in FIG. 11. The pump spray containers shown generally at 10 typically have a hollow body portion 12 with a bottom portion and an open end. A closure means shown generally at 14 is utilized for engaging the open end of the hollow body portion to seal substances within the containers and for dispensing substances. The closure means for dispensing substances is typically a pump spray or other spray mechanism. The closure means can also be manufactured from conventional materials.

Conventional containers have been embodied and are conventionally embodied in a multitude of configurations. The variation is primarily a result of the multiplicity of substances stored within the containers and the differing consumer needs associated with each of the substances. The present invention is not limited to the structural configurations which have been described, and the present invention includes all structural configurations of containers made from inorganically filled materials. It is also within the scope of the present invention to manufacture containers with a hollow body portion formed from inorganically filled materials and with closure means manufactured from a material selected from the group consisting of metals, glass, plastics, and paper composites. Additionally, it is within the scope of the present invention to manufacture containers with a hollow body portion formed from a material selected from the group consisting of metals, glass, plastics and paper composites and with a closure means formed from inorganically filled materials.

II. Inorganically Filled Mixtures

The terms "inorganically filled moldable mixture," "inorganically filled mixture," or "inorganically filled composition" as used in the specification and the appended claims shall refer to a mixture that can be molded into at least a portion of the containers which are disclosed and claimed herein. Such mixtures are characterized as generally having a significant concentration of inorganic fillers or aggregates, although in certain embodiments it may be preferable to use little or no inorganics. In general, the inorganic filler component will be included in a range from 0% to about 90% by weight of total solids in the mixture, but usually in an amount greater than about 20% by weight of solids. The inorganically filled mixture will also include water, a water-dispersible binder, and a fibrous material.

As used in the specification and the appended claims, the term "total solids" shall include all solids, whether they are suspended or dissolved in the inorganically filled mixture. The weight of the total solids does not include the weight of the water or other components which are primarily in a liquid state, but is calculated by subtracting out the weight of the water and other liquid components. The inorganically filled mixture may also include other admixtures such as plasticizers, lubricants, dispersants, humectants, mold release agents, hydraulically settable inorganic aggregates, and air void forming agents.

The inorganically filled mixtures can be designed to have a variety of rheologies (as measured by yield stress and/or viscosity) depending on the process used to form the containers or portions thereof. Typically the inorganically filled mixtures will have relatively high yield stress and internal cohesion, which makes them highly workable and form stable immediately or shortly after being molded into the desired shape. The inorganically filled mixture should not be so viscous that it is difficult to mold.

After the inorganically filled mixture has been formed into the desired shape and has achieved form stability, the article made therefrom will have a "highly inorganically filled organic polymer matrix" or "inorganically filled matrix". These terms as used in this specification and the appended claims shall refer to such matrices regardless of the extent of drying or hardening that has taken place as long as the article is form stable. The inorganically filled matrix is typically formed by removing at least a portion of the water from the inorganically filled mixture by evaporation. Generally, water is not drained or otherwise removed from the inorganically filled mixture while in a liquid state.

Both the inorganically filled mixture and the inorganically filled matrix formed therefrom constitute "highly inorganically filled materials", "inorganically filled materials", or "highly inorganically filled composites". These terms as used in this specification and the appended claims shall refer to materials or composites without regard to the extent of wetting, setting, drying, or hardening that has taken place.

The terms "wet" or "fresh" as used in this specification and the appended claims shall refer to an inorganically filled material, whether molded or molded, which has a moisture content sufficient to allow it to be molded or shaped without fracturing or unduly damaging the structural matrix. A partially dried article that nevertheless can be molded without significantly damaging the structural matrix shall be within the meaning of the terms "wet" or "fresh."

The term "form stable" as used in this specification and the appended claims means that the article may be partially wet yet be mechanically self-supporting without significant deformation, i.e., it can maintain its shape against the force of gravity without any exterior support (such as a mold). Form stable articles can also withstand process handling shortly after formation without significant deformation. Obtaining an optimal form stability for a particular article can be achieved by controlling the yield stress of the mixture through the mix design of the inorganically filled mixture and the processing conditions. In general, an increase in the yield stress results in increased form stability. In addition, the form stability of the molded mixture can be affected by the shape, structure and wall thickness of an article.

The terms "dry", "dried" or "hardened" as used in this specification and the appended claims shall refer to an inorganically filled material having a structural matrix which will be harmed or fractured if further molded. It will be understood, however, that molded articles that have been only partially dried or which still retain a portion of water but which will be damaged if further molded shall fall within the definition of "dry", "dried" or "hardened." This is particularly true in light of the tendency of the inorganically filled materials to absorb moisture from ambient air so that they are rarely totally dry.

A. Water-Dispersible Organic Polymer Binders

The terms "water-dispersible organic polymer binder," "water-dispersible binder", "organic polymer binder," and "organic binder" as used in the specification and the appended claims shall refer to organic materials capable of being at least partially dissolved in water, or showing sufficient affinity for water such that they can form an aqueous phase, emulsion, or suspension, and which will, upon the removal of the water, be capable of binding or holding together the non-water soluble components of the inorganically filled material, including fibers and aggregate materials. The water-dispersible organic binders not only bind the individual aggregate particles and fibers together within the mixture upon drying or hardening (thereby forming a structural or highly inorganically filled matrix), but they also have the general tendency of affecting the rheology of the inorganically filled mixture.

The inorganically filled mixtures used to manufacture the containers of the present invention develop strength properties through the drying out of a substantially solvated or gelled water-dispersible organic binder. The inorganically filled mixture first develops workability and flow properties by adding an amount of water to the mixture sufficient to lubricate the solid inorganic aggregate particles and fibers, and to solvate, gel or at least substantially disperse the water-dispersible organic binder. Thereafter, removal of water such as by evaporation allows the water-dispersible binder to develop its maximum strength properties.

An example of an organic binder within the present invention is native starch, which can be purchased as tiny granules in a powder-like form. The starch granules are then "activated" by gelating the starch in water by heating above the gelation temperature (typically >65°–95° C.). Upon removal of the water by evaporation, the gelatinized starch retrogrades or partially crystallizes to form a solid binding material having a strength of up to about 40–50 MPa. Through careful microstructural engineering, the highly inorganically filled containers and other articles can have varying tensile strengths, even approaching 100 MPa in some cases, depending on the type and concentration of starch and fibers within the articles.

The various water-dispersible organic binders contemplated by the present invention can be roughly organized into the following categories: (1) polysaccharides and derivatives thereof, (2) proteins and derivatives thereof, and (3) synthetic organic materials. Polysaccharide water-dispersible organic binders can be further subdivided into (a) cellulose-based materials and derivatives thereof, (b) starch-based materials and derivatives thereof, and (c) other polysaccharides. It should be understood that within these broad categories are a large number and variety of substances having greatly varying properties. Whether or not any two sufficiently dissimilar binders are nevertheless equivalent depends on their behavior and properties within the inorganically filled mixture in question.

Suitable cellulose-based binders include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and shall not be listed here, but other cellulose materials which have the same or similar properties as these would also work well. Some cellulose-based binders can also be cross-polymerized in solution; an example of this is Cellosize®, a hydroxyethylcellulose product available from Union Carbide. Cellosize® can be cross-linked in water with dialdehydes, methylol ureas, or melamine-formaldehyde resins, thereby forming a less water-soluble binder.

Suitable starch-based binders include, for example, gelated starch granules, amylopectin, amylose, seagel, starch acetates, starch hydroxyethyl ethers, ionic starches, long-chain alkylstarches, dextrins, amine starches, phosphates starches, and dialdehyde starches. It may be advantageous in many cases to use unmodified starch granules which are initially ungelatinized in the inorganically filled mixture but which become gelatinized during the molding process by heating the mixture to above the gelation temperature of the starch. In such cases, it may also be advantageous to include one of the aforementioned cellulosic ethers having a thermal precipitation temperature that is lower than the gelation temperature of the starch granules. This allows for the formation of a nonstick film on the surface of the sheet or molded article, which helps to prevent or reduce adhesion of the gelatinizing starch to the mold or sheet-forming apparatus.

Other natural polysaccharide-based binders include, for example, alginic acid, phycocolloids, agar, gum arabic, guar gum, locust bean gum, gum karaya, and gum tragacanth.

Suitable protein-based binders include, for example, Zein® (a prolamine derived from corn), collagen (derivatives extracted from animal connective tissue such as gelatin and glue), and casein (the principle protein in cow's milk).

Finally, suitable water-dispersible synthetic organic binders include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylimides, ethylene oxide polymers, polylactic acid, and latex (which is a broad category that includes a variety of polymerizable substances formed in a water emulsion; an example is styrene-butadiene copolymer)

The water-dispersible organic binders within the moldable mixtures of the present invention are preferably included in an amount such that a hardened article will contain from about 1% to about 60% organic binder by weight of total solids within the hardened article, more preferably from about 2% to about 30% by weight, and most preferably from about 5% to about 20% by weight.

B. Water

As set forth above, water is added to the inorganically filled mixture in order to gelate, solvate, or at least substantially disperse, the water-dispersible organic binder within the mixture. In many cases, some of the water actually reacts with and becomes chemically bound with the organic binder. In other cases it may be more loosely bound to the organic binder, often by means of hydrogen bonding. Certain amounts of water may also react with other admixtures within the mixture, such as hydraulically settable inorganic aggregates or binders, or other materials which chemically react with water.

The water also serves the function of creating a mixture having the desired rheological properties, including viscosity and yield stress. These properties are general ways of approximating the "workability" or flow properties of the inorganically filled mixture. In order for the mixture to have adequate workability, water must generally be included in quantities sufficient to wet each of the inorganic aggregate particles, fibers, or other solid particles, to gelate, solvate or at least disperse the organic binder, and to at least partially fill the interstices or voids between the solids. In some cases, such as where a dispersant or a lubricant is added, adequate workability can be maintained while using less water initially.

The amount of water that is added to the inorganically filled mixture must be carefully balanced so that the mixture is sufficiently workable, while at the same time recognizing that lowering the initial water content increases the form stability of the article in the wet state and the final strength of the hardened article. Less water typically results in a stronger final product because the total porosity is reduced during the molding processes. Moreover, if less water is initially added to the moldable mixture less water must be removed in order to dry the molded article.

The appropriate rheology to meet these needs can be defined in terms of yield stress. The yield stress of the inorganically filled mixtures of the present invention will preferably be in a range from about 2 kPa to about 5 MPa, more preferably in the range from about 100 kPa to about 1 MPa, and most preferably in a range from about 200 kPa to about 700 kPa. The desired level of yield stress should be adjusted and optimized according to the particular molding process being used to form the container or portion thereof.

One of the important features of the present invention as compared to the manufacture of conventional paper products is that the amount of water initially within the inorganically filled mixture is far less than the amount normally found in fiber slurries used to make conventional paper products. This results in a mixture having far greater yield stress and form stability compared to paper-making slurries. Hence, the total amount of water that must be removed from the mixture to obtain a self-supporting (i.e., a form stable) material is much less compared to slurries used to manufacture conventional paper products. In fact, conventional paper-making slurries have virtually no form stability until they have been dewatered and dried to a significant degree.

The amount of water that should be added to the inorganically filled mixture will depend to a large extent on the concentrations and identities of the solids added to the mixture, the identity and amount of the water-dispersible binder that is added, and the desired rheology of the resulting mixture. The amount of water that will be added to form the inorganically filled mixture can range from as little as 5% to as high as 80% by weight of the inorganically filled mixture, and will preferably be in a range from about 10% to about 70% by weight, more preferably from about 20% to about 50% by weight.

It is preferable in most cases to include the minimum amount of water that is required to give the inorganically filled mixture the desired level of workability, and thereby reduce the amount of water that must be removed from the article. Decreasing the amount of water that must be removed generally reduces the cost of manufacture, since removing water requires energy.

C. Aggregate Fillers

The terms "aggregate" or "aggregate fillers" as used in this specification and the appended claims include both inorganic and organic particles having varying particle size distributions and being generally insoluble in water. Although most aggregates within the scope of the present invention are insoluble in water, some may be slightly soluble in water and some aggregates can be formed in situ by precipitation or polymerization.

Inorganic materials commonly used in the paper industry as well as more finely ground aggregate materials used in the concrete industry may be used in the inorganically filled mixtures of the present invention. Nevertheless, the size of the aggregate or inorganic filler particles will often be many times larger than inorganic fillers used in the paper industry. While the average diameter of the particles within the inorganic fillers used in the paper industry will usually be less than 2 microns, the average particle diameter of the aggregate materials used in the present invention can, in some cases, be up to 100 microns or larger depending on the wall thickness of the resulting article. Because the inorganic particles used in the present invention may have greater variances in size, they will typically have higher packing densities and a lower specific surface area.

Whereas in paper products the inorganic filler is added mainly to affect the color and the surface quality of the resulting paper product, the aggregate materials employed in the present invention can be added to increase the strength (tensile and, especially, compressive strength), increase the modulus of elasticity and elongation, decrease the cost by acting as an inexpensive filler, decrease the weight, and/or increase the insulation ability of the resultant highly inorganically filled article. In addition, plate-like aggregates such as mica and kaolin can be used in order to create a smooth surface finish in the articles of the present invention. Typically, larger aggregates such as calcium carbonate give a matte surface, while smaller particles give a glossier finish.

Examples of useful aggregate fillers include perlite, vermiculite, sand, gravel, rock, limestone, sandstone, glass beads, aerogels, xerogels, seagel, mica, clay, synthetic clay, alumina, silica, fly ash, fumed silica, fused silica, tabular alumina, kaolin, microspheres, hollow glass spheres, porous ceramic spheres, gypsum hemihydrate and dihydrate, calcium carbonate, calcium aluminate, cork, seeds, lightweight polymers, xonotlite (a crystalline calcium silicate gel), lightweight expanded clays, hydrated or unhydrated hydraulic cement particles, pumice, exfoliated rock, and other geologic materials. Partially hydrated and hydrated cement, as well as silica fume, have a high surface area and give excellent benefits such as high initial cohesiveness of the freshly formed article.

Even discarded inorganically filled materials, such as discarded containers or other articles of the present invention can be employed as aggregate fillers and strengtheners. It will also be appreciated that the containers and other articles of the present invention can be easily and effectively recycled by simply adding them to fresh inorganically filled mixtures as an aggregate filler.

Clay and gypsum are particularly important aggregate materials because of their ready availability, extreme low cost, workability, ease of formation, and because they can also provide a degree of binding and strength if added in high enough amounts. "Clay" is a term that refers to materials found in the earth that have certain chemical compositions and properties. The predominant clays include silica and alumina (used for making pottery, tiles, brick, and pipes) and kaolinite. The kaolinic clays are anauxite, which has the chemical formula $Al_2O_3.SiO_2.H_2O$, and montmorilonite, which has the chemical formula $Al_2O_3.SiO_2.H_2O$. However, clays may contain a wide variety of other substances, such as iron oxide, titanium oxide, calcium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the inorganically filled composites of the present invention.

Similarly, gypsum hemihydrate is also hydratable and forms the dihydrate of calcium sulfate in the presence of water. Thus, gypsum may exhibit the characteristics of both an aggregate and a binder depending on whether and how much of the hemihydrate form is used.

Even hydraulic cement, such as portland cement, can be added as an inorganic filler material within the inorganically filled mixtures of the present invention. Not only are hydraulic cements relatively inexpensive and plentiful, but they also can impart a degree of binding to the inorganically filled matrix if included in high enough amounts. In addition, hydraulic cement chemically reacts with water, thereby causing an internal drying effect within the mixture which effectively removes at least some of the water within the mixture without the need for evaporation. The same is true for gypsum hemihydrate and calcined clay. Prehydrated cement particles may also be added as an aggregate filler.

In addition, hydraulic cement can affect the rheology of the moldable mixture, at least in part by chemically reacting with the water, thereby diminishing the amount of water available to lubricate the aggregate particles and fibers. In addition, it has been found that portland grey cement can increase the internal cohesion of the inorganically filled mixture.

Lightweight aggregates having a high amount of interstitial space can be used in order to yield molded articles having increased insulation. Examples of lightweight aggregates include perlite, vermiculite, xonotlite, aerogels, xerogels, hollow glass spheres, synthetic materials (e.g., porous ceramic spheres, tabular alumina, etc.), cork, lightweight expanded clays, sand, gravel, rock, limestone, sandstone, pumice, exfoliated rock and other geological materials. Such materials can be added to reduce the thermal conductivity, or "k-factor", of the containers.

In addition to conventional aggregates used in the paper and cement industries, a wide variety of other aggregates, including fillers, strengtheners, metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and other such fibers typically used to prepare various types of composites), may be added to the inorganically filled compositions within the scope of the present invention. Even materials such as seeds, ungelated starch granules, gelatins, and agar-type materials can be incorporated as aggregates. Although these later aggregates are organic (and readily biodegradable), they are included in this section because they can act primarily as a filler, not as a binder.

Another class of aggregates that may be added to the inorganically filled mixture includes gels and microgels such as silica gel, calcium silicate gel, aluminum silicate gel, and the like. These can be added in solid form as any ordinary aggregate material might, or they may be precipitated in situ. Because they tend to absorb water, they can be added to reduce the water content (which will increase the yield stress) of the inorganically filled mixture.

In addition, the highly hygroscopic nature of silica-based gels and microgels allows them to be used as moisture regulation agents within the final hardened article. By absorbing moisture from the air, the gels and microgels can cause the inorganically filled articles to retain a predetermined amount of moisture under normal ambient conditions. (Of course, the rate of moisture absorption from the air will correlate with the relative humidity of the air). Controlling the moisture content of the articles allows for more careful control of the elongation, modulus of elasticity, bendability, foldability, flexibility, and ductility of the articles.

It is also within the scope of the present invention to include polymerizable inorganic aggregate materials, such as polymerizable silicates, within the moldable mixture. These may be added to the mixture as ordinary silica or silicates, which are then treated to cause a polymerization reaction in situ in order to create the polymerized silicate aggregate. Polymerized inorganic aggregates are often advantageous in certain applications because of their increased flexibility compared to most other inorganic aggregate materials.

It is often preferable according to the present invention to include a plurality of differently sized and graded aggregates capable of more completely filling the interstices between the aggregate particles and fibers within the inorganically filled mixture. Optimizing the particle packing density reduces the amount of water that is required to obtain the desired level of workability by eliminating spaces which would otherwise be filled with interstitial water.

In order to optimize the packing density, differently sized aggregates with particle sizes ranging from as small as about 0.05 microns to as large as about 2 mm may be used. (Of course, the desired purpose and thickness of the resulting product will dictate the appropriate particle size of the various aggregates to be used.) It is within the skill of one in the art to know generally the identity and sizes of the aggregates to be used in order to achieve the desired rheological properties of the inorganically filled mixture while in a wet state, as well as the final strength and weight properties of the final hardened articles.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Andersen, P. J., "Control and Monitoring of Concrete Production—A Study of Particle Packing and Rheology," The Danish Academy of Technical Sciences.

In light of the foregoing, the preferred amount of aggregate fillers included within the inorganically filled mixtures will depend on a variety of factors, including the quantity and identities of the other added components, as well as the particle packing density of the aggregates themselves. In most cases the inorganic aggregate filler be included in significant amounts, usually in an amount greater than about 20% by weight of total solids within the inorganically filled mixture. However, it is possible to manufacture containers from sheets or mixtures having no inorganic filler. Hence, the inorganic aggregate filler will be included in a range from 0% to as high as 90% by weight of total solids within the inorganically filled mixture, more preferably in a range from about 20% to about 80% by weight, and most preferably in a range from about 30% to about 70% by weight of total solids.

D. Fibers

As used in the specification and the appended claims, the terms "fibers" and "fibrous materials" include both inorganic fibers and organic fibers. Fibers are a particular kind of aggregate which may be added to the moldable mixture to increase the cohesion, elongation ability, deflection ability, toughness, ductility, fracture energy, and flexural and tensile strengths of the resulting inorganically filled matrix. Fibrous materials reduce the likelihood that the highly inorganically filled matrix will shatter when cross-sectional forces are applied.

Fibers which may be incorporated into the inorganically filled matrix preferably include naturally occurring organic fibers, such as cellulosic fibers extracted from plants or inorganic fibers made from glass, graphite, metal, silica, ceramic, or metal materials.

Preferred fibers of choice include glass fibers, abaca, bagasse, sisal wood fibers (both hard wood or soft wood, examples of which include southern hardwood and southern pine, respectively), and cotton. These fibers are preferably used in the present invention due to their low cost, high strength, and ready availability. Nevertheless, any equivalent fibers which impart the desired properties are certainly within the scope of the present invention. Recycled paper fibers can be used although they are somewhat less desirable because of the fiber disruption that occurs during the original paper manufacturing process. Other fibers which can be incorporated into the inorganically filled matrix include plastics, polyaramite, and Kevlar. Biodegradable plastics, such as polylactic acid and Biopol are environmentally benign fibers which can provide significant reinforcement to the matrix.

The fibers used in making the containers and other articles of the present invention preferably have a high length to width ratio (or "aspect ratio") because longer, narrower fibers can impart more strength to the inorganically filled structural matrix without significantly adding bulk and mass to the composite materials. The fibers should have an average aspect ratio of at least about 10:1, preferably greater than about 100:1, and most preferably greater than about 200:1.

The mount of fibers added to the inorganically filled mixtures will vary depending upon the desired properties of the final product, with tensile strength, toughness, flexibility, and cost being the principal criteria for determining the amount of fiber to be added in any mix design. The concentration of fibers within the final hardened article will preferably be in a range from about 0.5% to about 60% by weight of total solids, more preferably from about 2% to about 40%, and most preferably from about 5% to about 20%.

It will be appreciated however, that the strength of the fibers is a very important feature in determining the amount of the fiber to be used. The greater the tensile strength of the fiber, the less fiber that must be added to obtain a desired tensile strength in the resulting article. Of course, while some fibers have a high tensile, tear and burst strength, other types of fibers with a lower tensile strength may be more elastic. Fibers with a smaller aspect ratio are more easily placed and yield an article with fewer defects, while a larger aspect ratio increases the strength-imparting effect of the fiber. A combination of two or more fibers may be desirable in order to obtain a resulting product that maximizes multiple characteristics, such as higher tensile strength, higher elasticity, or better fiber placement.

For example, fibers such as southern pine and abaca have high tear and burst strengths, while others such as cotton have lower strength but greater flexibility. Southern hardwood fibers have a lower aspect ratio. A mixture of southern hard wood and southern pine allows for better dispersion of the fibers throughout the inorganically filled mixture, yielding an article with good fiber dispersion and excellent folding endurance. The fibers used in the present invention preferably do not undergo the intense processing of fibers used to make paper products in order that they maintain far more of their original strength.

Finally, it is known that certain fibers and inorganic fillers are able to chemically interact and bind with certain starch-based organic polymer binders, thereby adding another dimension to the materials of the present invention. For example, it is known that many fibers and inorganic fillers are anionic in nature and have a negative charge. Therefore, in order to maximize the interaction between the organic binder and the anionic fibers and inorganic materials, it may be advantageous to add a positively charged organic binder, such as a cationic starch.

Better water resistance can be obtained by treating the fibers with rosin and alum $(Al_2(SO_4)_3)$ or $NaAl(SO_4)_2$, the latter of which precipitates out the rosin onto the fiber surface making it highly hydrophobic. The aluminum floc that is formed by the alum creates an anionic adsorption site on the fiber surface for a positively charged organic binder, such as a cationic starch.

In some embodiments it may be preferable to utilize continuous fibers or filaments embedded within or wrapped around the inorganically filled matrix of the container. Continuous fibers or filaments typically comprise Kevlar, polyaramite, glass, carbon, and cellulose fibers. In some cases the greatest strength can be derived by spiral winding the continuous fibers around or within the inorganically filled matrix. The criss-cross orientation of spiral wound fibers provides greatly increased tensile strength in all directions. The continuous fibers can be co-extruded within a tube used to form the sidewalls of the containers. Similarly, continuous fibers can be utilized within sheets formed from inorganically filled mixture that are bent, folded or rolled into the desired container. Finally, fibrous mesh, fabrics, or mats can also be used to reinforce the inorganically filled matrix.

E. Dispersants.

The term "dispersant" shall refer in the specification and the appended claims to the class of materials which can be added to reduce the viscosity and yield stress of the inorganically filled mixture for a given concentration or water. A more detailed description of the use of dispersants may be found in the Master's Thesis of Andersen, P. J., "Effects of Organic Superplasticizing Admixtures and their Components on Zeta Potential and Related Properties of Cement Materials" (The Pennsylvania State University Materials Research Laboratory, 1987).

Dispersants generally work by being adsorbed onto the surface of the aggregate particles and/or into the near colloid double layer of the particles, particularly if hydraulic cement particles are added. This creates a negative charge on or around the surfaces of the particles, causing them to repel each other. This repulsion of the particles adds "lubrication" by reducing the friction or attractive forces that would otherwise cause the particles to have greater interaction. This lubrication tends to also increase the packing density of the aggregate particles somewhat, which allows for the addition of less water while maintaining workability of the mixture. Dispersants generally work better if added before a gelatinized organic binder is added or produced within the mixture. Dispersants act in a manner that is opposite or so dissimilar to the organic binder that dispersants may not be considered to constitute one of the binders in the inorganically filled matrix.

A preferred dispersant is sulfonated naphthaleneformaldehyde condensate, an example of which is marketed under the trademark WRDA 19, which is available from W. R. Grace, Inc. Other dispersants which can also work well include sulfonated melamine-formaldehyde condensate, lignosulfonate, and polyacrylic acid. If included, the concentration of dispersant will generally range up to about 5% by weight of the water, more preferably in the range from about 0.5% to about 4%, and most preferably within the range from about 1% to about 2%.

F. Interstitial Voids

The terms "interstitial voids," and "air voids" as used in this specification and the appended claims include empty spaces within the inorganically filled matrix. It may be desirable to incorporate air voids within the inorganically filled matrix in addition to or instead of lightweight aggregates in order to reduce the density and increase the insulating properties of the containers or other articles.

Air voids may be introduced by high shear, high speed mixing of the inorganically filled mixture, with a foaming or stabilizing agent added to the mixture to aid in the incorporation and retention of air voids. Suitable foaming and air entraining agents include commonly used surfactants. One currently preferred surfactant is a polypeptide alkylene polyol, such as Mearlcrete® Foam Liquid.

In conjunction with the surfactant, it is generally necessary to stabilize the entrained air within the moldable mixture using a stabilizing agent like Mearlcel 3532®, a synthetic liquid anionic biodegradable solution. Both Mearlcrete® and Mearlcel® are available from the Mearl Corporation in New Jersey. Another foaming and air-entraining agent is vinsol resin. In addition, the organic polymer binder can act to stabilize the entrained air. Different air-entraining agents and stabilizing agents impart different degrees of foam stability to the inorganically filled mixture, and they should be chosen in order to impart the properties that are best suited for a particular manufacturing process. The heated molding process will tend to increase the volume of the air voids according to the ideal gas equation.

Another foaming agent is a mixture of citric acid and bicarbonate or bicarbonate that has been processed into small granules or particles and coated with wax, starch, or water soluble coatings. This can be used in void formation two ways: (1) to react with water and form $CO_2$ gas in order to create a cellular foam structure within the inorganically filled matrix or (2) to pack the particles as part of the matrix and after hardening the matrix remove the foam particles by heating the product above 180° C., which causes an endothermic decomposition of the particles, leaving behind a well controlled cellular lightweight structure.

Air voids may be introduced into the inorganically filled mixture during the molding process by adding a blowing agent to the mixture, which will expand when heat is added to the mixture. Blowing agents typically consist of a low boiling point liquid and finely divided calcium carbonate (chalk). The chalk and blowing agent are uniformly mixed into the moldable mixture and kept under pressure while heated. The liquid blowing agent penetrates into the pores of the individual chalk particles, which act as points from which the blowing agent can then be vaporized upon thermal expansion of the blowing agent as the pressure is suddenly reduced. Water can act as a low-cost blowing or foaming agent by heating the inorganically filled mixture to above the boiling point of water.

III. Specific Applications of the Materials into Articles

The key component which gives strength to the inorganically filled matrix of the containers of the present invention is the binder effect caused by the removal of a substantial quantity of water by evaporation from the organic polymer binder. Within the structural matrix are other components (such as fibers, aggregate fillers, air voids, and other admixtures) which add additional characteristics and properties to the materials.

A. Effect of Components on Mixture Rheology

The amount of water that should be added to obtain a mixture having adequate workability and flowability will depend on the concentrations and identities of the various components, such as the inorganic filler or aggregate, fibers, the organic binder, and of other admixtures (such as dispersants, plasticizers, mold release agents or lubricants). In general, however, the addition of more water will decrease the viscosity and yield stress of the inorganically filled mixture, thereby increasing the flowability of the mixture and decreasing the form stability of an object molded therefrom until a sufficient amount of the water has been removed by evaporation.

The water-dispersible binders can greatly affect the rheology of the mixture depending on the identity, concentration, and extent of gelation of the organic binder. As set forth above, preferred organic polymer binders can roughly be divided into the following categories: cellulose-based, starch-based, protein-based, polysaccharide-based, and synthetic organic. Within each of these broader categories are numerous subcategories and divisions. A unifying feature of each of these materials is that they will generally dissolve, gelate or at least be fairly thoroughly dispersed in the water. Hence, they require adequate levels of water for their dispersion and activation (including gelation) within the mixture.

Nevertheless, the organic polymer binders have greatly varying levels of water solubility or dispersibility, as well as varying levels of viscosity and yield stress. Organic polymers within the same class may have greatly varying viscosities depending on the molecular weight. For example, a 2% solution of Tylose® FL 15002 at 20° C. has a viscosity of about 15000 cps, while a similar solution of Tylose® 4000 has a viscosity of about 4000 cps. The former greatly increases the yield stress and plastic-like properties of a moldable mixture, while the latter acts more as a lubricant or plasticizer.

Other organic polymers react at different rates and different temperatures within the water. Although many organic polymer binders such as Tylose® neither polymerize or depolymerize when added to the moldable mixture, but rather gelate and then dry out to form a bonding matrix, it is within the scope of the present invention to add water soluble or water-dispersible polymerizable units to the moldable mixture which will thereafter polymerize in situ over time. The rate of the polymerization reaction can be regulated by adjusting the temperature of the mixture and/or adding a catalyst or inhibitor. Examples of polymerizable units which may be added to a moldable mixture include Cellosize and latex forming monomers.

With regard to gelation, most cellulose-based polymers (such as Tylose®) will readily gelate in water at room temperature. Others, such as many starches, will only gelate in water at higher temperatures. Modified starches can, however, gelate at room temperature. Hence, cellulose-based and modified starch-based polymer binders are advantageous in that a moldable mixture can be formed therefrom at room temperature. Nevertheless, they are generally significantly more expensive than unmodified starch granules, which must be heated to gelate.

Other admixtures which may be added to directly influence the rheology of the moldable mixture include dispersants, plasticizers, and lubricants. Dispersants such as sulfonyl-based materials greatly decrease the viscosity and increase the workability of the moldable mixture while keeping the amount of water constant. A corollary is that using a dispersant allows for the inclusion of less water while maintaining the same level of workability. A preferred plasticizer and lubricant is polyethylene glycol.

The amount, identity, and particle packing density of the aggregates can affect the rheology and workability of the moldable mixture. Aggregates which are porous or which have a high specific surface area will tend to absorb more water than nonporous aggregates, thereby reducing the amount of water available to lubricate the particles. This results in a stiffer, more viscous mixture. Particle packing density can greatly impact the rheology of the mixture by determining the amount of interstitial space which generally must be filled by water, lubricants, organic polymers, or other liquids in order for the mixture to flow.

By way of example, an aggregate system having a packing density of 0.65 will generally require about 35% liquids (including water) by volume in order to substantially fill the interstitial space between the particles. On the other hand, an aggregate system having a packing density of 0.95 will generally require only about 5% liquids by volume in order to substantially fill the voids. This represents a seven-fold decrease in the amount of water required to fill the interstitial space, which directly correlates to the rheological properties, including the level of workability, of the mixture. The actual particle packing density will generally range somewhere between these two extremes and should be calculated when determining how much water to add to the mixture initially. The size and morphology of the aggregate particles can also affect the rheology and flow properties of the mixture to some degree.

Hydraulically settable materials such as hydraulic cement, gypsum hemihydrate, and calcium oxide can be utilized as a water absorption agent. These chemically react with the water, thereby reducing the effective level of water within the inorganically filled mixture without resorting to heating or drying techniques. Such materials can greatly affect the rheology of the mixtures as a function of the extent of hydration, which in turn is a function of time. In addition, it has been found that hydraulic cement increases the cohesive strength of the fresh inorganically filled mixture and a fresh article made therefrom. It is the internal cohesion that holds the inorganically filled material together, enabling the material to be molded and thereafter maintain its form until it has dried sufficiently to obtain sufficient strength.

Finally, other solid components within the mixture, such as fibers, will affect the theology of the mixture in similar fashion to the aggregates. Certain fibers may absorb water depending on their porosity and swelling capability. In addition, certain fibers can be treated to become ionically charged, which will allow them to chemically interact with ionically charged organic plasticizers, such as ionic starches.

B. Effect of Components on Final Properties

With regard to the final dried or hardened inorganically filled matrix, some of the properties considered to be generally desirable include high tensile strength (in general or along particular vectors), flexural strength, flexibility, and ability to elongate, deflect or bend. In some cases, it may be desirable to obtain articles which substantially incorporate the properties of existing articles made from paper, paperboard, or plastic materials. However, in other cases it may be desirable to obtain a structural matrix having properties not obtainable using conventional materials. These may include increased toughness, higher modulus, water resistance, or lower bulk density.

In contrast to articles formed from tree paper or paperboard, in which the properties of the sheets and subsequent articles are extremely dependent on the properties of the pulps used, the properties of the articles of the present invention are substantially independent of the properties of the fibers used in making the moldable mixture for forming. To be sure, using longer, more flexible fibers will impart more flexibility to the article than shorter, stiffer fibers. However, properties that are largely pulp-dependent in conventional papers can be designed into the present articles by adjusting the concentrations of the nonfibrous components of the inorganically filled mixture as well as the processing techniques used. Such properties as stiffness, rigidity, surface finish, porosity, and the like are generally not dependent on the type of fibers incorporated into the current articles.

The flexibility, tensile strength, flexural strength, or modulus can be tailored to the particular performance criteria of the container by altering the components and relative concentrations of the components within the inorganically filled mixture. In some cases, higher tensile strength may be an important feature. In others, it may be less significant. Some articles should preferably be more flexible, while others will be stiff. Some will be relatively dense, others will be thicker, lighter, and more insulative. The important thing is to achieve a material which has properties appropriate for a particular use, while remaining cognizant of cost and other practical production line parameters. While having "too much" or "too little" of a particular property may be inconsequential from the standpoint of performance, from a cost standpoint it may be wasteful or inefficient to provide an excess of a particular property.

In general, increasing the amount of the water-dispersible organic polymer binder will increase the tensile and flexural strength of the final hardened article, while also greatly increasing the flexibility and resilience of the article. Adding more organic binder also decreases the stiffness of the article. Similarly, increasing the concentration of fibers within the mixture also increases the tensile strength of the final article, particularly higher tensile strength fibers, such as ceramic fibers, although such fibers are stiff and will yield a relatively stiff hardened article. Conversely, adding flexible fibers such as natural cellulosic fibers will greatly increase the flexibility as well as the tensile, tear, and burst strengths of the article.

Different fibers have greatly varying degrees of tear and burst strength, flexibility, tensile strength, ability to elongate without breaking, and stiffness. In order to obtain the advantageous properties of different types of fibers, it may be preferable in some cases to combine two or more different kinds of fibers within the inorganically filled mixture.

Certain article forming processes, such as extrusion and rolling, tend to orient the fibers in the direction of elongation of the mixture. This may be advantageous in order to maximize the tensile strength of the article or sheet in a certain direction. For example, where the sheet forming an article will be required to bend along a hinge, it is preferable for the fibers to be oriented in a way so as to more effectively bridge the two sides of the hinge or bend by being oriented perpendicular to the fold line. It may be desirable to concentrate more of the fibers in the area of a hinge or where the sheet requires increased toughness and strength. When molding an article from a sheet molded from the mixture, fiber orientation can also be achieved through rolling processes described hereinbelow.

The type of aggregate can also affect the properties of the final hardened article. Aggregates comprising generally hard, inflexible, small particles such as clay, kaolin, or chalk will generally result in an article having a smooth surface and an increased brittleness. Lightweight aggregates, such as perlite or hollow glass spheres, result in an article having lower density, lower brittleness, and greater insulating ability. Aggregates such as crushed sand, silica, gypsum, or clay are extremely inexpensive and can greatly reduce the cost of manufacturing an article therefrom. Any material with a high specific surface area gives increased drying shrinkage and shrinkage defects. Materials with lower specific surface areas are advantageous because they are less sticky, which helps inhibit the mixture from adhering to the molding apparatus.

Hydraulically settable materials such as hydraulic cement, gypsum hemihydrate, and calcium oxide provide small to significant degrees of binding within the hardened article depending on the amount in which such hydraulically settable inorganic aggregates are added. Such hydraulically settable inorganic aggregates increase the stiffness and compressive strength of the final article and, to some degree, the tensile strength. Hydraulic cement can also decrease the solubility of the article in water, thereby increasing the resistance of the article to water degradation.

Finally, other admixtures within the moldable mixtures can add a waterproofing property to the final product, such as by adding rosin and alum to the mixture. These interact to form a very water resistant component within the structural matrix. Water resistance can be introduced by treating the article surface with a 5–10% w/w starch solution in order to seal the surface porosity. In the absence of significant quantities of such waterproofing agents, water can be used to remoisten the article and temporarily increase the flexibility, bendability, and elongation before rupture. This is particularly useful where the mixture is first formed into a sheet that will subsequently be formed into the container. Of course, water can also facilitate the degradation of the article after it has been discarded.

As a general rule, articles which have lower concentrations of organic polymer binder and fiber but high concentrations of inorganic aggregates will be more rigid, have a higher insulation ability, have a higher compressive strength, have lower cohesiveness, resist heat damage, have lower tensile strength, and resist water degradation (particularly if they contain significant amounts of hydraulic cement, the inclusion of which can also increase the compressive strength of the final article).

Articles which have lower concentrations of organic binder but higher fiber and inorganic aggregate content will have higher tensile strength, compressive strength and toughness, but have lower flexural strengths and stiffness, with moderate flexibility, and be fairly resistant to water degradation (particularly if hydraulic cement is included in great enough amounts).

Articles which have higher concentrations of organic polymer binder and lower concentrations of fiber and inorganic aggregate will be more water soluble and degradable, easier to mold (allowing for the manufacture of thinner articles), have moderately high compressive and tensile strengths, higher toughness, moderate flexibility, and lower stiffness.

Finally, articles which have higher concentrations of organic polymer binder and fiber but low concentrations of inorganic aggregate will have properties that are most similar to paper (both tree and plant paper), will have higher tensile strength, toughness, and folding endurance, have moderate compressive strength, have very low resistance to water degradation, will have lower resistance to heat (particularly those approaching ignition point of fibers or decomposition temperature of the binder), and have higher flexibility and lower stiffness.

The inorganically filled matrix of the articles formed using the compositions described herein will preferably have a tensile strength in the range from about 0.05 MPa to about 100 MPa, and more preferably in the range from about 5 MPa to about 150 MPa. In addition, the inorganically filled matrix of the articles will preferably have a density in the range from about 0.2 g/cm$^3$ to about 2 g/cm$^3$, and more preferably from about 0.5 g/cm$^3$ to about 1.5 g/cm$^3$. Whether an article will have a density at the lower, intermediate, or higher end of this range will generally depend on the desired performance criteria for a given usage. In light of the foregoing, the inorganically filled matrix of the articles of the present invention will preferably have a tensile strength to bulk density ratio in the range from about 2 MPa·cm$^3$/g to about 500 MPa·cm$^3$/g, and more preferably in the range from about 5 MPa·cm$^3$/g to about 150 MPa·cm$^3$/g.

The term "elongate" as used in the specification and appended claims with regard to the articles of the present invention means that the structural matrix of the article is capable of being stretched without substantial rupture. The ability of the structural matrix of the article to elongate before rupture may be measured by an Instron tensile test and a stress strain test.

By optimizing the mix design, it is possible to manufacture a freshly molded article which has a structural matrix capable of elongating up to about 30% before tearing or rupturing occurs, and from about 0.5% to 12% upon drying. This is usually accomplished by optimizing the amounts of fiber and organic binder within the moldable mixture and resulting matrix. Producing an article having a structural matrix capable of elongating within the specified range can be accomplished by including fibers within the hardened article in an amount of up to about 60% by weight. The greater the amount of fibers or organic binder added, or the better the matrix to fiber interface, the more elongation that can generally be achieved without rupture of the article.

The term "deflect" as used in the specification and appended claims is related to the ability of a dried article to be bent, folded or rolled without rupture and change in the finished surface. The ability of the article to deflect is measured by measuring the elasticity modulus and the fracture energy of the article using methods known in the art. As with any material, the bending ability of an article manufactured according to the present invention is largely dependent upon the thickness of the wall of the article.

One way to measure deflection without regard to wall thickness is to define deflection as the relative elongation of one side of the wall or sheet compared to the other side. As the wall is rolled or bent around an axis, the length of the outer side of the wall will elongate, while the inner side generally will not. Consequently, a thinner walled article can be bent a far greater degree because the relative elongation of the outer side compared to the elongation of the inner side is much less compared to a thicker walled article.

During the process of forming a partially dried sheet into an appropriate article the bendability of the sheet can be temporarily increased by remoistening with water. It is believed that the water is absorbed by the fibers, water-dispersible organic binder, and the interstices between the aggregate particles. Upon drying the formed article, the level of bendability will generally decrease while the toughness and hardness will generally increase.

In order to obtain an article having the desired properties of strength, bendability, insulation, toughness, weight, or other performance criteria, the thickness of the article can be altered by adjusting the space between the dies and/or rollers. Depending on the thickness and desired performance criteria, the components and their relative concentrations can be adjusted in order to accommodate a particular article thickness. The articles of the present invention may be designed to have greatly varying thicknesses; however, most articles requiring thin walls will generally have a thickness in the range from about 0.05 mm to about 3 mm. Nevertheless, in applications where insulation ability or higher strength or stiffness is more important, the wall thickness of the article may range up to about 2 cm.

III. Forming the Sealable, Thin-walled Containers

There are many methods for forming the sealable, liquid-tight and/or pressure-tight, thin-walled containers of the present invention. These include formation of the containers, or portions of the containers, by extrusion, direct molding, formation from dry or wet sheets, and the like. After the containers have been formed they can be subjected to several other processing steps, such as printing, applying a coating or liner, and laminating the container. The compositions can readily be formed into the structural components of containers having a variety of shapes, including hollow body portions and closure means.

In order for the inorganically filled matrix to exhibit increased properties of directional tensile strength, toughness, and fracture energy, the fibers can be advantageously unidirectionally or bidirectionally aligned or stacked according to the present invention. However, a random dispersion of fibers yields an inorganically filled matrix having more uniform strength.

An alignment of fibers can be achieved by any number of molding techniques, such as jiggering, ram-pressing, pultrusion, hot pressing, extrusion, or rolling the inorganically filled mixture. Generally, the fibers are oriented in the direction of the flow of material during the molding process. By controlling the flow patterns of the material during the molding process, it is possible to build a container having the desired fiber orientation.

In order for the inorganically filled mixtures of the present invention to be effectively formed, it is important that the inorganically filled composition be form stable in the green state; that is to say, the formed product must rapidly be able to support its own weight. Further, it must harden sufficiently such that it can be quickly ejected from a mold. Otherwise, the cost of molding may make the process uneconomical. In addition, the surface of the formed article cannot be too sticky, as that would make it difficult to remove from the molding apparatus and to handle and stack the formed articles. Removing a significant quantity of water by evaporation increases the form stability and reduces the stickiness of the molded inorganically filled materials.

Whether a more or less viscous inorganically filled mixture is required, it is generally desirable to include as little water as is necessary to impart the requisite rheology for a particular molding process. One mason for minimizing the water is to control the capillary action of the water in the inorganically filled mixture, as this may cause stickiness of the inorganically filled mixture, which in turn can cause problems in demolding the mixture from the mold. Minimizing the amount of water eliminates the free water and reduces the chemical and mechanical adherence of the material to the mold. Furthermore, the resulting inorganically filled matrix will generally be stronger if less water is added initially. In addition, the more water that is included, the more that must be removed during the molding process, which increases the manufacturing cost.

There are several modifications to conventional molding processes which are preferably employed in order to improve the manufacturing process. For example, it is frequently desirable to treat the mold with a releasing agent in order to prevent sticking. Suitable releasing agents include silicon oil, Teflon®, Deleron®, and UHW®. Preferably, the mold itself will be made of stainless steel and/or coated with a material having a very slick finish, such as Teflon®, Deleron®, or chrome plating polished to about 0.1 RMS.

A. Preparing the Inorganically Filled Mixtures

The mixing system used to prepare the inorganically filled mixture used in forming the containers of the present invention includes a mixer and a delivery system. The various components are typically loaded into hoppers where they are metered by weight and fed into the mixer in creating the inorganically filled mixture. As previously discussed, the inorganically filled mixture is microstructurally engineered to have certain desired properties. Consequently, the metering of the bulk materials is regulated to ensure proper proportioning according to design specifications of the inorganically filled mixture.

The mixing method is substantially the same for containers formed by direct molding, from pre-formed wet or dry sheets, or by extrusion. The composition of the mixtures will, however, vary. A preferred method of preparing the desired mixture includes the steps of (a) mixing the water-dispersible organic polymer binder and water in order to form a gel or suspension; (b) blending the fibrous material (such as cellulose fiber or from other sources such as glass, plastic, or metal) into the gel or suspension using high shear mixing to form a mixture in which the fibers are well-dispersed; (c) combining one or more aggregate fillers into the mixture using generally low shear mixing. In the case of lightweight aggregates such as perlite, pumice, or exfoliated rock, it is usually best to use a very low shear mixer to avoid breaking the aggregate into a powder. In alternative embodiments, other additives such as air entraining agents, dispersants, mold release agents, humectants, plasticizers, and other admixtures can be incorporated into the mixture so as to obtain a mixture having the desired properties.

An example of a plasticizer that can be added to the inorganically filled mixture is glycerin. In addition, the surface of a newly demolded article or sheet can be treated with glycerin, usually as an aqueous mixture. In some cases, the aqueous glycerin solution may include a water-borne coating that is applied. The glycerin helps to stabilize the inorganically filled matrix so that it is more resistant to warping when water or aqueous materials come into contact with the inorganically filled matrix.

The combination of high shear mixing and high yield stress imparted to the mixture by the water-dispersible binder cause the shearing and mixing forces to be transferred down to the fiber level to ensure that the fibers are well-dispersed throughout the mixture. This results in a more uniformly blended mixture, which improves the consistency of the uncured mixture as well as increasing the strength of the final hardened container or portion thereof.

In one embodiment, the materials utilized in the mixture are automatically and continuously metered, mixed, deaired and extruded by a twin auger extruder apparatus. A twin auger extruder apparatus has sections with specific purposes such as low shear mixing, high shear mixing, vacuuming and pumping. A twin auger extruder apparatus has different flight pitches and orientations enabling the sections to accomplish their specific purposes. It is also possible to premix some of the components in a vessel, as needed, and pump the premixed components into the twin auger extruder apparatus. The preferable twin auger extruder apparatus utilizes uniform rotational augers wherein the augers rotate in the same direction. Counter rotational twin auger extruders, wherein the augers rotate in opposite directions, accomplishes a similar purpose. A pugmil may also be utilized.

In another embodiment, a cement mixer capable of both high and low shear mixing, such as the RV-11 mixer, available from EIRICH of Germany, is used to meter and mix the materials in a batch mode. A simple mixer can typically supply mixed inorganically filled mixtures for downstream production lines used to form the containers. High energy mixers described in U.S. Pat. No. 5,061,319 entitled "Process for Producing Cement Building Material", U.S. Pat. No. 4,944,595 entitled "Apparatus for Producing Cement Building Material", U.S. Pat. No. 4,552,463 entitled "Method and Apparatus for Producing a Colloidal Mixture" and U.S. Pat. No. 4,225,247 entitled "Mixing and Agitating Device", which are incorporated here in by specific reference, can be used for mixing the inorganically filled mixtures. High shear energy mixtures within the scope of these patents are available from E. KHASHOGGI INDUSTRIES in Santa Barbara, Calif.

B. Methods for Manufacturing Containers or Portions Thereof from Inorganically Filled Mixtures The processed inorganically filled mixtures obtained using the above-identified components and mixing methods are molded, rolled, or extruded to form at least a portion of the containers within the scope of the present invention. The primary structural components of the sealable containers of the present invention are the hollow body portion and the closure means. After the structural components have been formed, further processing may be necessary before the structural components are assembled into a container.

Several different methods of manufacturing the structural components of the containers from inorganically filled mixtures are within the scope of the present invention. The containers can be formed by utilizing one or more of the different methods having a wide variety of design features and strength properties. The methods of manufacturing can be categorized into three broad groups: (1) direct molding; (2) reformation of inorganically filled wet or dry sheets, and (3) extrusion. Direct molding is typically used to form articles having a three-dimensional shape, including angled or rounded portions. Dry sheet formation is employed to form side walls of cans, bottles or other generally cylindrical containers, as well as to form boxes. Extrusion can be used to form hollow sidewall portions and other components having a generally uniform cross-section. Of course, extruded mixtures can be reformed into any desired shape as well.

1. Formation of Structural Components by Direct Molding

A variety of possible direct molding methods can be used in the manufacture of the containers of the present invention, such as injection molding, die press molding, wet sheet molding, and blow molding. The containers can be formed by conventional molding processes known in the art of molding, utilizing such devices as split molds, multiple parting, progressive dies and multi-cavity molds.

Typical molding systems, however, are utilized with thermoforming materials such as plastic while the inorganically filled materials of the present invention may be considered to be thermosetting. Thermoforming entails shaping a heated material and allowing it to cool while thermosetting entails shaping a material and heating it to harden or set. The processes and equipment utilized within the scope oft his invention are modified on the basis of this distinction. Specifically, means must typically be provided to heat the inorganically filled mixture and to allow the escape of water vapor.

(a) Positioning

After the inorganically filled mixture has been prepared as discussed above, the next step in the direct molding processes is positioning the inorganically filled mixture between a set of dies for subsequent shaping of the inorganically filled container or a portion thereof. The mold typically includes a male die having a desired shape and a female die having a shape substantially complementary to that of the male die. Accordingly, as the inorganically filled mixture is pressed between the dies, it is formed into a container or a portion thereof having the complementary shape of the dies.

Injection molding utilizes a vacuum auger to inject or feed the inorganically filled mixture between the dies. The vacuum auger applies a negative pressure to the inorganically filled mixture in order to remove unwanted air from wig the inorganically filled mixture. Failure to remove such air (unless the air is desired to create fine voids to impart insulative characteristics) can result in the container having a defective or nonhomogeneous structure matrix.

Injection molding can also utilize an extruder positioned to move towards the molding apparatus in a piston action, extrude into the molding apparatus, and then move away from the molding apparatus. This arrangement can be useful for extruding and molding at different temperatures to avoid plugging the extruder with a mixture that has hardened due to the heat of the molds. The piston action of this apparatus minimizes the heat transfer from the mold to the extruder and results in a safer manner of production.

After the mixture has been extruded, the direct molding of the inorganically filled mixture involves positioning the inorganically filled mixture between the male die and the female die. The male die is partially inserted into the female die such that a gap distance is created between the dies. The "gap distance" is defined as the distance one die must travel with respect to the other die for mating of the dies. The dies are "mated" when they are inserted into one another so as to form a mold area between the dies. The "mold area" defines the desired shape of the container and is the area into which the inorganically filled mixture is positioned when the dies are mated.

When the dies are positioned so as to have a gap distance, a cavity remains between the dies. This cavity comprises the mold area between the dies, and a second area also between the dies which corresponds to the gap distance. Once the cavity is formed, the inorganically filled mixture can be positioned into the cavity by being injected through a hole in one of the dies or through the gap distance.

In a preferred embodiment, the female die is positioned vertically above the male die. The inorganically filled mixture is then injected between the dies through an injection port extending through the female die. The arrangement of having the female die above the male die is preferred, since once the inorganically filled container is formed and the dies are separated, the force of gravity assists in ensuring that the molded container remains on the male die. This is beneficial as it is easier to subsequently remove the container from the male die without deforming the container.

Before positioning the inorganically filled mixture, it is preferable to minimize the gap distance between the dies so as to limit the movement of the inorganically filled mixture during the final pressing or mating of the dies. Minimizing the movement of the mixture decreases the chance of irregularities in the final container as a result of differential flow in the inorganically filled mixture. Accordingly, the gap distance between the male die and the female die is typically in a range from about 0.1 mm to about 1 cm, with about 0.25 mm to about 5 mm being more preferred, and about 0.5 mm to about 2 mm being most preferred. It should be noted, however, that for unusually large objects, the gap distance may be much larger to facilitate positioning of the inorganically filled mixture.

Another method of positioning the inorganically filled mixture between the dies occurs while the dies are still fully separated. The method comprises forming a portion of the inorganically filled material into a mass, then placing the mass between the dies, typically by resting the mass on the top of the male die. Subsequently, as the dies are mated, the mass is pressed between the dies.

In an alternative embodiment, a template is used to position the inorganically filled mass. In this embodiment, the male die has a base with a circumference; and the template has a passage with an inner cavity perimeter substantially complimentary to the circumference of the base of the male die. The method comprises forming a portion of the inorganically filled mixture into a mass having a diameter sufficiently large to span the inner cavity of the template. The mass is then placed on the template so as to span the inner cavity. Finally, the template is placed between the male die and the female die such that the cavity template is complementarily aligned with the dies. Thereafter, as the dies are pressed together, the male die travels through the cavity of the template in order to press the inorganically filled mixture between the dies.

The above method can further include the step of moving the template down over the male die such that the template becomes positioned about the base of the male while the mass independently rests on the male die. Subsequently, as the dies are pressed together, the mass is pressed between the dies. Additional benefits relating to the use of the template will be discussed hereinafter with respect to the step relating to removing the container from the dies.

The containers shown in FIGS. 1, 2, 7, 8 and 11 all have structural components which are produced through a molding process involving extrusion or direct molding. In FIG. 1, for example, the container is formed by molding the individual components of the container shown generally at 10, namely, the hollow body portion 12, the top 24 and the cap 26. A separate set of molds is required for each individual component.

To integrally form the hollow body portion 12 depicted in FIG. 1, an extruded plate or plug is preferably positioned on top of the male mold. The male mold part rises and lifts the mixture upwards and into a female split mold. The coupled male and female molds form the extruded plate-like article into the desired shape. The temperature differential between the female and male molds is preferably about 10° C. Due to the external threads 22 around the outer periphery of the open end 20 of hollow body portion 16, a split female mold is necessary to achieve release of the hollow body portion from the female half of the mold.

The top 24 and cap 26 can be formed through a similar molding process, except that the female mold halves must be split and the male mold must collapse in order to achieve release due to the threaded configurations of these components. Such devices as split molds, multiple parting molds, multi-cavity and progressive dies are among many commonly utilized techniques in the molding art to achieve the negative release of components having such threaded configurations, as well as for other complex configurations.

(b) Forming and Molding

The next step in the manufacturing process is pressing the inorganically filled mixture between the male die and the female die in order to mold the inorganically filled mixture into the desired shape of the container or portion thereof. The amount of pressure applied to the inorganically filled mixture can affect the strength and surface qualities of the resulting container.

Although a high pressure is generally desirable, it may not be desirable in some cases. To produce a lightweight container, low density aggregates (such as perlite or hollow glass spheres) are typically added to the mixture. As the pressure exerted by the dies is increased, these aggregates may be crushed, thereby increasing the density of the aggregate and the density of the resulting container, while decreasing the insulative effect of the aggregates.

Accordingly, the pressure applied by the dies should be optimized so as to maximize the strength, structural integrity, and maintain the proper density of the container. Accordingly, the pressure exerted by the male and female dies on the inorganically filled mixture is preferably within a range from about 50 psi to about 100,000 psi, more preferably from about 100 psi to about 20,000 psi, and most preferably from about 150 psi to about 2000 psi. However, as discussed below, the amount of pressure will vary depending upon the temperature and time of the molding process. Additionally, containers with a deep draw generally require an increase in velocity to decrease the time necessary for pressing. The time must be decreased to maintain the necessary flow without drying the material prematurely.

The pressing step further includes expelling the air and water vapor from between the dies when the dies are pressed together. Failure to remove such air and water vapor can result in air pockets or deformities in the inorganically filled matrix. Typically, air between the dies is expelled through the gap distance between the dies as the dies are pressed together. The dies are also typically equipped with a plurality of vent holes in order to allow for the escape of water vapor. The vent holes also prevent the creation of a vacuum within the cavity as the dies are separated by allowing air to return into the cavity. Such a vacuum could exert an undue force on the newly formed container, thereby disrupting its structural integrity.

(c) Heating and Form Stability

Concurrent with the pressing step is the heating of the inorganically filled mixture for a sufficient period of time to remove a substantial quantity of water from the inorganically filled mixture. The preferred method for heating the inorganically filled mixture comprises heating the male die and the female die each to a respective temperature before pressing the mixture between them.

Increasing the temperature of the dies prior to the pressing step serves several functions. First, the heated dies cause the removal of a substantial quantity of water from the molded inorganically filled mixture by evaporation. Furthermore, as the water on the surface of the container evaporates, that portion of the inorganically filled mixture rapidly becomes dry, forming a thin "shell" around the container which increases the form stability of the molded container and reduces adhesion of the mixture to the mold.

The ability to rapidly impart form stability to the inorganically filled container in the green state is important, as it permits mass production of the containers. Form stability allows the containers to be quickly removed from the pressing apparatus so that new containers can be formed using the same pressing or molding equipment. Adhesion of the inorganically filled mixture to the dies is also minimized by the formation of a boundary layer of steam between the dies and the inorganically filled mixture.

Experiments have determined that if the male die and female die have a variance in temperature, the inorganically filled material will have a tendency to remain on the die with the lower temperature when the dies are separated. Accordingly, one can select the die on which the inorganically filled container is to remain as the dies are separated.

The respective temperatures of the dies are important to maximizing the speed of the manufacturing process and are dependent, in part, upon the duration that the dies are in contact with inorganically filled material. In general, it is desirable that the mold temperatures be as high as possible—the higher the temperature, the faster the drying on the surface of the containers, the quicker thy can be demolded and the more containers that can be made per unit of time.

To achieve the above desired objectives, it is preferable to heat the female and male die to a temperature in a range from between about 50° C. to about 240° C., more preferably between about 80° C. to about 160° C., and most preferably between about 100° C. to about 130° C.

The duration in which the heated male die and the heated female die are both in contact with the inorganically filled material (i.e., the time that the dies are mated) is preferably within the range from about 0.5 second to about 120 seconds, more preferably in a range from about 2 seconds to about 80 seconds, and most preferably in a range from about 15 seconds and about 40 seconds.

(d) Removing

After the molded article has achieved form stability, the newly formed container or portion thereof is removed from the mold. In the preferred embodiment, when the dies are separated, the newly formed container remains on the male die. In one embodiment, the male die and the female die are rotated as they are separated so as to separate the container from the dies.

Once the dies are separated, heated air can be blown over the container for a few seconds to further increase form stability. The container can then be removed from the male die without deformation. In the preferred embodiment, a standard process known as airveying is used to remove the container from the male die. Airveying is a process in which a negative pressure is applied to the container for sucking the container from off the die. The container then travels through a "U" shaped tube that deposits the container fight side up.

The airveying process is preferable due to its gentle handling of the form stable containers and its low operating and capital costs. Heating air which is present to dry containers may be used to provide the bulk air transport carrying the containers through the length of the tubes. The air ducts are simply ports in the male die through which air can be injected to provide a uniform force to push the container off the male die. Such air ducts can have substantially the same size, shape, and position as the vent holes previously discussed.

In one embodiment, the air ducts and vent holes may be one and the same. The air inserted in the air ducts must be low enough not to damage the containers. It is envisioned in the preferred embodiment that air ducts are located on the male die to help eject the containers from the male die and into the airvey tubes.

In an alternative embodiment, the molded container can be mechanically removed from the male die. Such a process, however, requires exceptional care so as not to deform the container. One preferred method for mechanically removing the molded container incorporates using the aforementioned template.

The template is circumferentially located at the base of the male die and is removable. The molded container is loaded onto the template via the lip of the container by either lifting the template or lowering the male die.

(e) Final Hardening

Once molded, the inorganically filled mixture is allowed to further harden in the desired shape of the container. To economically produce the inventive container, it must be rapidly hardened to a point where it has sufficient strength to be packaged, shipped, and used without substantial deformation.

Hardening of the container may be accomplished by exposing the container to heated air, such as in a conventional tunnel oven. The application of the heated air drives off much of the remaining water in the inorganically filled mixture. Alternatively, the air can be applied through an autoclave capable of regulating the humidity, pressure, and temperature in the environment in which the container is cured. Increasing the humidity and temperature assists in producing an article having the proper amount of final moisture.

In summary, the following conclusions can be drawn with respect to the drying of the inorganically filled mixture:

1) The higher the temperature, the shorter the drying time.

2) The higher the air speed, the shorter the drying time.

3) Once a majority of the water is removed from a container, exposing the container to temperatures above 250° C. will burn the fibers in the mixture, thereby decreasing tensile strength of the fibers and containers.

4) The thinner the material wall of the container, the shorter the drying time.

2. The Wet Sheet Molding Process

The wet sheet molding process should be considered to be a variation of the direct molding process because it involves the use of dies or other molding apparatus which form the wet inorganically filled composition into the desired shape of the container or portion thereof. The major difference is that the wet inorganically filled mixture is first formed into a sheet before being molded, whereas the direct molding process simply uses a blob or other unstructured mass of inorganically filled mixture. The wet sheet forming method works well for manufacturing structures having relatively long, thin walls that might otherwise be difficult to mold using the direct molding process. It is also preferable to the dry sheet molding process, to be discussed hereinafter, in cases where it is desired to have a smooth rather than creased bend or turn.

(a) Formation of the Wet Sheet

The inorganically filled mixture can be formed into wet sheets of precise thickness by passing the mixture between one or more pairs of reduction rollers. The mixture can be directly rolled or extruded between the rollers or it may first be extruded through a die and then passed between the reduction rollers. Extruding the mixture first into a sheet, individual strings, or a pipe that is subsequently opened creates a more uniform and even feed of material through the rollers.

The two principal types of extruders that are preferred are the auger and piston extruders. Auger extruders include one or more interior chambers and one or more auger screws within each chamber for advancing the inorganically filled mixture through the one or more interior chambers toward a die head having a transverse slit or other appropriate cross-section shape. The cross-sectional shape of the die slit is configured to create a sheet or other extruded form of a desired width and thickness that will facilitate the feeding of the material between the reduction rollers.

A piston extruder utilizes a piston instead of an auger screw in order to exert forward pressure on and to advance the inorganically filled mixture through the interior chamber. An advantage of using a piston extruder is the ability to exert much greater pressures upon the inorganically filled mixture. Nevertheless, due to the highly plastic-like nature of mixtures typically employed in the present invention, it not generally necessary or even advantageous to exert pressures greater than those achieved using an auger extruder.

In contrast, an important advantage of using an auger extruder is the ability to remove unwanted air voids within the inorganically filled mixture. Failure to remove unwanted air voids can result in the sheet having a defective or nonhomogeneous inorganically filled matrix. Removal of the air voids may be accomplished using conventional venting means known in the extrusion art, wherein the mixture is first passed into a vacuum chamber by a first auger screw and then extruded through a second chamber toward and through the extruder die head by means of a second auger screw.

Although the preferred width and thickness of the die will depend upon the width and thickness of the particular sheet to be manufactured, the thickness of the extruded sheet will usually be at least twice, and sometime many times, the thickness of the final calendared sheet. The amount of reduction (and, correspondingly, the thickness multiplier) will depend upon the desired properties of the sheet. Because the reduction process helps control fiber orientation, the amount of reduction will often correspond to the degree of desired fiber orientation. In addition, the greater the thickness reduction, the greater the elongation of the sheet.

Although the die slit is generally rectangularly shaped, it may contain areas of increased thickness along its width in order to form an extruded sheet having varying thickness along its width. In this case, it may also be preferable to pass the sheet through a series of rollers having recesses that correspond to areas of increased extruded thickness. In this way, a sheet having reinforced areas of increased strength and stiffness can be produced.

In addition to narrow die slits to form flat sheets, other dies may be used to form other objects or shapes. The only criterion being that the extruded shape be capable of being passed between a pair of rollers to form a substantially coherent wet sheet. For example, it may not be desirable to extrude an extremely wide sheet, which would require a very large, expensive die. Instead, a tube may be extruded and continuously cut and unfolded using a knife located just outside the die head.

Another advantage of using an extruder to at least partially form the sheet is the ability to use inorganically filled mixtures having relatively low water and very high yield stress. The inorganically filled mixtures of the present invention exhibit approximate Binghamian flow properties, wherein the material has an apparent reduction in viscosity and an increase in flowability when subjected to shearing forces. Both types of extruders are able to exert high levels of shear onto the inorganically filled mixture as it is extruded through the die head. This allows for the use of inorganically filled mixtures that have a substantial degree of form stability and internal cohesion even before any of the water has been removed by evaporation. This feature is advantageous in many molding processes.

However, in the case where lightweight aggregates are used (such as perlite, hollow glass spheres, pumice, or exfoliated rock) care should be taken so that the pressure exerted on the inorganically filled mixture during the extrusion process is not so great that it crushes or fractures the lightweight, lower strength aggregates. Otherwise their lightweight and insulating characteristic will be lost. In such cases it will generally be preferable to increase the water content in order that lower shear forces need to be applied by the extruding apparatus in order to cause the inorganically filled mixture to be extruded. The increased water can later be removed by evaporation, such as by the heated rollers.

In general, the amount of pressure which will be applied by the extruder in order to extrude the inorganically filled mixture will preferably be in a range from about 50 kPa to about 70 MPa, more preferably in a range from about 150 kPa to about 30 MPa, and most preferably in a range from about 350 kPa to about 3.5 MPa.

As in the direct molding process, it may be advantageous to employ a blowing agent which is added to the mixture prior to the extrusion process in order to create a sheet having lower density and higher insulating ability.

It will be understood that the extrusion of the inorganically filled mixture through the die head will tend to unidirectionally orient the individual fibers within the mixture in the machine (or "Y") direction, which is known in the art as the lengthwise direction. The rolling process further orients the fibers in the machine direction as the sheet is further elongated during the reduction process. In addition, by employing rollers having varying gap distances in the "Z" direction (such as conical rollers), some of the fibers can also be oriented in the cross-machine (or "X") direction, which is known in the art as the widthwise direction. Thus, it is possible to create a sheet by extrusion, coupled with rolling, which will have bidirectionally oriented fibers.

Further details relating to the formation of inorganically filled sheets are set forth in the section entitled "Dry Sheet Molding". The major difference between the two processes is that in the wet sheet molding process the sheet is molded between heated dies rather than dried in sheet form using drying rollers.

(b) Forming and Molding

Once a wet or unhardened inorganically filled sheet has been formed, at least a portion of the sheet is fashioned into the desired shape of the container or portion thereof. In a preferred embodiment, the wet sheet is pressed between a male die of a desired shape and a female die having a substantially complementary shape of the male die just like in direct molding. As a portion of the sheet is pressed between the dies, the mixture is formed into a structural component having the complementary shape of the dies.

Although solid single piece dies (the male die and the female die each comprising one solid piece) are the preferred dies based on ease and economy, alternative dies include split dies and progressive dies. The use of multi-component split dies permits the production of complex shapes that are more easily removed from the mold.

In contrast to the split die where the components press together simultaneously to form the object, a progressive die is a multi-component die whose various parts are pressed together in a delayed sequence to form the desired container. By selecting the order and time when the various components of the die are pressed together, a complex container can be formed having a more uniform wall thickness.

For example, a progressive male die used to make a bowl-shaped article may include a base and a side component. By having the base component press first, the remainder of the sheet is pulled in against the side of the female die. The side component of the male die can then be pressed to form the side of the bowl without stretching the sheet, thereby forming a bowl having a more uniform thickness.

Just as in the direct molding process, the amount of pressure exerted by the dies onto the sheet serves several functions which must be considered when determining how much pressure to apply. While a sheet of material is used as compared with directly injecting the material, the parameters and the cautions discussed above will generally apply to the wet sheet molding process.

In an alternative method for fashioning the container from the sheet, the various methods of vacuum forming, commonly used in the plastics industry, can be incorporated. Vacuum forming uses atmospheric pressure (about 14.7 psi) to force the sheet to conform to a mold. Both male and female molds can be used for vacuum forming. The term "vacuum mold" as used in the specification and appended claims is intended to include either or both the male mold and female mold used in vacuum forming.

Drape forming is used with male molds. The sheet is positioned over the top of the mold, or the mold is placed into the sheet. The air between the sheet and the mold is then evacuated, contouring the sheet around the mold. The resulting product is thickest in the center of the part, where the material first touches the mold. It is thinnest in high-draw areas around the periphery, which contacts the mold last.

Straight vacuum forming is used with female molds. The sheet is sealed against the top of the female mold. The mold cavity is evacuated, and atmospheric pressure pushes the material against the sidewalls of the cavity. This forming technique results in material distribution (thin in the middle and thick around the edges) that is essentially opposite of that obtained when the same part is produced by drape forming on a male mold.

Drape vacuum forming, as opposed to drape forming, is similar to straight vacuum forming except that the edges of the sheet are pressed all the way to the base of the female mold before the cavity is evacuated. This provides a better vacuum for the molding process.

Snapback, billow/air slip, and billow drape are multi-step vacuum forming techniques designed to improve the wall thickness uniformity of products produced on male molds by prestretching the sheet prior to its contacting the mold. Stretching the sheet freely in air without touching anything allows the material to thin out uniformly. As a result, the surface area of the sheet is also increased so that it more closely matches that of the mold.

Snapback vacuum forming utilizes a vacuum box to prestretch the sheet. The vacuum box is mounted to a platen opposite the male mold. The wet inorganically filled sheet is sealed against the vacuum box and a partial vacuum sufficient to achieve the desired amount of stretching is applied to the box. The mold is then pushed into the concave sheet. The box is vented to the atmospheric and a vacuum is dram on the mold. The atmosphere pressure then forces the material against the mold.

Billow/air-slip vacuum forming utilizes a pressure box with a male mold positioned inside it. The sheet is sealed against the box. The box is pressured with compressed air and the sheet billows up to form a bubble that provides the appropriate stretching. The mold is pushed up into the convex bubble. The box and the male mold are then evacuated and the sheet is forced against the mold.

Billow drape vacuum forming is a reverse draw technique that utilizes a pressure box to blow a bubble in the sheet. The male mold, mounted opposite the box, is pushed into the convex bubble. The air in the bubble is vented to the atmosphere in a controlled manner. By matching the amount of air being vented to that being displaced by the mold, the sheet material is wiped or draped against the mold. When the mold completely penetrates the sheet, a vacuum is applied to the mold and the box is vented to the atmosphere to complete the forming operation.

Plug-assist and billow/plug-assist/snap back are multistep vacuum forming techniques designed to improve the wall thickness uniformity of parts produced with female molds. They utilize mechanical assists (plugs) to force more material into high dry areas of the part.

Plug assist vacuum forming is used in conjunction with straight vacuum or drape forming techniques. The plug is mounted on a platen opposite the female mold. The sheet is sealed against the mold, and the plug pushes the material into the mold prior to drawing a vacuum. When the mold is evacuated, the material is forced off the plug and up against the mold cavity.

Billow/plug-assist/snap back forming combines several different forming techniques. The sheet is sealed against a female mold. The mold is pressurized to stretch the sheet by blowing a bubble. A plug mounted opposite the mold is forced into the convex bubble, and controlled venting of the displaced air in the bubble causes the material to be draped over the plug. When the plug is fully extended, the mold is evacuated and the material is pushed off the plug and on to the mold.

Pressure forming uses compressed air in addition to atmospheric pressure. Pressures typically range from about 40 Pa to about 200 Pa. Pressure forming requires special equipment with platens and/or molds in pressure boxes capable of locking up and holding the necessary pressure. Pressure forming can be incorporated into any of the vacuum forming techniques previously described.

A twin sheet forming process can be used to produce hollow parts. Two sheets are positioned between two female molds with matching perimeters or contact surfaces. The mold cavity contours may or may not be identical. The molds come together and bind the two sheets together where the molds meet. The two sheets may be either pressure formed simultaneously or vacuum formed subsequently utilizing conventional forming techniques.

(c) Initial and Final Heating and Form Stability

The creation of initial form stability in the inorganically filled product by the evaporation of water after it is molded can be accomplished in substantially the same way as with the direct molding process. In general, the use of heated molds to achieve form stability and initial drying works well. In many cases the articles may be demolded after being completely dried, or else they can be demolded while in a form stable but partially wet state and then further dried by methods discussed above with respect to direct molding.

4. Formation of Containers from Dry Sheets (a) Initial Sheet Formation

The formation of dry inorganically filled sheets is similar to the formation of wet sheets, as discussed above, except that the initially wet sheet is first completely or substantially dried in the form of the sheet before being reformed into the shape of the container or portion thereof. In particular, the use of either an auger or piston extruder is preferred in order to regulate the flow of inorganically filled material through the reduction or forming rollers. The use of reduction or forming rollers yields a cohesive sheet having a very precise cross-sectional thickness. In general, however, dry sheets will typically have a lower cross-sectional thickness compared to wet sheets used in the wet sheet forming process because of the need for wet sheets to have sufficient thickness to withstand rupture when subjected to further reductions in thickness during the molding process.

As discussed above, passing the extruded sheet between one or more pairs of counter-rotating reduction rollers provides a reduction in sheet thickness as well as orienting the fibers in the direction of sheet elongation or flow. The forming or reduction rollers are typically heated in order to remove a portion of the water from the sheet by evaporation and thereby increase the internal cohesion of the sheet. However, if further reductions in sheet thickness are to be made by subsequent reduction rollers, the sheet must exit each preceding set of reduction rollers with sufficient moisture so that the sheet will not be damaged when further reduced in thickness.

After the sheet has been reduced to substantially the desired thickness, it may be dried by rolling it around a significant portion of the surface of one or more larger diameter drying rollers, often referred to as "Yankee" rollers. After the sheet has been substantially dried it may be passed between one or more sets of calendering or other finishing rollers in order to alter or improve the surface quality of the sheet.

As discussed above, the sheet elongates in one or more directions as the thickness is reduced, typically in the forward or "machine" direction. One consequence of sheet elongation is that the fibers tend to be oriented or lined up in the direction of elongation. Typically, the sheet reduction process in combination with the initial extrusion process yields a sheet having fibers that are substantially unidirectionally oriented fibers in the machine (or "Y") direction.

The diameter of each of the rollers should be optimized depending on the properties of the inorganically filled mixture and the degree of thickness reduction of the sheet. When optimizing the diameter of the rollers two competing interests should be considered. One is related to the amount of shear forces exerted on the sheet as its thickness is reduced. The other is the tendency of the wet sheet to adhere to the rollers. Although it would be ideal to minimize both the shear and adhesion they are, unfortunately, inversely related as a function of roller diameter.

First, it is known that smaller diameter rollers tend to impart a greater amount of shearing force to the sheet as the sheet is reduced in thickness. This is because the angle of impact and the rate of sheet reduction per unit of length of contact with the rollers is more acute as the diameter of the roller is reduced. Because the thickness of the sheet is reduced in a much shorter length of time when using a lower diameter roller, the downward shear forces are proportionately larger. This, in turn, creates a bigger danger of damaging the sheet due to the greater likelihood of introducing tears, fractures, or other defects into the sheet.

On the other hand, the use of larger diameter rollers allows for a more gradual reduction in sheet thickness as the sheet is able to make contact with a more gradually sloped roller surface. The result is the exertion of lower shearing forces during the sheet thickness reduction forces. However, the use of larger diameter rollers has the competing drawback that the inorganically filled material makes contact with a much larger roller surface area as the diameter of the roller is increased. This results in a greater tendency of the sheet to adhere to the reduction rollers, which adhesion is generally overcome by heating the rollers to create a steam barrier between the sheet and the rollers.

However, the increased drying of the sheet caused by the larger diameter and generally hotter reduction roller can cause the sheet to become overly dried, at least on the surface, prior to complete sheet reduction. This can also be the cause of introducing cracks or defects into the inorganically filled matrix of the sheet. In contrast, the use of smaller diameter rollers reduces the sticking and overdrying effect caused by increasing the roller diameter.

In light of the foregoing, it will generally be necessary to carefully optimize the roller diameter, roller speed, and roller temperature for different inorganically filled mixtures. One of ordinary skill in the art will be able to find the optimal roller diameter, speed and temperature by practicing the invention. However, during the sheet reduction step, the reduction rollers are generally heated to a temperature in a range from about 50° C. to about 140° C., more preferably in a range from about 70° C. to about 120° C., and most preferably in a range from about 85° C. to about 105° C.

In an alternative embodiment, adhesion between the inorganically filled sheets and rollers can be reduced by cooling the rollers to or below room temperature. Heating the mixture in the extruder to about 85° C., for example, and then cooling the sheet surface causes the vaporizing water to condense, which is thought to create a thin film of water between the sheet and the roller. The rollers should be cool enough to prevent the surface of the sheet from adhering to the rollers, but not so cold as to cause the sheet to freeze or become so stiff or inflexible that it will fracture or shatter during the sheet reduction process. Accordingly, it is preferable to cool the rollers to a temperature in a range from about –20° C. to about 40° C., more preferably from about 0° C. to about 35° C., and most preferably from about 5° C. to about 30° C.

It may also be preferable to treat the roller surfaces in order to reduce sticking or adhesion of the inorganically filled sheet to the rollers. One way to reduce the level of adhesion between the rollers and the wet inorganically filled sheet is to treat the roller surface in order to make it less amenable to adhesion. Rollers are typically made from polished stainless steel and coated with a nonstick material such as polished chrome, nickel, or teflon.

It has been discovered that the orientation of the fibers in the sheet may be affected by the vectors of downward pressure of the rollers, while still deriving the same amount of sheet reduction, by employing a roller having a slightly conical shape in conjunction with a flat roller. The degree of gap differential in the "Z" direction as a result of the conical shape can be controlled to prevent spreading or widening of the sheet in the cross-machine (or "X") direction.

Orienting the fibers maximizes the tensile strength imparted by the fibers in the direction of orientation. Fiber orientation may be particularly useful in reinforcing a hinge or score within the sheet. Fibers which are greater in length than the width of the fold or bend can act as a bridge to connect the material on either side of the fold or bend even if the matrix is partially or even substantially fractured along the fold or bend. This bridging effect is enhanced if the fibers are generally aligned perpendicular to the fold or bend.

Finally, it should be understood that due to the plastic nature and relatively high level of workability of the inorganically filled mixture, the rolling process will usually not result in significant densification of the sheet. In other words, the density of the sheet will remain substantially the same throughout the sheet thickness reduction process. When compaction is desired, the sheet can be passed between a pair of compaction rollers following the partial drying of the sheet, as set forth more fully below.

(b) Sheet Drying

Although the sheet thickness reduction step often results in partial or even substantial drying of the inorganically filled sheet, it will be preferable to further dry the sheet in order to obtain a sheet with the desired properties of tensile strength and toughness. This may be accomplished in a number of ways, each of which involves heating the sheet in order to drive off the excess water. A preferred method of drying the sheet involves the use of large diameter, heated drying rollers, an example of which is a "Yankee" roller.

In contrast to the reduction rollers, which are generally aligned in pairs, the drying rollers are individually aligned so that the sheet passes over a significant portion of each roller in sequence. In this way, the two sides of the inorganically filled sheet are alternatively dried in steps. In addition, while a sheet passing between the reduction rollers follows a generally linear path, a sheet passing around the drying rollers follows a generally sinusoidal path.

During the preferred drying process, the side of the sheet adjacent to the drying roller is heated by the drying roller while the other side is exposed to the air. The heated sheet loses water in the form of vapor, which can escape out the sides of the roller or the surface of the sheet opposite the roller. The vapor also provides a nonstick barrier between the sheet and drying roller. The drying rollers may be equipped with tiny holes in the roller surface in order to allow water vapor to escape therethrough.

As the sheet continues on its path it is rolled around the next drying roller, where the side of the sheet that was exposed when passed around the previous drying roller now comes into contact with the next drying roller surface. This process may be continued for as many steps as needed in order to dry the sheet the desired amount.

The temperature of the drying rollers will depend on a number of factors, including the moisture content of the sheet as it passes over a particular roller and the desired rate of drying. In any event, the temperature of the drying rollers should be less than about 300° C. Although the inorganically filled matrix should not be heated above 250° C. in order to prevent the destruction of the organic constituents (such as organic binder or fibers), rollers heated to above this temperature may be used so long as there is adequate water within the mixture to cool the material as the water is vaporized. Nevertheless, as the amount of water decreases during the drying process, the temperature of the rollers should be reduced to below 250° C. in order to prevent overheating of the material.

It may be preferable to use a drying tunnel or chamber in conjunction with the drying rollers. In order to obtain the full effect of heat convection drying, it is often preferable to circulate the heated air in order to speed up the drying process.

In some cases, the drying process set forth above will be the final step before the sheet is either used to form the inventive containers or portion thereof or, alternatively, rolled onto a spool or stacked as sheets until needed. In other cases, particularly where a sheet with a smoother, more paper-like finish is desired, the drying step might be followed by one or more additional steps set forth more fully below, including a compacting step and/or a finishing step. In the case of compaction, it is generally preferable to leave the sheets with some amount of moisture to prevent fracturing of the matrix during the optional compaction step. Otherwise, if the drying step is not followed by a compaction step, it is generally desired to substantially dry out the sheet prior to further finishing in order to maximize the tensile strength and toughness of the sheet.

(e) Finishing

It may be desirable to compact or finish the inorganically filled sheet in order to achieve a sheet having a desired texture or surface finish. The compaction process densifies the sheet and removes unwanted voids and defects from within the inorganically filled matrix. The compaction process generally yields a sheet of reduced thickness and increased density without causing further elongation of the sheet and without negatively disrupting or weakening the inorganically filled matrix.

In order to achieve compaction without elongating the sheet and without weakening the matrix, it is important to control the drying process so that the sheet contains an optimal amount of moisture when performing the compaction step. A sheet containing too much water will elongate in similar fashion as when passed between the reduction rollers, since the compaction rollers are substantially similar to the reduction rollers, the only difference being that compaction, rather than elongation, will occur if the sheet is dry enough.

On the other hand, compacting an overdried sheet can result in a weaker sheet. At some point the inorganically filled sheet can become so dry and hard that the matrix cannot be compressed without fracturing. Fracturing of the matrix can diminish the final strength of the sheet even if the fractures are microscopic and not visible to the naked eye. However, a sheet containing an optimal amount of moisture will compact rather than elongate but will not fracture.

It may also be preferable to further alter the surface of the inorganically filled sheet by passing the sheet between one or more pairs of finishing rollers. For example, a sheet having a smoother surface on one or both sides may be created by passing the dried sheet between a pair of "hard" and "soft" rollers. The soft roller has a rotational velocity corresponding to the speed of the sheet passing between the two rollers, while the hard roller travels at a much higher rate. As a result, the slippage of the hard roller over the dry sheet surface causes the sheet to become polished and, hence, much smoother on the side adjacent the hard roller.

In other embodiments, the finishing rollers can have a surface that imparts a desired texture, such as a meshed or checkered texture, to the surface. If desired, the rollers can imprint the surface of the sheet with a logo or other design. Special rollers capable of imparting a water mark can be used alone or in conjunction with any of these other rollers.

It may be desired to corrugate the sheets in a manner similar to layers within corrugated cardboard. This is accomplished by passing either a semi-dried or dried sheet between a pair of corrugating rollers. The moisture content of the sheet should be controlled so that the corrugation process does not result in a sheet with a damaged matrix. This may be carried out using steam.

(d) Hinge Formation, Scoring and Perforating

In some cases it may be desirable to alternatively score, score cut, or perforate the sheet in order to define a line upon which the sheet may more easily be bent or folded. A score cut can be made by using a sharp knife blade mounted on a score press or it can be accomplished using continuous die cut rollers. A score may be made in the sheet by means of a scoring die. Finally, a perforation may be made by means of a perforation knife.

The purpose of the score, score cut, or perforation is to create a "hinge" within the sheet with far greater bendability and resilience than possible with an unscored or unperforated sheet. In some cases multiple score cuts or perforations may be desirable.

Cutting a score line or perforation within the sheet creates a better fold line or hinge for a number of reasons. First, it provides a place where the sheet might more naturally bend or fold. Second, cutting a score makes the sheet at the score line thinner than the rest of the sheet, which reduces the amount of lengthwise elongation of the surface while bending the sheet. The reduction of surface elongation reduces the tendency of the matrix to fracture upon being folded or bent. Third, the score cut or perforation allows for a controlled crack formation within the matrix in the event that fracture of the matrix occurs.

It may sometimes be preferable to concentrate more fibers at the place in which the score cut or perforation will be made. This can be accomplished by co-extruding a second layer of inorganically filled material containing a higher fiber content at predetermined timed intervals to correspond with the location of the score cut or perforation. In addition, fibers can be placed on top of, or injected within, the sheet during the extrusion or rolling processes in order to achieve a higher fiber concentration at the desired location.

The inorganically filled sheet will preferably be in a substantially dry or semi-hardened state during the scoring or perforation process. This is desirable to prevent the score or perforation from closing up through the migration of moist material into the score cut. Since score cutting and perforation involve cutting through a portion of the matrix, the sheet can even be totally dry without the scoring or perforation process harming the sheet. However, in cases where a score is pressed rather than cut into the sheet surface, the sheet should be moist enough to prevent fracture due to the dislocation of the matrix.

In most cases where a thinner sheet (<1 mm) is being score cut, the cut will have a depth relative to the thickness of the sheet in a range from about 10% to about 50%, more preferably in a range from between about 20% to about 35%. In the case of thicker sheets, the score cut will usually be deeper due to the decrease in bendability of the thicker sheet.

(e) Printing and Storing

It may be desirable to apply print or other indicia on the surface of the sheet. This can be accomplished using printing means known in the art of printing paper or cardboard products. Because the sheets have a relatively high porosity like paper or cardboard, the applied ink will tend to dry rapidly. In addition, decals, labels or other indicia can be attached or adhered to the inorganically filled sheet using methods known in the art.

Finally, the substantially hardened sheets can be immediately used to form containers or other objects, or they may be stored until needed such as, for example, by winding the sheets into a roll or cutting and stacking individual sheets into a pile.

The inorganically filled sheets made according to the processes set forth above can then be used just like paper or cardboard and can be fashioned into an endless variety of containers or portions thereof using manufacturing equipment currently in use with paper or cardboard.

(f) Formation of Structural Components from Dry Sheets

Many or all of the structural components of the sealable, liquid-tight containers of the present invention can be formed from dry sheets. The shape and function of the container will dictate what type of dry sheet-forming method should be employed. For example, if the container or a portion thereof is substantially cylindrical or otherwise curved, then the dry inorganically filled sheet can be wound into a hollow tube or hollow body portion by spiral winding or convoluting the dry sheet. If a box-like container is desired, such as a carton, it may instead be preferable to fold or bend the sheet into the desired container.

The hollow body portion 12 of the container depicted in FIG. 3 can be formed by spiral winding a dry inorganically filled sheet. To form the hollow body portion 12 by spiral winding, a long narrow sheet is coated on one side with a lubricant, such as wax, and wound around a mandrel in a spiral fashion. On each revolution, one edge of the sheet abuts the opposite edge of the sheet laid down on the mandrel on the previous revolution as depicted in FIG. 3. The angle of the winding is preferably 15° from normal to the mandrel. The degree of the angle affects the optimal elasticity and tensile strength of the container.

A second layer of an inorganically filled sheet can be applied in a similar fashion over the first layer to provide additional strength. As shown in FIG. 3, the second layer 50 is also preferably oriented at an angle of 15° from normal to the mandrel, but in the opposite direction such that the angle between the first layer 48 and the second layer 50 is approximately 30°. An adhesive is applied to the bottom or inner surface of the second layer 50 so as to bond the second layer 50 to the outside surface of the first layer 48. Continuous fibers or filament winding 52 may be used to provide even additional strength. Continuous fibers 52, such as Kevlar, polyaramite, glass fibers, carbon fibers and cellulose fibers, may be fed in with the sheets and sandwiched between the first and second layers 48 and 50 as depicted in FIG. 3. Controlling the angle in which the continuous fiber is applied controls the optimal vectors of reinforcement. The use of continuous fibers as reinforcement may permit a reduction in the amount of fibers added to the mixture.

Another method of forming a curved hollow body portion involves convoluting a dry inorganically filled sheet to form the hollow body portion 12 depicted in FIG. 4. The sidewalls of the container are formed by cutting a sheet into a desired length and width, rolling the sheet in one direction to form a hollow tube, overlapping and bonding a portion of the opposing sides of the sheet with a suitable adhesive to produce the hollow body portion 12 as depicted in FIG. 4. Preferably, the dimension of the sheet in one direction corresponds to the desired length of the hollow tube along its longitudinal axis, and the dimension of the sheet in the other direction corresponds to the desired circumference of the hollow body portion 12. A bottom portion can be fitted to the sidewalls resulting in a completed hollow body portion. This process can be mechanized for mass production, such as in the paper cup industry.

Examples of containers formed by folding or bending an inorganically filled sheet to form a box-like structure are depicted in FIGS. 9A, 9B, 10A and 10B. The containers shown in FIGS. 9A, 9B, 10A and 10B are frequently utilized with fruit juices and milk. Containers can be shaped as shown in FIGS. 9A, 9B, 10A and 10B using the same processes and machinery utilized to shape such containers from paper composites. After the enclosed liquid or solid substances are deposited into such folded containers through a top opening, the opening is sealed closed. The stored substances are dispensed from FIGS. 9A and 9B in a manner similar to how a conventional milk carton is utilized. In FIGS. 10A and 10B the stored substances are dispensed by penetrating a straw through an opening covered by foil. Straws can also be manufactured from a dry inorganically filled sheet. As discussed below, the sheets can be laminated or coated with other materials and a liner can be utilized, as well.

The overlapping portions of such containers as depicted in FIGS. 9A and 10A can be sealed with an adhesive. The overlapping portions in FIGS. 9B and 10B can be hermetically sealed together. The overlapping portions which have been hermetically sealed can be compressed or crimped together. FIGS. 9C and 10C show a cross section of the hermetically sealed overlapping portions. Because starch can act as a thermoplastic under the right circumstances, sheets that include substantial quantities of a starch binder can exhibit some thermoplastic behavior. By heating the overlapping portions of the sheets it is possible to create an adhesive bond between the sheets by means of melting and then cooling the starch to below the glass transition temperature. Moistened inorganically filled sheets can exhibit a degree of self-adhesion depending on the identity and concentration of the organic binder.

While the foregoing methods for forming containers from dry sheets are among the most commonly used methods in the paper art, it should be understood that any method for forming a container from a sheet can be adapted and used with the inventive inorganically filled sheets. In addition, methods uniquely adapted to inorganically filled sheets can be employed. For example, unlike other materials, a slightly moistened inorganically filled sheet may exhibit adhesive qualities that make it possible to bond to itself or other inorganically filled sheets.

5. Formation of Structural Components by Extrusion

The hollow body portion 12 of the container shown in FIG. 5 can alternatively be formed directly by an extrusion process. After an appropriate inorganically filled mixture has been prepared, it is placed into an extruder and extruded through a die configured to produce an elongated hollow tube from which a plurality of hollow body portions 12 can be cut. After the tube has been extruded into a form stable tube, it is allowed to dry, usually in an accelerated manner using heat to remove a substantial quantity of the water by evaporation. The tube is then cut into individual hollow body portions 12. The hollow body portions 12 may then be combined in the manner described earlier in this specification with the various closure means 14 and bottom portions 18 to form a finished container.

Continuous fibers or filaments may be coextruded with the tube as reinforcement. Disks within the extruder rotating in opposite directions can be utilized for coextruding the continuous fibers to achieve a crisscrossing pattern of filament overlay. Controlling the rotational speed and the forward extrusion speed permits control of the winding angle of the filaments. Controlling the angle permits optimal elasticity and tensile strength to be achieved. Additionally, the space between the fibers can be altered to achieve varying strengths. By properly spacing the fibers, the amount of fiber utilized can be limited while obtaining the desired strength.

It should be understood that the foregoing methods for forming containers from the inorganically filled mixture can be combined in order to obtain the beneficial strength and structural properties of two or more of the foregoing manufacturing methods. For example, an inorganically filled sheet can be convoluted or spiral wound around an extruded or molded tube or hollow body portion. Another example is a three layer laminate with an extruded or molded tube or hollow body portion providing the interior layer, a middle layer provided by a spiral wound or convoluted sheet, and an exterior layer provided by a another sheet which can be convoluted or a spiral wound sheet crisscrossing the middle spiral wound sheet.

D. Additional Processing of the Container

During or after the various structural components of the container have been formed, they may be subjected to several additional optional processing steps before being assembled into the container. Optional processing steps include coating the components or containers, applying a liner, laminating a dry inorganically filled sheet, and applying printing or other indicia. These optional processing steps may occur before or after the structural components have been assembled into the containers.

1. Coatings, Laminates and Liners

The surface characteristics of the containers can be altered in a number of ways, such as by coating the containers, creating laminates, and utilizing liners. These can be used to increase the tensile strength of the container and enhance the ability of the containers to act as an impermeable barrier to liquids and gases. Additionally, they may also provide protection against alkaline solutions, acidic solutions, sugar solutions, or oil-based solvents. They may also provide a smoother or glossier surface. They can reinforce the inorganically filled matrix, particularly at a bend or fold line in a dry sheet that has been formed into a container. Coatings may also improve the weathering resistance of the containers and may provide the capacity to retain a fragmented container.

Some coatings can be applied to the surface of the product during the sheet forming or direct molding process, in which case the process is an "on-machine" process.

In an on-machine process, the coating may be applied as a liquid, gel, or even a thin film sheet. It may be preferable to apply the coating after the inorganically filled mixture has been formed and at least partially dried, in which case the process is an "off-machine" process.

The object of the coating process is usually to achieve a uniform film with minimum defects on the surface of the container or component thereof. The selection of a particular coating process depends on a number of substrate variables, as well as coating formulation variables. The substrate variables include the strength, wettability, porosity, density, smoothness, and uniformity of the matrix of the product. The coating formulation variables include total solids content, solvent base (including water solubility and volatility), surface tension, and rheology. Coating processes known in the art that may be used to coat the inorganically filled sheets or products of the present invention include spraying, blade, puddle, air-knife, printing, and gravure coating. The amount of coating can be controlled by the volume of the spray or the dwell time of the structural components under the spray or both. In addition, coatings may be coextruded along with the container components in order to integrate the coating process with the extrusion process.

In some cases, it may be preferable for the coating to be elastomeric or deformable. Some coatings may also be used to strengthen places where the inorganically filled material may be severely bent, such as the hinge of a folded container. In such cases, a pliable, possibly elastomeric, coating may be preferred. Resistance to acidity is important, for example, where the container will be exposed to foods or drinks having a high acid content, such as soft drinks or juices. Where it is desirable to protect the container from basic substances, the containers can be coated with an appropriate polymer or wax, such as are used to coat paper containers. Besides these coatings, any FDA approved coating material would work, depending on the application involved.

For example, one FDA-approved coating comprises sodium silicate, which is acid resistant. Many silicate based coatings provide impermeable barriers and are acid resistant. Many silicate salts can be treated with acids in order to form silicic acid, which is very water insoluble. Orthosilicates and siloxanes are particularly useful for container coatings due to their tendency to fill the pores of the hardened inorganically filled matrix. Additionally, useful coatings may be obtained from colloidal silica in organic polymer dispersions, films, and fibers. These coating compositions provide water impermeable barriers and increase in hardness and durability of the containers.

Biodegradable plastics provide particularly useful coatings. Biodegradable plastics, such as polylactic acid and Biopol, provide a barrier to liquids and gases, and are insoluble in water and acidic solutions.

Another useful coating material is calcium carbonate, which is resistant to bases and which also allows the printing of indicia on the surface of the containers. Other appropriate coatings include acrylics, polyacrylates, polyurethanes, melamines, polyethylene, synthetic polymers, hydroxypropylmethylcellulose, ethylcellulose polyethyleneglycol, kaolin clay, Zein®, polyvinyl chloride, polyvinyl alcohol, polylactic acid, polyvinyl acetate, ceramics, waxes (such as beeswax, paraffins or petroleum based wax).

Another type of coating that may be placed on the surface of the containers of the present invention is a reflective coating for reflecting heat into or out of the container. Such reflective coatings are well known in the art, although their applicability to inorganically filled containers is novel.

Liners can be used to provide many of the same purpose as coatings but are applied as a continuous sheet while coatings are applied by spraying, dipping, etc. Plastic liners, such as polyethylene, can be utilized to achieve properties such as impermeability and insolubility in various solutions. Foil liners may also be utilized.

Any type of thermoplastic coating may be blow-molded within the interior of the container. A novel kind of liner involves the blow-molding of a thin glass membrane within the interior of the container. The container acts as the mold or form to which the newly blow-molded glass or thermoplastic conforms. Glass and thermoplastic coatings are resistant to acids and/or bases and all manner of chemicals. Glass in particular helps to preserve the taste of liquids or foods that might otherwise come into contact with other types of coatings that are known to cause some alteration in taste.

Laminates are similar to liners and include multiple layers of sheets, coatings, or liners, with at least one layer formed from the inventive inorganically filled materials. Laminates enable the production of containers having an interior with a coating or liner with different properties from the coating or liner on the exterior of the container.

2. Printing

Another optional step in the manufacturing process is applying print or designs to the container through the use of a conventional printer, such as an offset, Van Dam, laser, direct transfer contact, or thermographic printer. Additionally, methods include utilizing a relief printing, intaglio printing, stencil printing and hot stamping. Essentially any hand or mechanical means can be used. Of course, inorganically filled materials such as those disclosed herein are particularly well suited for printing processes. In addition, decals, labels or other indicia can be attached or adhered to the containers using known methods in the art. As mentioned above, it is within the scope of the present invention to coat the containers with a government approved coating, most of which are currently used and well adapted for placing indicia thereon.

3. Assembly of the Structural Components into Containers

Assembling the structural components into containers may occur as part of the process of "bottling" or "packaging", foods, beverages, or other products within the containers of the present invention. Application of this technology, for example to the container shown in FIG. 1 would at a very basic level involve moving the hollow body portion 12 along a conveyor to a first station where the hollow body portion 12 is filled with a predetermined amount of beverage. Next, the filled hollow body portion 12 is moved further along the conveyor to a second station where a suitable adhesive is applied to the external threads 22 of the hollow body portion 12 and a top 24 is screwed onto the top of the filled hollow body portion 12 by rotating the hollow body portion 12 and/or top 24 relative to one another. Finally, the container is moved still further along the conveyor to a third station where the cap 26 is screwed onto the top 24 by rotating the cap 26 and/or the top 24 relative to one another. Alternatively, the top 24 and cap 26 could be assembled first and then applied to hollow body portion 12 as an assembly.

A further discussion of possible methods for directly molding containers from inorganically filled compositions may be found in U.S. Pat. No. 5,545,450; U.S. Pat. No. 5,683,772; and copending application Ser. No. 08/288,667, (pending) which were previously incorporated by specific reference. Additional discussion of the manufacture of containers from highly inorganically filled sheets may be found in U.S. Pat. No. 5,506,046 and which was previously incorporated by specific reference. Additional discussion of the manufacture of high starch containing sheets, which may be formed into sealable containers, may be found in copending application Ser. No. 08/637,676 entitled "Methods for Manufacturing Molded Sheets Having a High Starch Content, and filed Apr. 9, 1996, in the names of Per Just Andersen, Ph.D., Shaode Ong, Ph.D., Bruce J. Christensen, Ph.D., and Simon K. Hodson (pending). This last application was also incorporated by specific reference.

Specific examples of the different compositions that may be used to directly mold the sealable containers, or to make sheets that are then made into sealable containers, may be found in each of the foregoing applications in particular, and also in each of the applications set forth in the "Related Applications" section of this specification in general.

V. SUMMARY

From the foregoing, it will be appreciated that the present invention provides novel containers for storing, dispensing, and any other purposes for which conventional containers are utilized. More particularly, the present invention relates to containers and methods for producing containers which are readily and economically formed from compositions including organic binders, fibers, and optionally inorganic fillers.

The present invention provides novel containers and methods for producing containers which can be produced at relatively low cost.

The present invention also provides novel containers and methods for manufacturing containers which do not result in severe ecosystem disturbance, deforestation, generation of the wastes involved in the manufacture of paper products, the complications related to recycling paper products, and landfill problems associated with paper products.

In addition, the present invention provides novel containers and methods for manufacturing containers having a chemical composition compatible with the earth into which they eventually might be discarded.

The present invention further provides novel containers and methods for manufacturing containers having an inorganically filled matrix with predetermined desirable properties and qualities. Properties and qualities considered desirable include the ability to preserve and protect substances such that loss or alterations to the substances is minimized yet achieved in a manner which is inexpensive and safe. Some of these specific properties and qualities include the ability to withstand a pressure differential between the exterior and the interior of the containers, the ability to withstand high longitudinal and transverse internal pressure stress, high tensile strength, minimal gas and liquid permeability, minimal ingress of oxygen resulting in oxidation of contained substances, and minimal loss of carbonation, minimal impairment of foreign flavors to contained substances, minimal corrosion due to pH level of substances. It is also desirable for the containers to be light-weight, thin-walled, inexpensive, and safe in terms of the manufacture, distribution and utilization of the containers.

Further, the present invention provides novel containers and methods for manufacturing such containers which can be commercially formed from inorganically filled materials and which will rapidly obtain form stability and maintain their shape without external support so that they can be handled quickly after formation.

Further, the present invention provides novel containers and methods for manufacturing containers that do not adhere to the forming apparatus and can be removed from the forming apparatus directly after forming without degradation to the containers.

The present invention also provides novel containers and methods of manufacturing containers using procedures and equipment already used to make containers.

The present invention provides compositions and methods that result in a reduction in the cost of mass-producing sealable liquid-tight or pressure-tight containers.

The present invention further provides compositions having a relatively high content of natural mineral fillers that nevertheless can be manufactured into containers having relatively low mass and thin walls compared to conventionally manufactured clay ceramics.

The present invention yet provides containers which can readily degrade when exposed to water or other degradation forces typically encountered by disposable packaging containers.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An article of manufacture comprising a sealable container having a liquid-tight barrier, at least a substantial portion of the sealable container comprising an inorganically filled matrix molded from an inorganically filled mixture, the inorganically filled mixture including:

water;

an organic polymer binder selected from the group consisting of polysaccharides, proteins, and mixtures or derivatives thereof;

an inorganic aggregate filler having a concentration in a range from about 20% to about 90% by weight of solids within the mixture; and a fibrous material, wherein the fibrous material is substantially homogeneously dispersed throughout the inorganically filled matrix, wherein the inorganically filled matrix includes organic components in an amount of at least about 5% by weight of solids within the inorganically filled matrix, and wherein the inorganically filled matrix has a thickness less than about 1 cm.

2. An article of manufacture as defined in claim 1, wherein the water is included in an amount in a range from about 5% to about 80% by weight of the inorganically filled mixture.

3. An article of manufacture as defined in claim 1, wherein the water is included in an amount in a range from about 10% to about 70% by weight of the inorganically filled mixture.

4. An article of manufacture as defined in claim 1, wherein the water is included in an amount in a range from about 20% to about 50% by weight of the inorganically filled mixture.

5. An article of manufacture as defined in claim 1, wherein the organic polymer binder is included in an amount in a range from about 1% to about 60% by weight of solids in the inorganically filled mixture.

6. An article of manufacture as defined in claim 1, wherein the organic polymer binder is included in an amount in a range from about 2% to about 30% by weight of solids in the inorganically filled mixture.

7. An article of manufacture as defined in claim 1, wherein the organic polymer binder is included in an amount in a range from about 5% to about 20% by weight of solids in the inorganically filled mixture.

8. An article of manufacture as defined in claim 1, wherein the organic polymer binder comprises a cellulosic material selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

9. An article of manufacture as defined in claim 1, wherein the organic polymer binder comprises a starch-based material selected from the group consisting of amylopectin, amylose, seagel, starch acetates, starch hydroxyethyl ethers, ionic starches, long-chain alkylstarches, dextrines, amine starches, phosphate starches, dialdehyde starches, and mixtures or derivatives thereof.

10. An article of manufacture as defined in claim 1, wherein the organic polymer binder comprises a protein-based material selected from the group consisting of prolamine, collagen, gelatin, glue, casein, and mixtures or derivatives thereof.

11. An article of manufacture as defined in claim 1, wherein the organic polymer binder comprises a polysaccharide selected from the group consisting of alginic acid, phycocolloids, agar, gum arabic, guar gum, locust bean gum, gum karaya, gum tragacanth, and mixtures or derivatives thereof.

12. An article of manufacture as defined in claim 1, wherein the inorganically filled mixture further includes a synthetic organic polymer.

13. An article of manufacture as defined in claim 12, wherein the synthetic organic polymer is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, latex, and mixtures or derivatives thereof.

14. An article of manufacture as defined in claim 1, wherein the inorganic aggregate filler is included in an amount in a range from about 20% to about 80% by weight of solids in the inorganically filled mixture.

15. An article of manufacture as defined in claim 1, wherein the inorganic aggregate filler is included in an amount in a range from about 30% to about 70% by weight of solids in the inorganically filled mixture.

16. An article of manufacture as defined in claim 1, wherein the inorganic aggregate filler comprises individual particles that are size optimized in order to achieve a predetermined particle packing density of the inorganic aggregate filler.

17. An article of manufacture as defined in claim 1, wherein the inorganic aggregate filler comprises a lightweight aggregate which reduces the density and increases the insulation ability of the inorganically filled matrix.

18. An article of manufacture as defined in claim 17, wherein the lightweight aggregate is selected from the group consisting of perlite, vermiculite, hollow glass spheres, porous ceramic spheres, xonotlite, aerogels, xerogels, tabular alumina, expanded clay, lightweight expanded geologic materials, pumice, microspheres, and mixtures thereof.

19. An article of manufacture as defined in claim 1, wherein the inorganic aggregate is selected from the group consisting of clay, gypsum, calcium carbonate, mica, silica, fused silica, alumina, metals, sand, gravel, sandstone, limestone, hydrated cement particles, calcium aluminate, glass beads, and mixtures thereof.

20. An article of manufacture as defined in claim 1, wherein the inorganically filled mixture further includes an organic aggregate selected from the group consisting of seeds, starches, gelatins, polymers, cork, agar materials, plastic spheres, and mixtures or derivatives thereof.

21. An article of manufacture as defined in claim 1, wherein the inorganically filled mixture further includes a hydraulically settable material.

22. An article of manufacture as defined in claim 1, wherein the fibrous material is included in an amount in a range from about 0.5% to about 60% by weight of solids in the inorganically filled mixture.

23. An article of manufacture as defined in claim 1, wherein the fibrous material is included in an amount in a range from about 2% to about 40% by weight of solids in the inorganically filled mixture.

24. An article of manufacture as defined in claim 1, wherein the fibrous material is included in an amount in a range from about 5% to about 20% by weight of solids in the inorganically filled mixture.

25. An article of manufacture as defined in claim 1, wherein the fibrous material comprises natural organic fibers.

26. An article of manufacture as defined in claim 25, wherein the natural organic fibers are selected from the group consisting of hemp fibers, sisal fibers, cotton fibers, bagasse fibers, abaca fibers, flax fibers, southern pine fibers, southern hardwood fibers, and mixtures thereof.

27. An article of manufacture as defined in claim 1, wherein the fibrous material comprises inorganic fibers.

28. An article of manufacture as defined in claim 27, wherein the inorganic fibers are selected from the group consisting of glass fibers, silica fibers, ceramic fibers, graphite fibers, metal fibers, and mixtures thereof.

29. An article of manufacture as defined in claim 1, wherein the fibrous material comprises synthetic organic fibers.

30. An article of manufacture as defined in claim 29, wherein the synthetic organic fibers are selected from the group consisting of plastic fibers, polyaramide fibers, polylactic acid fibers, polyethylene fibers, polypropylene fibers, and mixtures thereof.

31. An article of manufacture as defined in claim 1, wherein the fibrous material comprises individual fibers having an aspect ratio greater than about 10:1.

32. An article of manufacture as defined in claim 1, wherein the fibrous material comprises individual fibers having an aspect ratio greater than about 100:1.

33. An article of manufacture as defined in claim 1, wherein the fibrous material includes continuous fibers.

34. An article of manufacture as defined in claim 33, wherein the continuous fibers are wrapped around the inorganically filled matrix of the sealable container.

35. An article of manufacture as defined in claim 33, wherein the continuous fibers are embedded within the inorganically filled matrix of the sealable container.

36. An article of manufacture as defined in claim 33, wherein the continuous fibers are spiral wound.

37. An article of manufacture as defined in claim 1, wherein the fibrous material is selected from the group consisting of a fibrous mesh, mat, and fabric.

38. An article of manufacture as defined in claim 1, wherein the inorganically filled matrix has a thickness less than about 5 mm.

39. An article of manufacture as defined in claim 1, wherein the inorganically filled matrix has a thickness less than about 3 mm.

40. An article of manufacture as defined in claim 1, wherein the inorganically filled matrix has a thickness less than about 1 mm.

41. An article of manufacture as defined in claim 1, wherein the liquid-tight barrier is pressure-tight, wherein the sealable container has an interior and an exterior, and wherein the inorganically filled matrix can withstand a differential in pressure between the interior and the exterior of the sealable container of up to about 10 MPa of pressure.

42. An article of manufacture as defined in claim 1, further including a coating on at least a portion of a surface of the inorganically filled matrix of the sealable container.

43. An article of manufacture as defined in claim 42, wherein the coating renders the portion of the inorganically filled matrix impermeable to gases.

44. An article of manufacture as defined in claim 42, wherein the coating renders the portion of the inorganically filled matrix impermeable to liquids.

45. An article of manufacture as defined in claim 42, wherein the coating strengthens the portion of the inorganically filled matrix.

46. An article of manufacture as defined in claim 42, wherein the coating is selected from the group consisting of sodium silicate, orthosilicates, siloxanes, colloidal silica in organic polymer dispersions, colloidal silica in films, colloidal silica in fibers, calcium carbonate, kaolin clay, ceramics, and mixtures thereof.

47. An article of manufacture as defined in claim 42, wherein the coating is selected from the group consisting of biodegradable plastics, acrylics, polyacrylates, polyurethanes, melamines, polyethylene, synthetic polymers, hydroxypropylmethylcellulose, ethylcellulose, polyethylene glycol, prolamine, polyvinyl chloride, polyvinyl alcohol, polyvinyl acetate, polylactic acid, waxes, and mixtures thereof.

48. An article of manufacture as defined in claim 1, further including a liner on at least a portion of a surface of the inorganically filled matrix of the sealable container.

49. An article of manufacture as defined in claim 48, wherein the liner comprises blow-molded glass.

50. An article of manufacture as defined in claim 1, further including a laminated material on at least a portion of a surface of the inorganically filled matrix of the sealable container.

51. An article of manufacture as defined in claim 1, wherein the sealable container comprises a can.

52. An article of manufacture as defined in claim 1, wherein the sealable container comprises a carton.

53. An article of manufacture as defined in claim 1, wherein the sealable container comprises a box.

54. An article of manufacture as defined in claim 1, wherein the sealable container comprises a bottle.

55. An article of manufacture as defined in claim 1, wherein the sealable container comprises a jar.

56. An article of manufacture as defined in claim 1, wherein the sealable container comprises a pouch.

57. An article of manufacture as defined in claim 1, wherein the sealable container has a circular cross-section.

58. An article of manufacture as defined in claim 1, wherein the sealable container has a rectangular cross-section.

59. An article of manufacture as defined in claim 1, wherein the sealable container has a square-shaped cross-section.

60. An article of manufacture as defined in claim 1, wherein the sealable container has an oval-shaped cross-section.

61. An article of manufacture as defined in claim 1, wherein at least a portion of the inorganically filled matrix of the sealable container is hinged.

62. An article of manufacture as defined in claim 1, wherein the sealable container has structural components comprising:
   a hollow body portion having side walls connected to a bottom portion and an open end; and
   a closure means for engaging the open end of the hollow body portion to seal substances within the sealable container.

63. An article of manufacture as defined in claim 1, wherein the sealable container has structural components comprising:
   a hollow body portion having side walls connected to a bottom portion and an open end; and
   a closure means for engaging the open end of the hollow body portion to seal substances within the sealable container, for dispensing substances, and for resealing substances within the sealable container.

64. An article of manufacture as defined in claim 1, wherein the sealable container has structural components comprising:
   a hollow body portion having side walls connected to a bottom portion and an open end; and
   a closure means for engaging the open end of the hollow body portion to seal substances within the sealable container and for dispensing substances.

65. An article of manufacture as defined in claim 64, wherein the bottom portion of the hollow body portion comprises a material selected from the group consisting of metals, glass, plastics, and paper composites.

66. An article of manufacture as defined in claim 64, wherein the side walls of the hollow body portion comprise a material selected from the group consisting of metals, glass, plastics, and paper composites.

67. An article of manufacture as defined in claim 64, wherein the closure means comprises a material selected from the group consisting of metals, glass, plastics, and paper composites.

68. An article of manufacture as defined in claim 64, wherein the bottom portion of the hollow body portion and the side walls of the hollow body portion are integrally formed together.

69. An article of manufacture as defined in claim 64, wherein the closure means comprises a lid.

70. An article of manufacture as defined in claim 64, wherein the closure means comprises a foil covering.

71. An article of manufacture as defined in claim 64, wherein the closure means comprises:
   a top having a conical portion and a nozzle portion; and
   a cap.

72. An article of manufacture as defined in claim 71, wherein the cap has internal threads and the nozzle portion of the top has complementary external threads configured to engage the internal threads of the cap to create a seal.

73. An article of manufacture as defined in claim 71, wherein the cap is a crimped bottle cap.

74. An article of manufacture as defined in claim 64, wherein the closure means comprises a flat cover and a pulltab.

75. An article of manufacture as defined in claim 64, wherein the closure means comprises a top and a spray mechanism.

76. An article of manufacture comprising a sealable container having a liquid-tight barrier, at least a substantial portion of the sealable container comprising a sheet having an inorganically filled matrix, the matrix including:
   an organic polymer binder selected from the group consisting of polysaccharides, proteins, and mixtures or derivatives thereof;
   an inorganic aggregate filler having a concentration in a range from about 20% to about 90% by weight of solids in the inorganically filled matrix; and
   a fibrous material substantially homogeneously dispersed throughout the inorganically filled matrix,
   wherein the inorganically filled matrix includes organic components in an amount of at least about 5% by weight of solids within the inorganically filled matrix, and wherein the inorganically filled matrix has a thickness less than about 5 mm.

77. An article of manufacture as defined in claim 76, wherein the organic polymer binder is included in an amount in a range from about 1% to about 60% by weight of solids in the inorganically filled matrix.

78. An article of manufacture as defined in claim 76, wherein the organic polymer binder is included in an amount in a range from about 2% to about 30% by weight of solids in the inorganically filled matrix.

79. An article of manufacture as defined in claim 76, wherein the organic polymer binder is included in an amount in a range from about 5% to about 20% by weight of solids in the inorganically filled matrix.

80. An article of manufacture as defined in claim 76, wherein the organic polymer binder comprises a cellulosic material selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

81. An article of manufacture as defined in claim 76, wherein the organic polymer binder comprises a starch-based material selected from the group consisting of amylopectin, amylose, seagel, starch acetates, starch hydroxyethyl ethers, ionic starches, long-chain alkylstarches, dextrines, amine starches, phosphate starches, dialdehyde starches, and mixtures or derivatives thereof.

82. An article of manufacture as defined in claim 76, wherein the organic polymer binder comprises a protein-based material selected from the group consisting of prolamine, collagen, gelatin, glue, casein, and mixtures or derivatives thereof.

83. An article of manufacture as defined in claim 76, wherein the organic polymer binder comprises a polysaccharide selected from the group consisting of alginic acid, phycocolloids, agar, gum arabic, guar gum, locust bean gum, gum karaya, gum tragacanth, and mixtures or derivatives thereof.

84. An article of manufacture as defined in claim 76, wherein the inorganically filled mixture further includes a synthetic organic polymer.

85. An article of manufacture as defined in claim 84, wherein the synthetic organic polymer is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, latex, and mixtures or derivatives thereof.

86. An article of manufacture as defined in claim 76, wherein the inorganic aggregate filler is included in an amount in a range from about 20% to about 80% by weight of solids in the inorganically filled matrix.

87. An article of manufacture as defined in claim 76, wherein the inorganic aggregate filler is included in an amount in a range from about 30% to about 70% by weight of solids in the inorganically filled matrix.

88. An article of manufacture as defined in claim 76, wherein the inorganic aggregate filler comprises individual particles that are size optimized in order to achieve a predetermined particle packing density of the inorganic aggregate filler.

89. An article of manufacture as defined in claim 76, wherein the inorganic aggregate filler comprises a lightweight aggregate which reduces the density and increases the insulation ability of the inorganically filled matrix.

90. An article of manufacture as defined in claim 89, wherein the lightweight aggregate is selected from the group consisting of perlite, vermiculite, hollow glass spheres, porous ceramic spheres, xonotlite, aerogels, xerogels, tabular alumina, expanded clay, lightweight expanded geologic materials, pumice, microspheres, and mixtures thereof.

91. An article of manufacture as defined in claim 76, wherein the inorganic aggregate is selected from the group consisting of clay, gypsum, calcium carbonate, mica, silica, fused silica, alumina, metals, sand, gravel, sandstone, limestone, hydrated cement particles, calcium aluminate, glass beads, and mixtures thereof.

92. An article of manufacture as defined in claim 76, wherein the inorganically filled matrix further includes an organic aggregate selected from the group consisting of seeds, starches, gelatins, polymers, cork, agar materials, plastic spheres, and mixtures or derivatives thereof.

93. An article of manufacture as defined in claim 76, wherein the inorganically filled matrix further includes a hydraulically settable material.

94. An article of manufacture as defined in claim 76, wherein the fibrous material is included in an amount in a range from about 0.5% to about 60% by weight of solids in the inorganically filled matrix.

95. An article of manufacture as defined in claim 76, wherein the fibrous material is included in an amount in a range from about 2% to about 40% by weight of solids in the inorganically filled matrix.

96. An article of manufacture as defined in claim 76, wherein the fibrous material is included in an amount in a range from about 5% to about 20% by weight of solids in the inorganically filled matrix.

97. An article of manufacture as defined in claim 76, wherein the fibrous material comprises natural organic fibers.

98. An article of manufacture as defined in claim 97, wherein the natural organic fibers are selected from the group consisting of hemp fibers, sisal fibers, cotton fibers, bagasse fibers, abaca fibers, flax fibers, southern pine fibers, southern hardwood fibers, and mixtures thereof.

99. An article of manufacture as defined in claim 76, wherein the fibrous material comprises inorganic fibers.

100. An article of manufacture as defined in claim 99, wherein the inorganic fibers are selected from the group consisting of glass fibers, silica fibers, ceramic fibers, graphite fibers, metal fibers, and mixtures thereof.

101. An article of manufacture as defined in claim 76, wherein the fibrous material comprises synthetic organic fibers.

102. An article of manufacture as defined in claim 101, wherein the synthetic organic fibers are selected from the group consisting of plastic fibers, polyaramide fibers, polylactic acid fibers, polyethylene fibers, polypropylene fibers, and mixtures thereof.

103. An article of manufacture as defined in claim 76, wherein the fibrous material comprises individual fibers having an aspect ratio greater than about 10:1.

104. An article of manufacture as defined in claim 76, wherein the fibrous material comprises individual fibers having an aspect ratio greater than about 100:1.

105. An article of manufacture as defined in claim 76, wherein the fibrous material includes continuous fibers.

106. An article of manufacture as defined in claim 105, wherein the continuous fibers are wrapped around the inorganically filled matrix of the sealable container.

107. An article of manufacture as defined in claim 105, wherein the continuous fibers are embedded within the inorganically filled matrix of the sealable container.

108. An article of manufacture as defined in claim 105, wherein the continuous fibers are spiral wound.

109. An article of manufacture as defined in claim 76, wherein the fibrous material is selected from the group consisting of a fibrous mesh, mat, and fabric.

110. An article of manufacture as defined in claim 76, wherein the inorganically filled matrix has a thickness less than about 3 mm.

111. An article of manufacture as defined in claim 76, wherein the inorganically filled matrix has a thickness less than about 1 mm.

112. An article of manufacture as defined in claim 76, wherein the liquid-tight barrier is pressure-tight, wherein the sealable container has an interior and an exterior, and wherein the inorganically filled matrix can withstand a differential in pressure between the interior and the exterior of the sealable container of up to about 10 MPa of pressure.

113. An article of manufacture as defined in claim 76, further including a coating on at least a portion of a surface of the inorganically filled matrix of the sealable container.

114. An article of manufacture as defined in claim 113, wherein the coating renders the portion of the inorganically filled matrix impermeable to gases.

115. An article of manufacture as defined in claim 113, wherein the coating renders the portion of the inorganically filled matrix impermeable to liquids.

116. An article of manufacture as defined in claim 113, wherein the coating strengthens the portion of the inorganically filled matrix.

117. An article of manufacture as defined in claim 113, wherein the coating is selected from the group consisting of sodium silicate, orthosilicates, siloxanes, colloidal silica in organic polymer dispersions, colloidal silica in films, colloidal silica in fibers, calcium carbonate, kaolin clay, ceramics, and mixtures thereof.

118. An article of manufacture as defined in claim 113, wherein the coating is selected from the group consisting of biodegradable plastics, acrylics, polyacrylates, polyurethanes, melamines, polyethylene, synthetic polymers, hydroxypropylmethylcellulose, ethylcellulose, polyethylene glycol, prolamine, polyvinyl chloride, polyvinyl alcohol, polyvinyl acetate, polylactic acid, waxes, and mixtures thereof.

119. An article of manufacture as defined in claim 76, further including a liner on at least a portion of a surface of the inorganically filled matrix of the sealable container.

120. An article of manufacture as defined in claim 119, wherein the liner comprises blow-molded glass.

121. An article of manufacture as defined in claim 76, further including a laminated material on at least a portion of a surface of the inorganically filled matrix of the sealable container.

122. An article of manufacture as defined in claim 76, wherein the sealable container comprises a can.

123. An article of manufacture as defined in claim 76, wherein the sealable container comprises a carton.

124. An article of manufacture as defined in claim 76, wherein the sealable container comprises a box.

125. An article of manufacture as defined in claim 76, wherein the sealable container comprises a bottle.

126. An article of manufacture as defined in claim 76, wherein the sealable container comprises a jar.

127. An article of manufacture as defined in claim 76, wherein the sealable container comprises a pouch.

128. An article of manufacture as defined in claim 76, wherein the sealable container has a circular cross-section.

129. An article of manufacture as defined in claim 76, wherein the sealable container has a rectangular cross-section.

130. An article of manufacture as defined in claim 76, wherein the sealable container has a square-shaped cross-section.

131. An article of manufacture as defined in claim 76, wherein the sealable container has an oval-shaped cross-section.

132. An article of manufacture as defined in claim 76, wherein at least a portion of the inorganically filled matrix of the sheet is hinged.

133. An article of manufacture as defined in claim 76, wherein the sealable container has structural components comprising:
- a hollow body portion having side walls connected to a bottom portion and an open end; and
- a closure means for engaging the open end of the hollow body portion to seal substances within the sealable container.

134. An article of manufacture as defined in claim 76, wherein the sealable container has structural components comprising:
- a hollow body portion having side walls connected to a bottom portion and an open end; and
- a closure means for engaging the open end of the hollow body portion to seal substances within the sealable container, for dispensing substances, and for resealing substances within the sealable container.

135. An article of manufacture as defined in claim 76, wherein the sealable container has structural components comprising:
- a hollow body portion having side walls connected to a bottom portion and an open end; and
- a closure means for engaging the open end of the hollow body portion to seal substances within the sealable container and for dispensing substances.

136. An article of manufacture as defined in claim 135, wherein the bottom portion of the hollow body portion comprises a material selected from the group consisting of metals, glass, plastics, and paper composites.

137. An article of manufacture as defined in claim 135, wherein the side walls of the hollow body portion comprise a material selected from the group consisting of metals, glass, plastics, and paper composites.

138. An article of manufacture as defined in claim 135, wherein the closure means comprises a material selected from the group consisting of metals, glass, plastics, and paper composites.

139. An article of manufacture as defined in claim 135, wherein the bottom portion of the hollow body portion and the side walls of the hollow body portion are integrally formed together.

140. An article of manufacture as defined in claim 135, wherein the closure means comprises a lid.

141. An article of manufacture as defined in claim 135, wherein the closure means comprises a foil covering.

142. An article of manufacture as defined in claim 135, wherein the closure means comprises:
a top having a conical portion and a nozzle portion; and
a cap.

143. An article of manufacture as defined in claim 142, wherein the cap has internal threads and the nozzle portion of the top has complementary external threads configured to engage the internal threads of the cap to create a seal.

144. An article of manufacture as defined in claim 142, wherein the cap is a crimped bottle cap.

145. An article of manufacture as defined in claim 135, wherein the closure means comprises a flat cover and a pulltab.

146. An article of manufacture as defined in claim 135, wherein the closure means comprises a top and a spray mechanism.

147. An article of manufacture as defined in claim 76, wherein the sheet has been spiral wound to form the portion of the sealable container.

148. An article of manufacture as defined in claim 76, wherein the sheet has been rolled to form the portion of the sealable container.

149. An article of manufacture as defined in claim 76, wherein the sheet has been folded to form the portion of the sealable container.

150. An article of manufacture comprising a sealable container having a liquid-tight barrier, at least a substantial portion of the sealable container comprising a starch-bound sheet, the starch-bound sheet comprising:
- a binding matrix including starch in an amount in a range from about 5% to about 90% by weight of solids in the starch-bound sheet and cellulosic ether in an amount in a range from about 0.5% to about 10% by weight of solids in the starch-bound sheet;
- fibers substantially homogeneously dispersed throughout the binding matrix and having a concentration in an amount in a range from about 3% to about 40% by weight of solids in the starch-bound sheet; and
- an inorganic filler in an amount in a range from 0% to about 90% by weight of solids in the starch-bound sheet, wherein the starch-bound sheet has a thickness less than about 1 cm and a density greater than about 0.5 g/cm$^3$.

151. An article of manufacture as defined in claim 150, wherein the starch is included in an amount in a range from about 15% to about 75% by weight of solids in the starch-bound sheet.

152. An article of manufacture as defined in claim 150, wherein the starch is included in an amount in a range from about 30% to about 70% by weight of solids in the starch-bound sheet.

153. An article of manufacture as defined in claim 150, wherein the starch comprises unmodified potato starch.

154. An article of manufacture as defined in claim 150, wherein the starch comprises unmodified corn starch.

155. An article of manufacture as defined in claim 150, wherein the starch comprises unmodified waxy corn starch.

156. An article of manufacture as defined in claim 150, wherein the cellulosic ether is included in an amount in a range from about 1% to about 5% by weight of solids in the starch-bound sheet.

157. An article of manufacture as defined in claim 150, wherein the cellulosic ether is included in an amount in a range from about 2% to about 4% by weight of solids in the starch-bound sheet.

158. An article of manufacture as defined in claim 150, wherein the cellulosic ether is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

159. An article of manufacture as defined in claim 150, wherein the binding matrix further includes a protein-based material selected from the group consisting of prolamine, collagen, gelatin, glue, casein, and mixtures or derivatives thereof.

160. An article of manufacture as defined in claim 150, wherein the binding matrix further includes a polysaccharide selected from the group consisting of alginic acid, phycocolloids, agar, gum arabic, guar gum, locust bean gum, gum karaya, gum tragacanth, and mixtures or derivatives thereof.

161. An article of manufacture as defined in claim 150, wherein the binding matrix further includes a synthetic organic polymer.

162. An article of manufacture as defined in claim 161, wherein the synthetic organic polymer is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, polylactic acid, ethylene oxide polymers, synthetic clay, latex, and mixtures or derivatives thereof.

163. An article of manufacture as defined in claim 150, wherein the inorganic aggregate filler is included in an amount in a range from about 20% to about 80% by weight of solids in the starch-bound sheet.

164. An article of manufacture as defined in claim 150, wherein the inorganic aggregate filler is included in an amount in a range from about 30% to about 70% by weight of solids in the starch-bound sheet.

165. An article of manufacture as defined in claim 150, wherein the inorganic aggregate filler comprises a lightweight aggregate which reduces the density and increases the insulation ability of the starch-bound sheet.

166. An article of manufacture as defined in claim 165, wherein the lightweight aggregate is selected from the group consisting of perlite, vermiculite, hollow glass spheres, porous ceramic spheres, xonotlite, aerogels, xerogels, tabular alumina, expanded clay, lightweight expanded geologic materials, pumice, microspheres, and mixtures thereof.

167. An article of manufacture as defined in claim 150, wherein the inorganic aggregate is selected from the group consisting of clay, gypsum, calcium carbonate, mica, silica, fused silica, alumina, metals, sand, gravel, sandstone, limestone, hydrated cement particles, calcium aluminate, glass beads, and mixtures thereof.

168. An article of manufacture as defined in claim 150, wherein the starch-bound sheet further includes an organic aggregate selected from the group consisting of seeds, starches, gelatins, polymers, cork, agar materials, plastic spheres, and mixtures or derivatives thereof.

169. An article of manufacture as defined in claim 150, wherein the starch-bound sheet further includes a hydraulically settable material.

170. An article of manufacture as defined in claim 150, wherein the fibrous material is included in an amount in a range from about 5% to about 30% by weight of solids in the starch-bound sheet.

171. An article of manufacture as defined in claim 150, wherein the fibrous material is included in an amount in a range from about 7% to about 20% by weight of solids in the starch-bound sheet.

172. An article of manufacture as defined in claim 150, wherein the fibrous material comprises natural organic fibers.

173. An article of manufacture as defined in claim 172, wherein the natural organic fibers are selected from the group consisting of hemp fibers, sisal fibers, cotton fibers, bagasse fibers, abaca fibers, flax fibers, southern pine fibers, southern hardwood fibers, and mixtures thereof.

174. An article of manufacture as defined in claim 150, wherein the fibrous material comprises inorganic fibers.

175. An article of manufacture as defined in claim 174, wherein the inorganic fibers are selected from the group consisting of glass fibers, silica fibers, ceramic fibers, graphite fibers, metal fibers, and mixtures thereof.

176. An article of manufacture as defined in claim 150, wherein the fibrous material comprises synthetic organic fibers.

177. An article of manufacture as defined in claim 176, wherein the synthetic organic fibers are selected from the group consisting of plastic fibers, polyaramide fibers, polylactic acid fibers, polyethylene fibers, polypropylene fibers, and mixtures thereof.

178. An article of manufacture as defined in claim 150, wherein the fibrous material comprises individual fibers having an aspect ratio greater than about 10:1.

179. An article of manufacture as defined in claim 150, wherein the fibrous material comprises individual fibers having an aspect ratio greater than about 100:1.

180. An article of manufacture as defined in claim 150, wherein the fibrous material includes continuous fibers.

181. An article of manufacture as defined in claim 180, wherein the continuous fibers are wrapped around the starch-bound sheet of the sealable container.

182. An article of manufacture as defined in claim 180, wherein the continuous fibers are embedded within the starch-bound sheet of the sealable container.

183. An article of manufacture as defined in claim 180, wherein the continuous fibers are spiral wound.

184. An article of manufacture as defined in claim 150, wherein the fibrous material is selected from the group consisting of a fibrous mesh, mat, and fabric.

185. An article of manufacture as defined in claim 150, wherein the starch-bound sheet has a thickness less than about 5 mm.

186. An article of manufacture as defined in claim 150, wherein the starch-bound sheet has a thickness less than about 3 mm.

187. An article of manufacture as defined in claim 150, wherein the starch-bound sheet has a thickness less than about 1 mm.

188. An article of manufacture as defined in claim 150, wherein the liquid-tight barrier is pressure-tight, wherein the sealable container has an interior and an exterior, wherein the starch-bound sheet can withstand a differential in pressure between the interior and the exterior of the sealable container of up to about 10 MPa of pressure.

189. An article of manufacture as defined in claim 150, further including a coating on at least a portion of a surface of the starch-bound sheet of the sealable container.

190. An article of manufacture as defined in claim 189, wherein the coating renders the portion of the starch-bound sheet impermeable to gases.

191. An article of manufacture as defined in claim 189, wherein the coating renders the portion of the starch-bound sheet impermeable to liquids.

192. An article of manufacture as defined in claim 189, wherein the coating strengthens the portion of the starch-bound sheet.

193. An article of manufacture as defined in claim 189, wherein the coating is selected from the group consisting of sodium silicate, orthosilicates, siloxanes, colloidal silica in organic polymer dispersions, colloidal silica in films, colloidal silica in fibers, calcium carbonate, kaolin clay, ceramics, and mixtures thereof.

194. An article of manufacture as defined in claim 189, wherein the coating is selected from the group consisting of biodegradable plastics, acrylics, polyacrylates, polyurethanes, melamines, polyethylene, synthetic polymers, hydroxypropylmethylcellulose, ethylcellulose, polyethylene glycol, prolamine, polyvinyl chloride, polyvinyl alcohol, polyvinyl acetate, polylactic acid, waxes, and mixtures thereof.

195. An article of manufacture as defined in claim 150, further including a liner on at least a portion of a surface of the starch-bound sheet of the sealable container.

196. An article of manufacture as defined in claim 195, wherein the liner comprises blow-molded glass.

197. An article of manufacture as defined in claim 150, further including a laminated material on at least a portion of a surface of the starch-bound sheet of the sealable container.

198. An article of manufacture as defined in claim 150, wherein the sealable container comprises a can.

199. An article of manufacture as defined in claim 150, wherein the sealable container comprises a carton.

200. An article of manufacture as defined in claim 150, wherein the sealable container comprises a box.

201. An article of manufacture as defined in claim 150, wherein the sealable container comprises a bottle.

202. An article of manufacture as defined in claim 150, wherein the sealable container comprises a jar.

203. An article of manufacture as defined in claim 150, wherein the sealable container comprises a pouch.

204. An article of manufacture as defined in claim 150, wherein the sealable container has a circular cross-section.

205. An article of manufacture as defined in claim 150, wherein the sealable container has a rectangular cross-section.

206. An article of manufacture as defined in claim 150, wherein the sealable container has a square-shaped cross-section.

207. An article of manufacture as defined in claim 150, wherein the sealable container has an oval-shaped cross-section.

208. An article of manufacture as defined in claim 150, wherein at least a portion of the starch-bound sheet is hinged.

209. An article of manufacture as defined in claim 150, wherein the sealable container has structural components comprising:

a hollow body portion having side walls connected to a bottom portion and an open end; and a closure means for engaging the open end of the hollow body portion to seal substances within the sealable container.

210. An article of manufacture as defined in claim 150, wherein the sealable container has structural components comprising:

a hollow body portion having side walls connected to a bottom portion and an open end; and a closure means for engaging the open end of the hollow body portion to seal substances within the sealable container, for dispensing substances, and for resealing substances within the sealable container.

211. An article of manufacture as defined in claim 150, wherein the sealable container has structural components comprising:

a hollow body portion having side walls connected to a bottom portion and an open end; and a closure means for engaging the open end of the hollow body portion to seal substances within the sealable container and for dispensing substances.

212. An article of manufacture as defined in claim 211, wherein the bottom portion of the hollow body portion comprises a material selected from the group consisting of metals, glass, plastics, and paper composites.

213. An article of manufacture as defined in claim 211, wherein the side walls of the hollow body portion comprise a material selected from the group consisting of metals, glass, plastics, and paper composites.

214. An article of manufacture as defined in claim 211, wherein the closure means comprises a material selected from the group consisting of metals, glass, plastics, and paper composites.

215. An article of manufacture as defined in claim 211, wherein the bottom portion of the hollow body portion and the side walls of the hollow body portion are integrally formed together.

216. An article of manufacture as defined in claim 211, wherein the closure means comprises a lid.

217. An article of manufacture as defined in claim 211, wherein the closure means comprises a foil covering.

218. An article of manufacture as defined in claim 211, wherein the closure means comprises:

a top having a conical portion and a nozzle portion; and a cap.

219. An article of manufacture as defined in claim 218, wherein the cap has internal threads and the nozzle portion of the top has complementary external threads configured to engage the internal threads of the cap to create a seal.

220. An article of manufacture as defined in claim 218, wherein the cap is a crimped bottle cap.

221. An article of manufacture as defined in claim 211, wherein the closure means comprises a flat cover and a pulltab.

222. An article of manufacture as defined in claim 211, wherein the closure means comprises a top and a spray mechanism.

223. An article of manufacture as defined in claim 150, wherein the starch-bound sheet has been spiral wound to form the portion of the sealable container.

224. An article of manufacture as defined in claim 150, wherein the starch-bound sheet has been rolled to form the portion of the sealable container.

225. An article of manufacture as defined in claim 150, wherein the starch-bound sheet has been folded to form the portion of the sealable container.

* * * * *